US012670022B2

(12) United States Patent
Avidan Herman et al.

(10) Patent No.: US 12,670,022 B2
(45) Date of Patent: Jun. 30, 2026

(54) SERVICES DEVELOPMENT AND DEPLOYMENT FOR BACKEND SYSTEM INTEGRATION

(71) Applicant: OpenLegacy Technologies Ltd., Princeton, NJ (US)

(72) Inventors: Zeev Avidan Herman, Yehud (IL); Roi Mor, Yehud (IL); Yehoram Stein, Yehud (IL); Lior Shemo, Yehud (IL); Tom Fingerman, Yehud (IL); Ori Shalom, Yehud (IL)

(73) Assignee: OpenLegacy Technologies Ltd., Princeton, NJ (US)

( * ) Notice: Subject to any disclaimer, the term of this patent is extended or adjusted under 35 U.S.C. 154(b) by 420 days.

(21) Appl. No.: 18/512,913

(22) Filed: Nov. 17, 2023

(65) Prior Publication Data

US 2024/0086239 A1     Mar. 14, 2024

Related U.S. Application Data

(63) Continuation of application No. PCT/US2022/072398, filed on May 18, 2022.

(60) Provisional application No. 63/190,756, filed on May 19, 2021.

(51) Int. Cl.
G06F 9/50 (2006.01)

(52) U.S. Cl.
CPC ...................................... G06F 9/50 (2013.01)

(58) Field of Classification Search
CPC ..... G06F 9/50; G06F 8/34; G06F 8/36; G06F 8/60
See application file for complete search history.

(56) References Cited

U.S. PATENT DOCUMENTS

| | | | | |
|---|---|---|---|---|
| 7,895,563 B2 * | 2/2011 | Carlson | ..................... | G06F 8/36 |
| | | | | 717/102 |
| 10,182,129 B1 | 1/2019 | Peterson et al. | | |
| 2005/0243604 A1 | 11/2005 | Harken et al. | | |
| 2015/0188927 A1 * | 7/2015 | Santhi | ................ | G06Q 10/0631 |
| | | | | 726/4 |
| 2017/0090893 A1 | 3/2017 | Aditya et al. | | |
| 2019/0362009 A1 * | 11/2019 | Miseldine | ........... | G06F 16/9032 |

(Continued)

OTHER PUBLICATIONS

International Search Report and Written Opinion for PCT/US2022/072398, completed Aug. 17, 2022, 20 pgs.

*Primary Examiner* — Dong U Kim
(74) *Attorney, Agent, or Firm* — Matthew M. Hulihan; Heslin Rothenberg Farley & Mesiti P.C.

(57) ABSTRACT

Services development/deployment for backend system integration includes metadata-based identification of assets of a backend system, and building metadata specifications as available constructs from which to develop services for deployment, each metadata specification corresponding to a given backend asset that uses a first data format and defining translations between the first data format and a second data format that is agnostic to selected service endpoints and endpoint deployment architecture(s) to provide agnostic development of the services, providing a development interface to a user, and obtaining a user-defined flow as a generic definition of a service agnostic to any specific service endpoint and endpoint deployment architecture on which the service is to be deployed.

20 Claims, 41 Drawing Sheets

(56)  References Cited

U.S. PATENT DOCUMENTS

2020/0250176  A1      8/2020   Padmanabhan
2021/0374563  A1 *   12/2021   Jezewski ................. G06F 9/453

* cited by examiner

FIG. 2

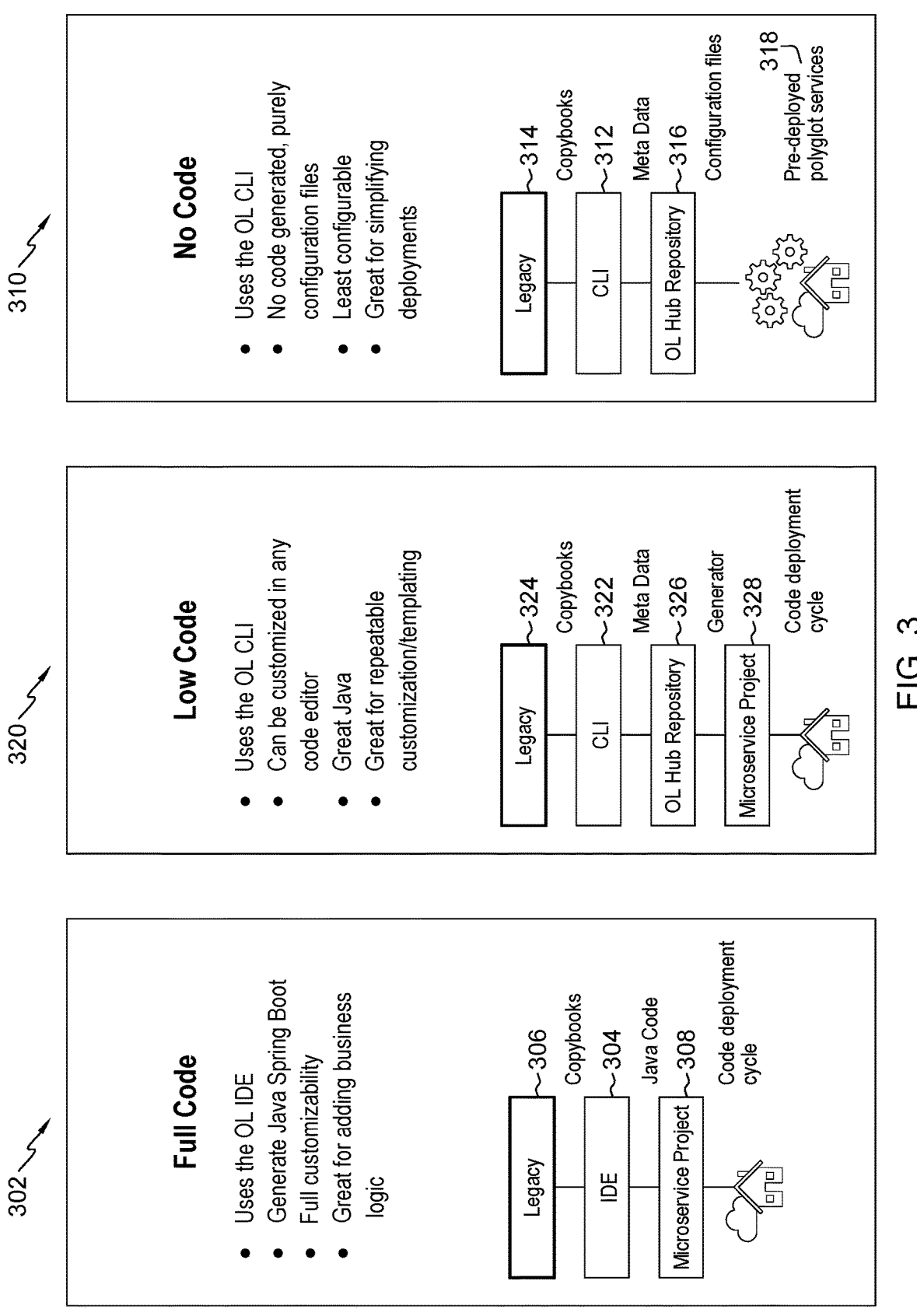

No Code 310

- Uses the OL CLI
- No code generated, purely configuration files
- Least configurable
- Great for simplifying deployments Legacy 314
Copybooks
CLI 312
Meta Data
OL Hub Repository 316
Configuration files Pre-deployed polyglot services 318

Low Code 320

- Uses the OL CLI
- Can be customized in any code editor
- Great Java
- Great for repeatable customization/templating Legacy 324
Copybooks
CLI 322
Meta Data
OL Hub Repository 326
Generator
Microservice Project 328
Code deployment cycle

Full Code 302

- Uses the OL IDE
- Generate Java Spring Boot
- Full customizability
- Great for adding business logic Legacy 306
Copybooks
IDE 304
Java Code
Microservice Project 308
Code deployment cycle

FIG. 3

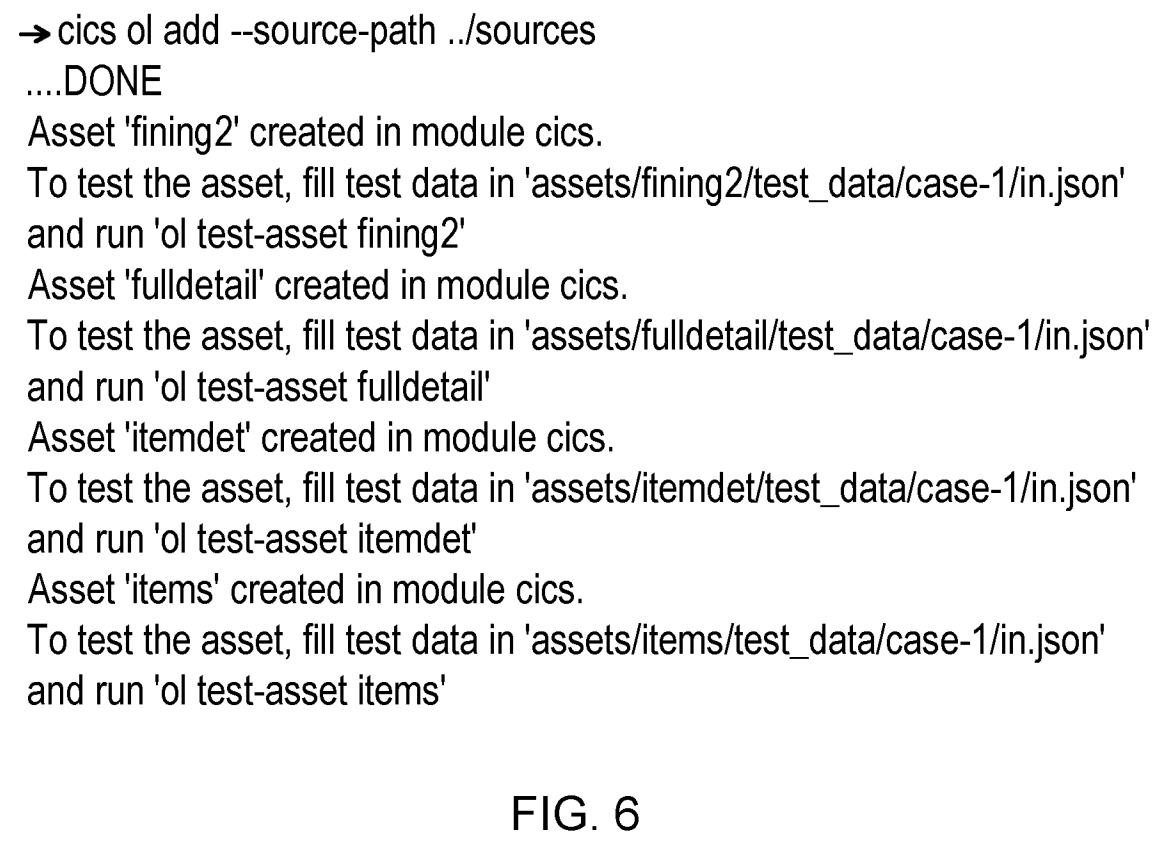

→ cics ol add --source-path ../sources

....DONE

Asset 'fining2' created in module cics.

To test the asset, fill test data in 'assets/fining2/test_data/case-1/in.json'
and run 'ol test-asset fining2'

Asset 'fulldetail' created in module cics.

To test the asset, fill test data in 'assets/fulldetail/test_data/case-1/in.json'
and run 'ol test-asset fulldetail'

Asset 'itemdet' created in module cics.

To test the asset, fill test data in 'assets/itemdet/test_data/case-1/in.json'
and run 'ol test-asset itemdet'

Asset 'items' created in module cics.

To test the asset, fill test data in 'assets/items/test_data/case-1/in.json'
and run 'ol test-asset items'

FIG. 6

SERVICES DEVELOPMENT AND DEPLOYMENT FOR BACKEND SYSTEM INTEGRATION

CROSS-REFERENCE TO RELATED APPLICATIONS

This application is filed as a Bypass continuation application claiming priority to PCT Application No. PCT/US2022/072398 entitled "SERVICES DEVELOPMENT AND DEPLOYMENT FOR BACKEND SYSTEM INTEGRATION" and filed on May 18, 2022, which claims priority to U.S. Provisional Application No. 63/190,756 entitled "HUB ARCHITECTURE FOR SERVICE DEVELOPMENT AND DEPLOYMENT" and filed May 19, 2023, both of which are hereby incorporated herein by reference in their entirety.

BACKGROUND

Integrated Development Environments (IDEs) exist that allow skilled information technology (IT) developers to generate code and deploy individual application programming interfaces (APIs). An example application of this is a computer systems integration effort to expose functionality of backend systems for access. Example such backend systems include legacy backend systems—ones that use older and often outdated technology. A particular parameterized call using a protocol of a legacy system may be exposed for invocation via an HTTP (hypertext transfer protocol) request to access the legacy system. Often there is more complexity surrounding these functions, for instance the need to parameterize them or supply data from other sources.

SUMMARY

Shortcomings of the prior art are overcome and additional advantages are provided through the provision of a computer-implemented method. The method parses metadata, collected from a backend system, describing functionality of the backend system, and identifies, based on the parsing, assets of the backend system, the assets including properties of calls supported by the backend system. The method automatically builds metadata specifications of the identified assets and maintains the metadata specifications in a deployment repository as available constructs from which to develop services for deployment on one or more endpoint deployment architectures based on selected service endpoints. Each metadata specification of the metadata specifications corresponds to a given asset, of the backend system, that uses a first data format, and defines translations between the first data format and a second data format that is different from the first data format and that is agnostic to the selected service endpoints and the one or more endpoint deployment architectures, to provide agnostic development of the services. The method provides a development interface to a user, the development interface comprising available user-selectable flow elements having properties that include inputs and outputs in formats based on the metadata specifications maintained in the deployment repository, the available user-selectable flow elements available for selective use by the user in developing a service. The method also, based on the user defining a flow using the development interface, obtains the user-defined flow as a generic definition of the service that is agnostic to any specific service endpoint and endpoint deployment architecture on which the service is to be deployed. The user-defined flow comprises a plurality of flow elements including (i) an input flow element, (ii) a selected one or more flow elements selected by the user from the available user-selectable flow elements, and (iii) an output flow element, and mappings between the plurality of flow elements, the mappings representing flow of data between the flow elements, and the user-defined flow defining a flow of execution to provide the service, wherein the selected one or more flow elements represent one or more calls to the backend system.

Further, a computer system is provided that includes a memory and a processor in communication with the memory, wherein the computer system is configured to perform a method. The method parses metadata, collected from a backend system, describing functionality of the backend system, and identifies, based on the parsing, assets of the backend system, the assets including properties of calls supported by the backend system. The method automatically builds metadata specifications of the identified assets and maintains the metadata specifications in a deployment repository as available constructs from which to develop services for deployment on one or more endpoint deployment architectures based on selected service endpoints. Each metadata specification of the metadata specifications corresponds to a given asset, of the backend system, that uses a first data format, and defines translations between the first data format and a second data format that is different from the first data format and that is agnostic to the selected service endpoints and the one or more endpoint deployment architectures, to provide agnostic development of the services. The method provides a development interface to a user, the development interface comprising available user-selectable flow elements having properties that include inputs and outputs in formats based on the metadata specifications maintained in the deployment repository, the available user-selectable flow elements available for selective use by the user in developing a service. The method also, based on the user defining a flow using the development interface, obtains the user-defined flow as a generic definition of the service that is agnostic to any specific service endpoint and endpoint deployment architecture on which the service is to be deployed. The user-defined flow comprises a plurality of flow elements including (i) an input flow element, (ii) a selected one or more flow elements selected by the user from the available user-selectable flow elements, and (iii) an output flow element, and mappings between the plurality of flow elements, the mappings representing flow of data between the flow elements, and the user-defined flow defining a flow of execution to provide the service, wherein the selected one or more flow elements represent one or more calls to the backend system.

Yet further, a computer program product including a computer readable storage medium readable by a processing circuit and storing instructions for execution by the processing circuit is provided for performing a method. The method parses metadata, collected from a backend system, describing functionality of the backend system, and identifies, based on the parsing, assets of the backend system, the assets including properties of calls supported by the backend system. The method automatically builds metadata specifications of the identified assets and maintains the metadata specifications in a deployment repository as available constructs from which to develop services for deployment on one or more endpoint deployment architectures based on selected service endpoints. Each metadata specification of the metadata specifications corresponds to a given asset, of the backend system, that uses a first data format, and defines translations between the first data format and a second data format that is different from the first data format and that is agnostic to the selected service endpoints and the one or more endpoint deployment architectures, to provide agnostic development of the services. The method provides a development interface to a user, the development interface comprising available user-selectable flow elements having properties that include inputs and outputs in formats based on the metadata specifications maintained in the deployment repository, the available user-selectable flow elements available for selective use by the user in developing a service. The method also, based on the user defining a flow using the development interface, obtains the user-defined flow as a generic definition of the service that is agnostic to any specific service endpoint and endpoint deployment architecture on which the service is to be deployed. The user-defined flow comprises a plurality of flow elements including (i) an input flow element, (ii) a selected one or more flow elements selected by the user from the available user-selectable flow elements, and (iii) an output flow element, and mappings between the plurality of flow elements, the mappings representing flow of data between the flow elements, and the user-defined flow defining a flow of execution to provide the service, wherein the selected one or more flow elements represent one or more calls to the backend system.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

FIG. 2 depicts an example interface presented by a system in conjunction with a customer's use of modules, assets, and other aspects of a development repository, in accordance with aspects described herein;

FIG. 3 presents three example service development/deployment approaches, in accordance with aspects described herein;

FIG. 6 depicts an example command line interface adding parsed assets (as a module) into a Hub development component, in accordance with aspects described herein;

DETAILED DESCRIPTION

Figure 1:
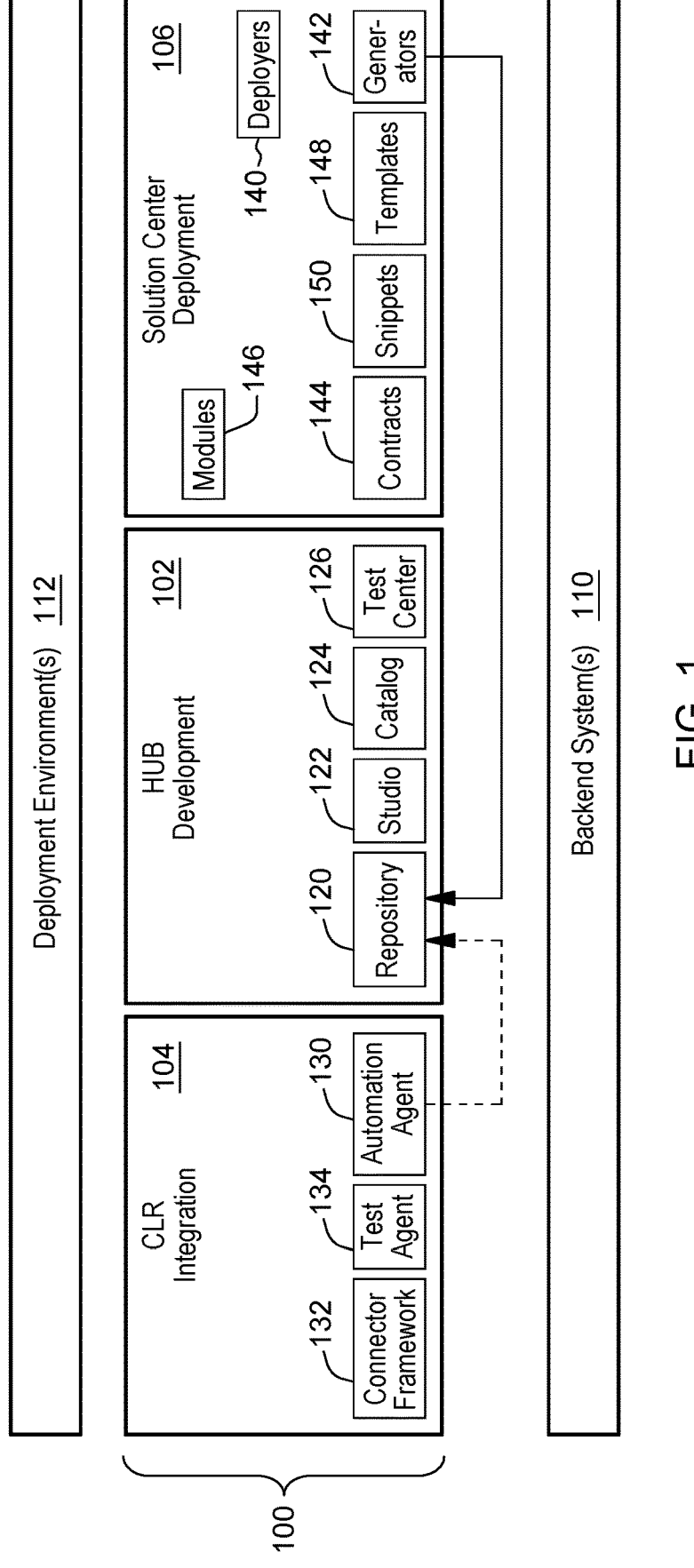
FIG. 1 presents an example conceptual diagram of an environment to incorporate and use aspects described herein.

Described herein are approaches for computer systems integration, including integration between backend system functionality and other architectures. A backend system is a system holding process and/or data and that is to be integrated with. Backend systems can include, but are not limited to, legacy systems, which refers generally to those that use older and often outdated technology. Some examples may be described herein with reference to legacy system(s) as an example of a backend system, though aspects apply more broadly to any type of backend system with which there is desired for integration to expose functionality thereof.

Aspects facilitate ease-of-use and streamlined API creation and management with options for full code, 'low-code', and 'no-code' embodiments for deployment. Additional features can help manage business processes across both backend (e.g. legacy) and non-backend system APIs in an automated, end-to-end 'API factory' that includes built-in options for deployment across various systems. APIs are an example type of service based on a contract. Some examples presented herein may refer to APIs as a specific example of a service, though it is to be understood that concepts described herein may apply more generally to other types of services, including, as an example, serverless functions.

As noted, IDEs exist that allow IT developers to generate and deploy APIs interfacing with backend functionality. Plugins and tooling can enable parsing and understanding metadata collected from backend systems about functionality of those backend systems and automatically generate projects, such as Java® projects for building a Java® program, from the metadata (JAVA is a registered trademark of Oracle Corporation, Austin, Texas, U.S.A.). User interaction in this example occurs in the IDE via a series of steps that start from a backend system (also referred to herein as a mainframe system, an example of which is a legacy system) call, transaction, or other backend procedure, and end in the generation of a project for deploying an API. In API technology, the API is a contract representing an agreement of sorts in terms of what is presented ('called') by one side and what is returned by the other side. The two sides 'negotiate' and 'agree' to the contract, then adhere to the contract, binding to it in the technical sense. An API "consumer" is an entity that calls to invoke the API, and the "provider" of the API executes function(s) to produce result(s) that is/are then returned to the API consumer as a response.

Aspects described herein provide approaches that enable users to produce services (e.g. API offerings) using an environment and platform referred to broadly herein as a Hub. With the Hub design, development is taken beyond a mere IDE plugin to a full-fledged, on-premises and/or cloud-based platform for metadata specification-based development. The Hub platform can be used to develop services in a platform-agnostic manner, decoupled from any single programming language such as Java®. After development, any platform-specific coding can be done in a deployment stage based on selection of a desired service endpoint and target environment/platform to generate and produce the service's runtime code that is specific to selected endpoint properties.

The Hub provides, in one aspect, an interface and control center for creating and managing services. It can cooperate with a command line interface (CLI) or other type of interface for directly interacting with a backend system and a solution center described elsewhere herein. In some examples, the CLI can be used to obtain and parse backend system assets, turn/convert them into metadata specifications of usable Hub assets within Hub modules, and save them, though in other examples other tools, utilities or the like can be used for this parsing and building of metadata specifications. The access of the backend system, parsing of metadata obtained from the backend to inform of the backend assets, and provision of the built metadata specifications to define the Hub assets may be automated and therefore without user intervention or participation.

Each metadata specification, or Hub asset, can correspond to a given asset of the backend system. The asset of the backend uses a data format (first data format) and the metadata specification can define translation(s) between that first data format and another (second) data format that is different from the first data format. COBOL is an example first data format. In examples, the first data format of the backend system is a proprietary and/or legacy format and the second data format is a more modern format. The service, in operation, can send data to, and receive data from, the legacy system in the first format, and perform translations to change between the first format and second format when receiving data from and sending data to the backend system.

The second data format can be any desired format, created or made up as a model for use in Hub. It may be generic, and all of the assets in a particular customer's Hub can use this format. In some examples, the format may be based on a known format, such as Java, but this is not a requirement. This second format is agnostic to whatever a user will eventually select in terms of the actual deployment of the service. For instance, the user can select a service endpoint (such as Kafka, REST (REpresentational State Transfer), SOAP, etc.) and deployment architecture/environment type for deployment but the second format used by the Hub in generically defining the service may be agnostic to whatever the service endpoint(s) and deployment architectures will later be selected. In this manner, the metadata specifications can be used for platform-agnostic development of the services, which can then be deployed as desired.

The metadata specifications may be stored/saved in any desired manner, and in particular examples are each stored as a JavaScript Object Notation (JSON) type file, for instance in a YAML format. As noted, the metadata specifications can be built automatically.

The specification format of the Hub assets and modules into which they may be grouped is of no particular importance as long as they can be used consistent with aspects discussed herein. In an example, the format is JSON. The assets and modules are stored in one or more repository components of the Hub. It is possible that the Hub maintains multiple different repositories serving different roles, for instance a repository for the environment, a test repository, and a production repository, as examples.

For purposes of this explanation, services are the end products that are developed and deployed, and these services are 'consumed' by consumers. APIs are example such services. While the terms "API" and "service" may be used interchangeably herein, aspects discussed herein may apply to other types of service offerings.

FIG. 1 presents an example conceptual diagram of an environment to incorporate and use aspects described herein. Layer 100, the Hub layer, includes a Hub development component 102, a CLI integration component 104, and a solution center deployment component 106, and sits conceptually between backend system(s) 110 and any of various on-premises, cloud, and/or hybrid cloud deployment environments 112. A backend system 110 is typically, though not always, one or more on-premises, backend server(s) of a customer that uses the Hub. The Hub layer 100 components, which are for development and deployment of services to environment(s) 112, can themselves be hosted in an on-premises, cloud, or hybrid cloud deployment, which may be the same or different from on-premises, cloud, and hybrid cloud deployment environment(s) 112.

Within the Hub development component 102 are various components. A foundation component is the development repository 120. In an example, it is a database with a collection of elements used in API creation. Optionally, the Hub could include one or more other multitenant, 'public' cloud development repositories in the solution center deployment component 106 or elsewhere, but it may be more common for separate customers or other entities to each have their own development repository 120 in the customer's Hub development component 102, as shown. Any given repository could be hosted on-premises, on a private cloud, on a public cloud, or on a combination of the foregoing, as examples. A user interface provided by studio component 122 of the Hub development component 102 is for user-interfacing with the development repository 120.

In particular examples, the development repository 120 may be implemented as a Git repository. The development repository 120 houses metadata specifications that describe various objects, structures, constructs, data, or the like. These and various other aspects of the Hub layer 100 can be maintained as metadata specifications, for instance YAML definitions and/or JSON files. The metadata specifications in particular examples discussed herein describe backend system assets. For instance, each metadata specification can correlate to a given backend system asset, and define a modern data format, different from a data format of the backend system asset, and how to translate between these two data formats. Accordingly, a metadata specification can therefore be referred to herein as a Hub asset since it provides/facilitates modernized access and usability of the underlying backend system asset. Example components of the Hub development component 102 and/or development repository 120 thereof include:

Hub Modules: Modules are collections of Hub assets that describe/represent backend system assets. An individual module is a collection of one or more Hub assets and represents a logical subset of the available Hub assets. The assets could be grouped into logical subsets based on any desired properties or approach. In a particular example, the assets in a given module are specific to the same backend system and with the same connection properties (specific access parameters) to access the particular backend system.

The asset(s) grouped into a module may herein be referred to as being "within", "inside", "included in" or "of" that module and represent properties of various different backend system mainframe/server calls, including, for instance, the fields, data types, connection properties, properties of the backend system, and various other information of the backend assets, including information to use and call these assets. In this manner, the assets can describe parameterized calls and the protocols expected to work with them. A given module can include many different assets, meaning it can include any number of Hub assets describing a corresponding any number of backend system assets.

Projects: Projects are user specifications that leverage module(s) to create a service. By way of example, assume that a module describes properties to connect to a mainframe and that inside the module there are two assets—one for a get_customer_details backend system call to get details of a customer and the other for a get_customer_accounts backend system call to get details of a customer's account(s). On the backend server end, these calls might be invoked by respective parameterized calls using expected protocol(s), including fields/buffers for input of parameters and for output of data. Such fields may be described by the metadata specifications (Hub assets) corresponding to the two backend system calls (these "calls" being referred to as backend assets). The module, provided in the development repository 120, in which the corresponding Hub assets exist can describe how an entity (running software, another computer system, etc.) 'talks' with the mainframe to invoke such backend calls. The module and its assets can therefore be used inside of a project to create a service/API, for instance a single consumer-facing "get_customer" API that takes both the customer details (via 'get_customer_details') and the customer accounts (via 'get_customer_accounts'), combines these customer details into a full view of the customer, and returns to the caller the full view. This is an example service that is provided as an API contract. It is noted that individual calls made to the backend within the context of the service could be stateful and/or stateless. In other words, in the example of an API/service that is exposed and that relies on backend system call(s), the API/service provides intra-service orchestration that can rely on potentially multiple calls to the backend regardless, and those calls may be stateful or stateless. The individual call(s) to the backend need not be separately exposed as available stateless services (e.g. APIs), for instance.

Catalog 124: Catalog 124 is provided within the Hub development component 102 as a combination of user generated and automatically generated information around the assets of the modules of the development repository 120. The catalog can contain nonfunctional artifacts or other information attached to or affiliated with backend assets—items such as documentation, additional information, context, testing results, etc. This information may be important knowledge and context about the assets to facilitate a user or software's understanding of the assets, without being necessary from a functional standpoint, for instance to enable a generator (described below) to generate code.

This information may be useful in situations where calls have a history surrounding them because of their existence in the backend. A system administrator might have important knowledge about how a call has historically been used, situations when it should not be used but instead a different call should be used, file formats for attachments to the call, and any other useful knowledge or know-how about call usage. These are just examples of the context and knowledge surrounding a call. Typically during service development, implementation, and deployment, important information and knowledge may be garnered surrounding a service. The catalog 124 provides users and software a way to add this information into the Hub in a way that is placed and co-located with the modules corresponding to and describing those calls. In addition, there may also be an automatically-generated component that parses information or metadata about a call to extract items to add as context into the catalog 124. Many elements within the Hub can be surrounded by useful context stored in the catalog 124. Another type of context is results of testing the Hub assets. Testing can produce a response, and the test-response pair provides context for call use as described elsewhere herein.

In general, the information in the catalog can help to make sense of backend assets and Hub objects, and therefore contribute to the end-to-end backend asset management provided by the architecture. This helps with both operationally creating digital services and providing a view and single point of access for the user into backend system functionality. In this regard, the catalog 124 can provide a way for users to search and index items in the development repository 120, and potentially also the solution center deployment component 106, based on how these items (assets, modules, or anything else used to build the project) are used in the different projects.

When a user and/or automated process adds assets into development repository 120, typically in early phases of service development/implementation, the user and/or process can at that time introduce into the catalog initial context or other information about the assets. In addition, the catalog 124 can be useful as built projects are run, for instance to catalog runtime information and for analytics purposes. On an ongoing basis, new and useful information related to an asset can be added to the catalog 124 in the form of data, documents, etc. to provide additional context and information.

Figure 2:
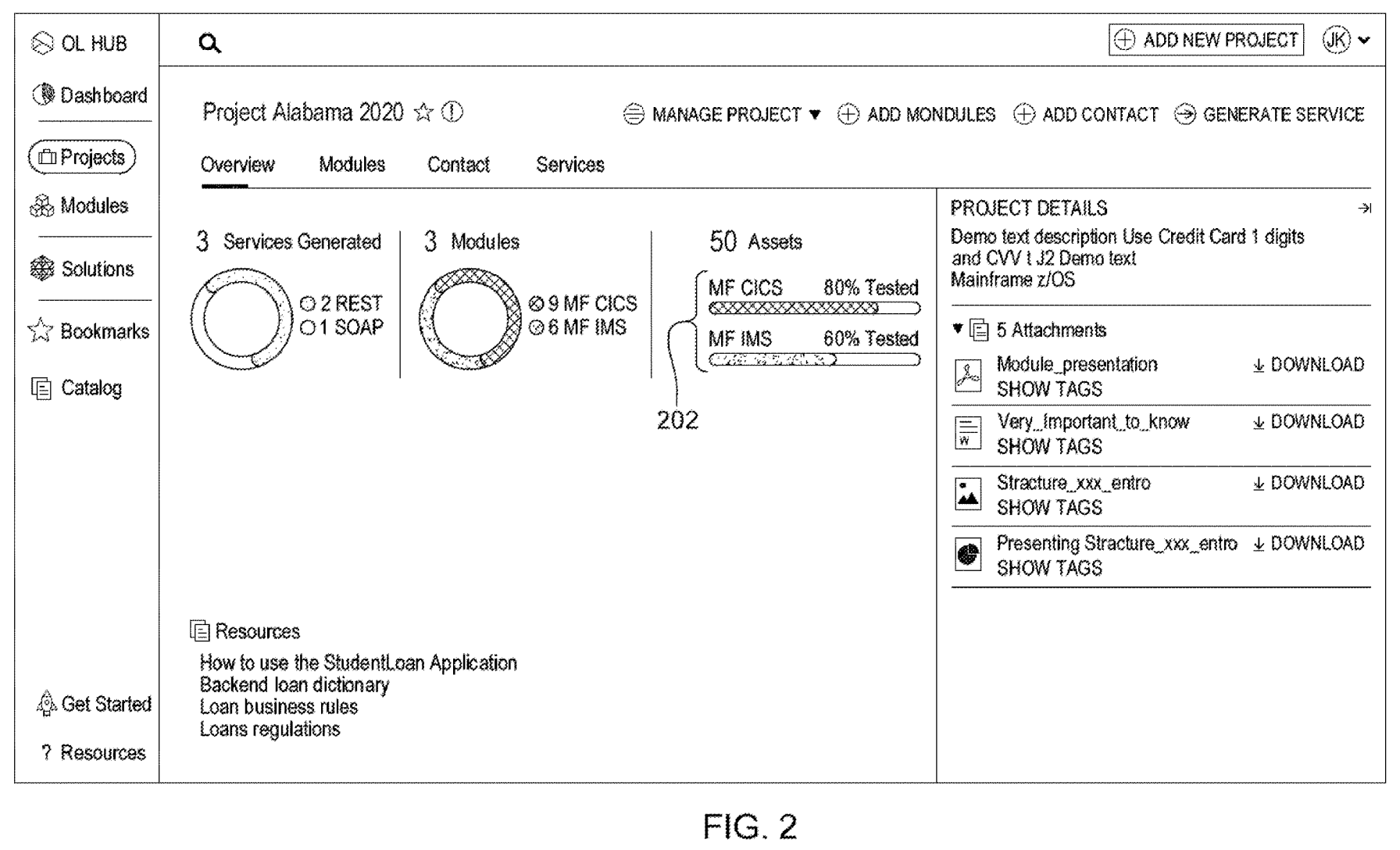

FIG. 2 depicts an example interface presented by a system in conjunction with a customer's use of modules, their assets, and other aspects of a development repository 120 to construct a service. The interface presents details of a project entitled Project Alabama 2020, specifically an Overview screen for that project. In this project, the user has generated three specific services of two different service endpoints (two REST-based, and one SOAP-based) from a generic service description provided in the project. The project leverages three modules and 50 total backend assets across those three modules. Indicators 202 are provided to show a percentage of these various assets that have been tested, and these are broken down between CICS (Customer Information Control System) and IMS (Information Management System) types of assets in this example.

The user has options for the general approach taken when developing a project. Two example options are (i) a contract-first approach and (ii) a contract-last approach. The contract-first approach creates the API contract and then maps various Hub items together to produce that API. The contract-last approach focuses on building-up repository items (assets, modules, etc.) and then generating a contract (API) from the items or building it based on those items. Either approach, when built using user interfaces as described herein, involves mapping outputs of some flow elements to inputs of other flow elements and optionally applying specific solutions (e.g. pre-existing and imported contracts that can be applied to projects, demo projects that are part of examples, connectors that can be applied to projects to generate specific types of services, etc.) provided by the solution center deployment component 106 to achieve desired goals. Example solutions are of selected service endpoints, such as REST, SOAP, Apache Kafka® (offered by The Apache Software Foundation, Wilmington, Delaware, U.S.A. of which KAFKA is a registered trademark), and serverless functions, as examples.

The Hub presents usable functionalities through metadata specifications that describe assets of the backend side and what the user wants to achieve using those assets to produce desired services. There are three approaches discussed herein for the development and deployment of services: full code, low-code and no-code. FIG. 3 presents aspects of the three approaches.

Full code approach 302: The full code approach can use an IDE to generate a complete Java (as one example) project and executable code at user/developer direction. This approach offers extensive customizability. The full Java project might be used as-is, but often the customer may desire to use it as a starting point to add business logic, for instance in cases where a generated API involves a lot of regulatory aspects to be handled properly, or when added functionality is needed. As shown, information (such as copybooks in the case of COBOL) are used in interfacing the IDE 304 to the legacy system 306 (as the example backend system here) to develop a project 308 to be offered as a microservice in this example, and generating the appropriate code therefor.

It is also noted that the full code approach can be done through the CLI, in which the full code is generated by way of a user/developer interacting with the CLI to generate the code. This may be advantageous to developers used to working in a CLI utility rather than an IDE, in particular when automation can facilitate aspects of the service development. The generated full code could optionally then be pulled into an IDE as a project for any customization or other purposes.

No-code approach 310: On the other end of the spectrum is a no-code approach. This uses a CLI 312 (as one example) to harvest backend system 314 information and develop the metadata specification files in the repository 316 to be added to modules. This offers much-desired simplicity because it removes a significant amount of configurability relative to the full code approach. As shown, information is used in interfacing the CLI 312 to the backend legacy system 314 to produce the metadata specifications for the assets of the modules in the Hub repository 316. Polyglot services 318, for instance container images, can be predefined by a developer of the Hub or another entity. They can then be made available for users to use in project to consume configuration/specification file(s) to make the predefined executable component work for their desired purposes, as explained herein. Container images could be deployed by the user into a desired endpoint deployment environment/ architecture that supports container execution. Docker is an example container format and platform. The containers with predefined engines can take the project specification, as a generic definition of the service to be deployed and which pieces-together metadata specifications, as a directive of how the containers are to execute to provide various functions that make up the service 318. Each container may correspond to a service endpoint that is selectable by a user. For instance, one container may be configured to expose the service for access according to the REST protocol, while another may expose the service according to the Kafka protocol. No-code deployments are useful for general-purpose services effected by loading and running metadata specifications without generation of additional program code. The predefined executable components, containers for instance, consume project specifications and 'run' them in instance(s) of a container image. In some examples, user provided customizations relevant for the particular service endpoint selected are presented as a configuration used by the container to expose according to the selected service endpoint, when desired.

The same container image could be instantiated again to execute and provide a different service pursuant to a different project specification. By way of specific example, a container could at one point load the specification for a 'get_customer' service specified by one project and then can be refreshed (re-instantiated or reset) to load the specification for a different 'get_accounts' service specified by a different project.

A no-code deployment is akin to a recipe (project) to make a final product (the service) and the preconfigured and predefined container executes (i.e. no additional code generated) according to the recipe to produce the product. From the customer/user side, there is no writing of executable code; instead, the customer builds project specifications, optionally provides customizations/overrides relevant to the service endpoint desired, and the containers are previously defined and configured and provided to consume those specifications and execute according to them. As is explained elsewhere herein, software termed a 'flow engine' can be configured to parse project specifications and customizations and run them in specific ways. This is in contrast to the full code approach 302 where the customer/user generates the full code (e.g. Java).

With the simplicity of the no-code option also comes a relative lack of configurability beyond the project specification because the container images are predefined. To customize the execution under the no-code approach, a container image itself would be reconfigured.

However, this no-code approach, if compatible with a customer's needs, provides the easiest maintenance because no code is being maintained by the customer and there is no code lifecycle. Being only specification configuration-based, a user can start from a very complex mainframe backend system and easily prevision APIs for it by leveraging metadata specifications to build project specifications for feeding into predefined and established containers (as examples) to execute those project specifications. This may be particularly useful in cloud-based approaches to legacy or other backend system integration.

Low-code approach 320: The low-code approach sits between the no-code and full code approaches in many respects. The low-code approach is a blend of preconfiguration and processing customization. It may be most useful when the customer desires some project code to be generated to customize the service, for instance when it is desired to deploy the service in specific ways that are not compatible with a preconfigured executable component, such as a container image, implementing the flow engine. The customer might want to deploy to a hybrid cloud platform such as OpenShift (offered by Red Hat, Inc., Raleigh, North Carolina, U.S.A.), add some crosscutting concerns, provide a specific way of handling security or analytics, and/or add orchestration that combines two modules, as examples. All of these could be templated in a low-code approach. Crosscutting concerns, for instance, may be needed to fit the service to particular organizational standards, even if no additional business logic is needed. Similar to the no-code approach, the low-code approach can, in this example, interface a CLI 322 to a legacy system 324 using information such as copybooks to produce the metadata specifications for the Hub repository 326. These are used in generation of project 328 but not all the tooling are provided for full coding as would an IDE.

As in the no-code approach, a flow engine is also used in the low-code approach. The code of the flow engine itself may be obscured from the user, but the user can have access to view and modify the customized code that is generated based on the customer's project. In this regard, the low-code approach includes exit or 'intervention' points from execution by the flow engine (e.g. before sending a response, before getting a request, after getting the request, etc.). An intervention point provides the user a point to intervene in flow engine execution in order to perform customizable actions, for instance to add functionality via written code before returning back to the flow engine processing. As with the no-code approach, a predefined executable component implements a flow engine and executes based on the generic definition of the service to perform the service, optionally using customizations, provided by the user, specific to the selected service endpoint. Some/all Kafka 'topics', for instance, might need to be specified by the user in order to guide the system. In the low-code approach, however, one or more intervention points are defined for execution of user-provided customized program code to intervene in flow engine execution and perform customized actions provided by the user.

The flow engine itself could be deployed on-premises or in the cloud, as could the customer-defined code. More generally, deployments under any of the three approaches discussed could be provided in the cloud and/or on-premises.

Further details are now provided regarding how information is incorporated into the repository and how items can be deployed from the repository.

CLI Integration Component (FIG. 1, 104): The CLI integration component 104 is an interface component implemented as a command line interface in examples. A CLI is a standard (though not the only) way for developers to work with backend systems, particularly communicating with them to pass requests, responses, data, and other information, and to build an understanding of their capabilities, functions, calls, transactions, etc. by harvesting information from them. While CLI communication can be done by a user at a traditional terminal, it also can be useful for automating aspects like function calling, execution on the backend system, and the data exchange surrounding legacy system execution. Referring to FIG. 1, an automation agent 130 of the CLI component 104 is used in this regard.

In terms of building understanding about a backend system, information of the mainframe, such as a copybook in the example of COBOL, or other descriptions of the data may be obtained and used to generate/create Hub assets (metadata specifications) and modules from the information. The modules/assets can then be pushed into the Hub development component 102, e.g. the development repository 120 thereof. This communication can be structured akin to a conventional repository system like GIT, with a local directory providing a staging area from which created objects are then pushed into the Hub development component 102. Once in the Hub development component 102/repository 120, they are available for use.

The automation agent 130 of the CLI Integration component 104 can be configured with the various CLI commands that allow harvesting of metadata and other information from the backend system 110 to enable the Hub platform to create the metadata specifications and modules, perhaps with user assistance and/or verification, and push them into the Hub development component 102, as well as to generate a default project. If a user desires to generate a default project, such as pass-through project, the user can do that. The user can also deploy the project as a service using a deployer (e.g. a deployer of the deployers component 140 of the solution center deployment component 106 described herein). This allows the user to leverage a greater level of automation because many of the tasks that the user can perform with the studio component 122 (discussed below) of the Hub development component 102 the user may also be able to do with the CLI. As examples, the CLI supports parsing, combining, testing, uploading, generating, and deploying, which is a complete development operations (DevOps) design to deploy process, all scriptable.

A connector framework module 132 of the CLI integration component 104 can use and manage 'connectors' and different versions thereof. A connector may be a bundled set of parsers, generators, and user interface (UI) logic to create and prepare assets/modules out of an underlying backend assets and modules. As discussed elsewhere, the solution center deployment component 106 might host connectors for one or various different types of backends. Connector may be generated by the service provider of the Hub and/or another customer. A customer with a backend mainframe might utilize the CLI or other component to pull from the solution center 106 connectors that are relevant to the customer and use those to access the backend. In other examples, a customer specifies or develops its own component for this access and can optionally provide it to the Hub development component 102 and/or the solution center 106 for reuse.

In connection with items of the solution center deployment component 106, a Hub licensing mechanism may be put in place that would license the customer to pull from the solution center deployment component 106 various connector(s) or other items made available so that the customer does not need to separately generate the connectors and other items. The customer may be prevented from pulling from the solution center deployment component 106 items to which the customer does not have a license.

Still referring to the CLI integration component 104, a test agent 134 provides a testing facility on the CLI for testing Hub assets, and therefore the modules that contain them, to build a knowledge and history (e.g. part of the context discussed above) around the functionality of those objects. Metadata specifications, as Hub assets, and modules, can be tested directly and before being incorporated into the development repository 102 and/or before being used as part of any services/APIs in which they may be put to use. Optionally these can be tested at any time, for instance after they have been put to use. An initial test of an object provides testing results (in JSON format for instance), including representations of the request(s) of the test and the response(s) thereto. The test results can then be pushed into the Hub development component 102 (e.g. the test center 126 and/or catalog 124). Automated periodic/aperiodic/continuous testing of the object can be performed by the test center 126 to update or add to the test results being maintained in the Hub. Because the backend assets are 'live' functionality subject to availability, change, and other factors, it can be beneficial to retest them. A backend system may or may not change in terms of functionality, data types, availability, connection properties, and so on. Testing can help to identify these situations to inform corresponding updates of the Hub assets.

Testing can capture information about what data is being sent and received in connection with use of the object. They can check that the Hub asset, by way of the metadata specification, can successfully integrate with the backend asset. Such integration can include accuracy in the presentation of calls and/or data by the Hub asset, whether the backend asset is alive, whether it has changed, whether connection to the backend server is alive, whether data conversion pursuant to the metadata specification is proper, etc. Thus, in examples, the testing tests whether the automatic format conversion pursuant to the metadata specification works properly in terms of data that is to flow through the service. The testing can test that the data passed between the metadata specification and the backend system yields the expected results in return. Since even legacy or other backend systems might still 'evolve', this testing can be useful to identify whether/when a backend system changes in some way at a future time such that the metadata specification no longer works as intended. In this case, the metadata specification could be modified or recreated after the change to adapt accordingly. It is also noted that testing of an asset can be accomplished in embodiments without generating any additional code specific to that object, as explained elsewhere herein.

In this manner, when the system generates Hub assets and modules, and optionally before pushing them into the Hub development component 102, the CLI or other interface can add tests and associated the assets and modules with those tests. A process can then, and optionally iteratively, test a metadata specification, which includes invoking actions on the backend system pursuant to the metadata specification, and obtain results in response, then assessing based on the obtained results whether the metadata specification successfully integrates with its corresponding asset of the backend system. As noted, successful integration of the metadata specification with its corresponding asset can include, as examples, successful translation of data pursuant to the metadata specification, availability of backend asset, and/or availability of a connection to the backend system. Such testing and assessing can be repeated one or more times across a time frame to verify, based on results of the repeating, that the metadata specification continues, across the time frame, to successfully integrate with its corresponding asset of the backend system.

It is noted that the assets and modules may not be something that themselves can execute and run as an executable could. Despite this, the assets and module objects may be testable even in that raw format in which they are specified. This can be useful because testing of objects provides a level of confidence and proof for users to know they are dealing with items that are, and remain, relevant and true. Since the objects can be continually tested over time, the user is assured that they remain relevant and working as proven by the test results, regardless whether any code has yet been generated based on them. Objects can be run through real queries or actions to provide a true version and structure of response data. Using the get_customer_details example, testing might show the structure of 'good' customer detail data, example input data to produce such 'good' customer detail data, and an example response when the input data was provided. This provides context for the objects. Assuming the test is successful, the object can be pushed into the Hub development component 102 and/or maintained therein with confidence that it is working as expected.

Testing by the Hub development component 102 can be performed by a testing component (test center 126) that is a predefined object. This testing component can run/execute to consume a raw format metadata specification (e.g. a YAML specification or JSON file) and execute it as if the specification were instantiated and deployed as actual code. The metadata specification itself, which might eventually be generated to a Plain Old Java Object (POJO) with annotations, for instance, may be testable in its specification format regardless whether it had previously been used in any project or generated into code as part of any service deployment. The metadata specification can define items like the input, the output, the data types involved, and so on, providing a testable definition of the asset in terms of going between the backend (e.g. legacy) format and the other (e.g. modern) format of the specification. The testing component can convert input data (for instance in JSON format) pursuant to the metadata specification into something that the backend system understands and can process. The backend system can process this and return to the testing component a result in the language of the backend system. The testing component can then convert that result based on the metadata specification into something that is readable to the developer, for instance data in JSON format.

The full code, low-code, and no-code approaches can each function similarly in some regard with respect to the use of the metadata specifications: In the no-code approach, a predefined executable component, such as a predefined engine/container, is provided that the user effectively cannot unilaterally customize. The predefined engines/containers would need to be changed if customization of their function in terms of processing metadata specifications is desired. Use of this predefined application is akin to a black box that knows how to consume a metadata specification and perform business logic described thereby as a flow. The underlying generic definition of the service is provided and the particular predefined component is configured to expose according to a given service endpoint. In so doing, default service-endpoint-specific specifications may be used. POST, GET, etch methods are relevant for RESTful protocol, but these are not relevant to Kafka, which uses topics, for instance. Overlaying the generic description and these potential defaults can be a user selected/manual specification providing tweaks or customizations specific to the service endpoint, and the predefined component can take such definitions as well, passed in as configuration information. At runtime in the no-code approach, the predefined component can intake the generic definition plus any specific configuration, should they exist, and execute according to them.

In the low-code approach, a project is produced that knows how to consume the metadata specifications to guide component execution/produce something executable, but the user has the option to add additional logic at intervention points for whatever specific reasons the user has, e.g. crosscutting concerns such as security, compliance, logging, common logic. In the full code approach, the metadata specification can be translated into actual classes/code, editable and accessible/viewable to the user, that will then run in, e.g., a microservice.

Testing can be performed automatically and periodically/aperiodically from the point of creating the metadata specification. In some embodiments, the Hub can alert users during development or maintenance of a metadata specification when an error can be expected (on account of testing showing something different from what the user is expecting or providing). This by-the-way testing behind the scenes and in real-time from specification generation can be useful to notify the user when, based on the current specification, there appear to be issues with what the user expects or intends to happen. Such notification can be implemented in the studio component 122 of Hub development component 102, where the CLI or graphical dashboard indicates each time a user views details of an object whether the object has passed testing and allows the user to view details of that testing. Additionally or alternatively, the test center 126 of the Hub development component 102 can be provided in the interface to provide an overview of all the tests of all the objects in the repository 120.

In some examples, the first activation of a test records what was sent to and what was received from the backend system. That can be used as a baseline for the next time the test is run in order to see whether the same results were returned.

Referring back to FIG. 1, the Hub development component 102 and repository 120 thereof houses a customer's specific Hub assets, modules, items that describe the customer's organization, functionalities, projects that the customer is creating, etc. Similarly, the solution center deployment component 106 of the Hub layer 100 can store analogous, but more generalized, content e.g. assets, modules, etc. that is not specific to any particular single customer. Further details of the solution center deployment component 106 are now provided:

Generators 142: Projects developed using metadata specifications in the Hub development component 102 are to be deployed but decisions are to be made about how to specifically deploy them. A customer might want to deploy a service for any of varying service endpoints (e.g. Kafka, REST, etc.) and in any of varying deployment architectures, for instance as a Java runtime, a microservice project with a restful interface on a particular cloud provider, a JavaScript NodeJS cloud function on another cloud provider, or a .NET application, as examples. Generators 142 of the solution center deployment component 106 specify how to generate a service in accordance with a selected one or more service endpoint. The generators 142 themselves may be generalized items, not specific to any given project or metadata specification provided by a customer. From a single project definition, the different generators 142 of the solution center can generate for different deployments depending on what the customer selects.

Generators can exist in the solution center. The user can select a generator, which takes definition(s) of the service and make them into something that is deployable and real. In the no-code approach, a generator may not be used, as the definitions are taken in at runtime by the predefined executable component.

Each generator can correspond to a given approach for deployment, including for instance a specific service endpoint and deployment architecture for that endpoint.

Generators 142 can be provided by any of various entities, such as a provider of the Hub 100 and/or third-party generator producers, for instance the developer of a particular deployment architecture.

Contracts 144: These refer to standards that might apply to given service offerings. Take an example of a service that performs a money transfer transaction to transfer money from one account to another. A customer might want to create a contract out of the money transfer. There exists a predefined specification called the Open Bank Project, which provides a consortium or standard for how to coordinate digital banking. An industry or other entity might expect a service provider to adhere to that predefined specification. As one option, a customer could recreate a money transfer that conforms to the applicable Open Banking Project standards. On the other hand, and in accordance with aspects described herein, a solution center contract 144 could be predefined based on that specification and be made available for a customer to pull into its Hub development component 102 for use, without having to separately recreate a conforming money transfer. In this case, the customer would simply add to its existing project the appropriate modules/assets for the backend calls to effect the money transfer transaction, pull from the solution center deployment component 106 the specific predefined contract(s) 144 for money transfer, and then provide the proper mappings as described in connection with the user-facing interfaces of the studio 122 component. The predefined contracts 144 may be generalized in that they are not specific to any particular customer's backend system and are therefore reusable. Any individual customer can then use its Hub development component 102 to essentially adapt the particular backend system to the functionality provided by the predefined contract of 144 to accomplish a service in compliance with the overriding standard.

Much of the data in the repository 120 may be metadata specifications, as explained above. The specifications are designed to be agnostic and general, not adhering to any specific technology stack. The same is true of the studio 122 and development of a project using the studio 122. During development, there need be no predefinition at the project level how a service will ultimately be generated for deployment. It would be of no importance whether the user ultimately intends to deploy the service as a restful API with HTTP methods or a Kafka-based payload, for instance. Thus, the project can be presented and built in the user interface (e.g. provided by studio 122) as a general/generic representation, if desired. Alternatively, a given service endpoint ("specification-defined protocol" for access) and/or endpoint deployment architecture/environment could be specified at the beginning of development or at any point thereafter if the user preferred to work specifically in one architecture.

Figure 4:
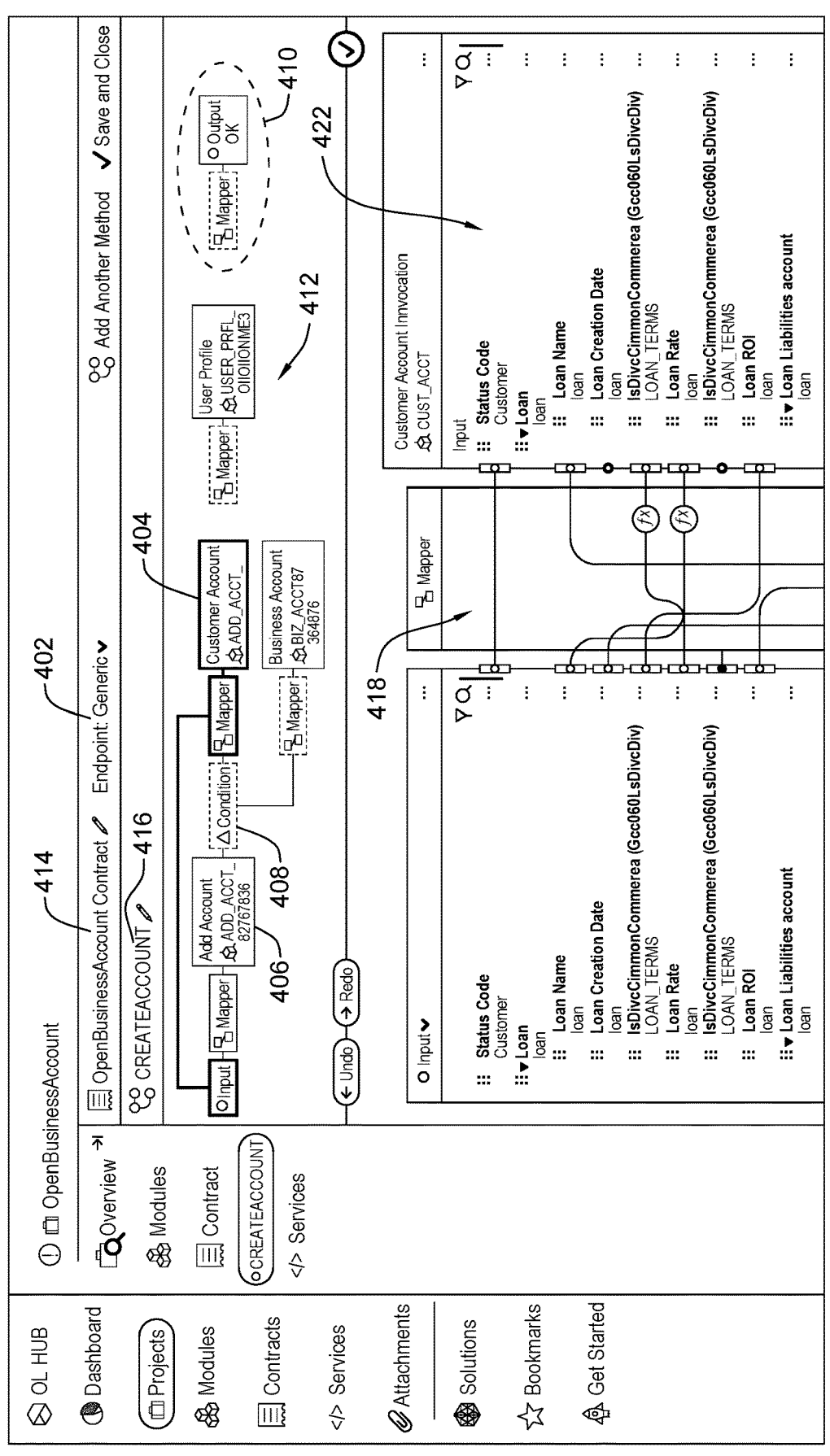
FIG. 4 depicts an example interface of a Hub studio for service development/deployment in accordance with aspects described herein.
Figure 8A:
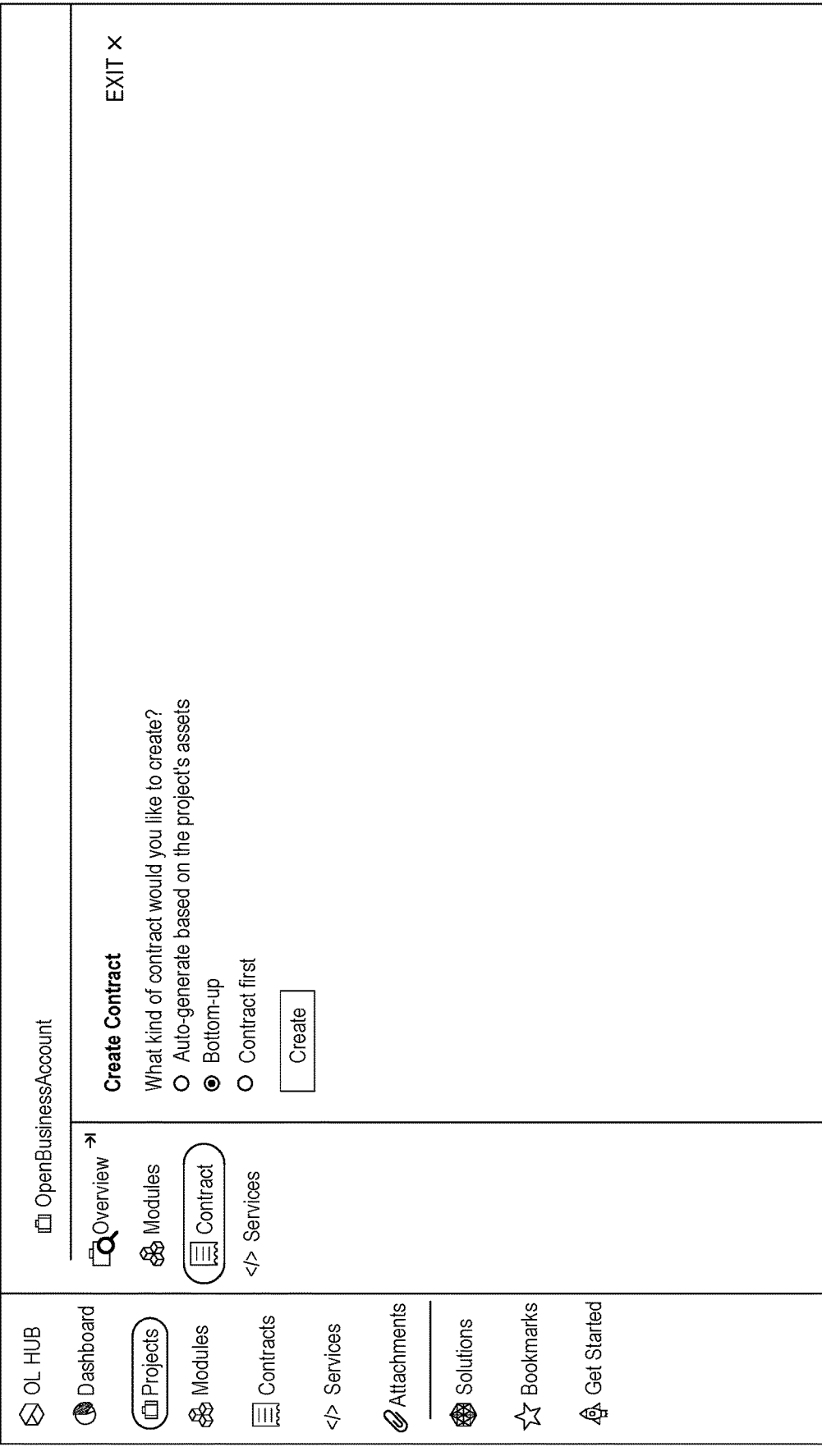
FIGS. 8A-8AD depict example interfaces of a Hub studio presented when a user creates and deploys an example project, in accordance with aspects described herein.

The interface of studio 122 presents service endpoint selection element(s) (such as a pull-down list of selectable service endpoints) for the user to specify a specification-defined protocol for a given service (see, e.g., FIGS. 4, 8AA-8AC). The endpoint is to be deployed into a given deployment environment. The deployment environment correlates to a language in which the service will be deployed, and the service endpoint is deployed on the environment the service endpoint (e.g. Kafka, REST, SOAP, etc.) relates to the protocol involved. The selection element for selecting a service endpoint is used for adding protocol-specific items. POST, GET, UPDATE, DELETE, as examples, are part of restful HTTP based methods but are not relevant for Kafka. Thus, to the generic definition of the service can be added protocol-specific items as an overlay of sorts on top of the generic definition. It may be the case that these items are selected automatically by default, subject to user customization/change as hints for a generator for when the service is generated and deployed.

The service endpoint correlating to a protocol for access may be specification-defined. REST, Kafka, and SOAP are all example such service endpoints. Any deployed endpoint is deployed on an architecture (a "deployment architecture"). The deployment architecture can encompass any of various hardware and software selections. Examples deployment architectures might be Java-based, .NET-based, cloud-based, premise-based, version-based (e.g. for a runtime library), and so on. A service is deployed to a given deployment architecture/environment and this deployment exposes an endpoint according to the specification of what is exposed. The service may be deployed in some embodiments as program code configured for execution in the deployment environment to expose an endpoint accessed according to the selected service endpoint. In the no-code approach, the service can be deployed to a selected predefined executable component (that is specific to a selected endpoint) as a generic definition/specification of the service (possibly with user provided customizations specific to the selected point) to be consumed by the predefined executable component that run on the endpoint deployment architecture and expose an endpoint accessed according to the selected endpoint for which the predefined component is specified. Different such predefined executable components can exist for different types of service endpoints.

Returning to the user interface of the studio 122, if the selected endpoint is selected to be REST, then the interface can prompt the user for (or auto-select a smart default for) the specification of REST-specific attributes for the generic flow elements that the user specifies when building the project. Example attributes would be method types (POST, DELETE, etc.) and other parameters, such as indications of which items are query parameters and which are payload parameters, as examples. Additionally or alternatively, if the user selects a different service endpoint—Kafka for instance—the interface can update to prompt (or auto-apply a smart default) for appropriate Kafka topics and other Kafka-specific information. Different information may be needed and obtained from the user depending on the particular service endpoint that the user selects. A Kafka topic is not relevant for a REST protocol deployment, and a POST method is not relevant to a Kafka deployment. Further, neither the Kafka topic nor the POST method are relevant to the generic flow representation in which no specification-defined protocol has yet been specified. It may be in practical examples that no information may be needed from the user, as, in embodiments, proper defaults are known and/or learned.

Accordingly, with a generic definition for a service being maintained, the user can move very quickly between types of endpoints and even deploy to additional endpoints in the future. The user, upon selecting a given service endpoint (correlating to a given specification-defined protocol), can be prompted, if needed, to further specify the attributes relevant to that protocol for effecting the generic functionality that was defined. As noted, in some situations, smart defaults might be used to automatically select/populate various attributes, and in these situations the user can specify adjustments to override the smart defaults if desired. As an example, 'customer I.D.' might be specifically overridden to be a query parameter instead of a payload parameter. Such an override is not relevant to Kafka because Kafka does not have query parameters but in the context of HTTP RESTful interfaces, a RESTful generator can know to generate the specific parameter as a query parameter instead of a payload parameter. The selection of a given protocol by the user can eliminate all items that are not relevant for that protocol and present items that are relevant for that protocol. The protocol itself can be layered in a way that has a baseline and then add-on aspects on top of the protocol.

This provides a way of future-proofing the development of the service in the sense that new or additional service endpoints can be added over time and available as possible deployments as long as generators 142/deployers 140 are provided that can take the generic definition of the flow and adapt it to (generate code for) the added endpoint type. Generic definitions of flows for backend system interfaces, and more generically any business processes, also caters to searchability, portability, and adaptability. The generic definitions in a project can be deployed very quickly to any of various types of technologies, technology stacks, languages, cloud vendors, etc. corresponding to different service endpoints and deployment architecture(s). This can be especially useful to make way for newer technologies since endpoint technology changes rapidly and technologies quickly become obsolete.

Solution Modules 146: It is common with backend systems for the backend system owner to customize the system (e.g. legacy software) to the point where it looks potentially very different from how it was delivered by the vendor. That is, two or more backend systems based on a common vendor platform (legacy software as an example) might be customized differently by or on behalf of each customer such that what is in production on each of the customer backends look unique in comparison to each other. This informs the concept explained above of generating services to interface with a particular backend system based on metadata from that particular system and that described the assets of that system, rather than on a generalized idea of what the metadata should look like based on how the vendor originally developed the backend software. The interfaces to the backend system may have been customized to such an extent that interfacing pursuant to what the system looked like as originally developed by the vendor may not work.

Despite this, some commonality might exist between different backend systems for different customers. In other words, some backend systems might maintain some of their original, 'vanilla', aspects from their inception. Additionally or alternatively, some backend systems across different customers may have been adapted from their original form in a manner consistent across the different customers such that even after these changes there is some overlap in how something might interface with each of those different customer systems. Because of this, some modules, or even individual Hub assets, that each customer might otherwise independently create from metadata of their own backend system can be predefined and provided in the solution center deployment component 106 as solution modules 146. Though these are separate from the modules of the repository 120 discussed above, they can be pulled into a customer-specific repository 120 (as a module thereof) without the customer undertaking the process of separately creating that module from actual metadata taken from the customer's backend system. After downloading into the customer repository 120, such modules are available for use in a customer project. This can streamline service creation; API specifications can be predefined as they are standard and consistent. In some examples, software vendors that develop software running on backend systems could introduce such modules 146 into the solution center deployment component 106 to make it easier for customer integration.

In this manner, a backend system owner can direct the Hub to both create and provide in repository 120 its own modules of assets generated from metadata of the backend system, and can additionally pull into repository 120 predefined modules 146 from the solution center deployment component 106 as long as that backend system maintains some standardization or commonality in terms of interacting with it and there are appropriate modules 146 available in the solution center deployment component 106.

Deployers 140: Deployers are scripts describing technical aspects, such as requirements and dependencies, of deploying to specific environments. They provide a tactical portion of the 'devops pipeline'. In examples, they are Continuous Integration/Continuous Delivery (CI/CD) pipelines that deploy a service for a specific environment. A deployer might specify that a particular container instantiation is needed or a particular command is to be run, for instance. Eventually, following the script, the final result is a deployment in the specific environment desired. Deployers work in tandem with generators 142, where a generator generates(s) artifacts that the deployer deploys to a particularized environment. Example generators 142 might deploy to Open-Shift, Amazon Web Services (offered by Amazon.com, Inc., Seattle, Washington, U.S.A.) or the OpenLegacy API Integration Platform, OpenLegacy Hub, or Open-Legacy Cloud (offered by OpenLegacy Technologies, Ltd., Princeton, New Jersey, U.S.A.), as examples.

Much like modules of the Hub development component repository 120 or of the solution center deployment component 106, deployers 140 can be sourced by a customer from the solution center and used as-is or customized. Alternatively, the customer can have the option of creating a deployer from scratch and maintaining it in the customer's Hub development component 102 and/or the solution center deployment component 106.

Templates 148: Predefined projects can be provided in the solution center 106 as templates/samples for customers to view and refer to. A customer can pull an entire sample project into the customer's Hub development component 102 as a starting point or reference.

Snippets 150: Referring back to the intervention points mentioned previously in connection with the low-code approach, snippets 150 are predefined intervention point processing examples. A customer can pull a snippet into a project to present the customized code to run at an intervention point. The snippet code could be used as it was provided from the solution center deployment component 106 or it could be customized by the customer.

To illustrate, assume a simple service flow that receives an input JSON request, maps data of the request to fields of a mainframe function call, calls the mainframe function, receives a response from the mainframe, and maps fields of the response to fields of an output for providing back to the requestor. The flow might have defined intervention points, such as (i) before mapping the input to fields of the mainframe function, (ii) after mapping the input to the fields, (iii) after receiving the response, and (iv) after mapping the fields of the response to the output. Intervention point (i) might be used for customized code to perform look ups in an organizational dictionary and validate that the field names that the request is being mapped to are still valid and not obsolete. This could be handled by a snippet.

Snippets can be organization-specific, as in this example, but there could also be snippets that are more generalized. Some organizations might desire a particular series of generically-applicable tasks to take place at a common intervention point. Snippets can be developed by the customer and maintained within the Hub development component 102 or taken from 150 the solution center deployment component 106 (and optionally customized with credentials, field names, etc. as appropriate).

Solutions provided in an example solution center deployment component 106 may be, in general, more generic than what is in any given repository 120 of a Hub development component 102 for a customer. Further, it may be possible for customers to have and maintain their own private solution center deployment component in comparison to a generally-available solution center deployment component 106 that is available to multiple different customers. A given customer might connect with more than one solution center deployment component, for instance a generally-available solution center deployment component 106 and the customer's own private solution center deployment component. A private solution center deployment component might be beneficial when there are different sub-organizations or teams within a larger organization, in which each sub-organization is to have its own Hub development component 102 and access a private solution center deployment component that houses solutions that are applicable across the different teams but still specific to that particular larger organizational entity (and therefore separated from a public solution center deployment component 106 which the organization/sub-organizations may or may not access as needed). One team might be responsible for defining the API and another team responsible for implementing it. The definition team can focus on contract definition to define the ideal contract for the particular situation and import the specification into the private solution center deployment component as a contract, where the solution center is private to that organization but 'public' insofar as it is accessible to all of the sub-organizations/teams. Meanwhile, the implementation team that focuses on contract implementation can pull into its Hub development component repository the contract that was placed and now exists in the private solution center deployment component for the organization.

When a project constructed via CLI 104 or the Hub development component 102 incorporates an object from the solution center deployment component 106, it may pull a version of the object from the solution center deployment component 106 and that object may be contained within the project without any runtime or other dependency on the availability of the solution center deployment component 106 or the persistency of that object in the solution center deployment component 106. Similarly, a project that is generated and deployed for an architecture can be self-contained and not dependent on the Hub 100 itself, if desired. An example optional exception is that under the no-code approach specifications are to be pulled at least at a load time from some source for flow engine execution. That source can, in some embodiments, be the repository 120 of the Hub development component 102. The repository 120 could, for instance, act as a container configuration server so that at runtime when a container image is instantiated, it can pull the definition (including any service endpoint-specific customizations) from the repository 120 as the configuration server. This is an optional embodiment of runtime or load-time dependency; the customer could instead use a different configuration server, or perhaps package the project as a self-contained executable entity such as a .jar file.

Referring to FIG. 4, shown is an example interface of the Hub studio 122, specifically an interface depicting a visual representation of a flow 412 for execution by the flow engine. The flow engine can encompass two aspects: an interface/graphical portion such as depicted in FIG. 4 and other figures, provided by, e.g. studio 122, where a user graphically defines flow, and a runtime component that runs that built flow. This latter aspect exists on the generated service or the predefined no-code executable component as a parser.

The interface of FIG. 4 enables a user to construct and manage the flow 412 for the runtime aspects of the flow engine. Here, the contract being developed is an OpenBusinessAccount contract 414 with a CreateAccount module 416. Below the module name CREATEACCOUNT is a flow 412 in the process of being built. Below that are connections/mappings 418 between inputs 420 and outputs 422. The flow indicates how items are mapped together and therefore how they work together to combine and use data, and progress through the flow. In the low-code approach, the flow would indicate the intervention points and enable the user to call out to customized code at those points.

In some embodiments, the user simply connects inputs to outputs based on object names, optionally remapping where necessary for the different elements to work together to form the complete flow. All of this can be done without working with or generating any executable code; instead, in accordance with aspects described herein, flow components have been abstracted as metadata specifications with attributes mapped to other attributes to define data handling.

Element 402 is a service endpoint identifier. This element is provided for the user to select between the generic definition (of this module) and a service endpoint (specification-defined protocol) as explained above. Here, the element 402 indicates Endpoint: Generic, meaning this is the technology-agnostic, generic definition of the flow for any endpoint, and not specific to any particular service endpoint. Element 402 might include one or more service endpoints for the user to select if desired to deploy according to a selected one of those service endpoint types. Examples include but are not limited to RESTful, Kafka, SOAP, and gRPC Remote Procedure Calls (GRPC).

This approach can be useful in contract-first developments where the API team works in a particular interface description language, such as Swagger, developed by SmartBear Inc. d/b/a/ SmartBear Software, Somerville, Massachusetts, U.S.A. Swagger definitions are very common but they are REST-specific. The API team can work in Swagger definitions and import them into the solution center deployment component 106. The technology-specific aspects of the definition (e.g. the RESTful aspects) can then be separated as 'overrides' from the rest of the definition which is maintained as technology-agnostic, generic interfaces. This enables a generic definition of the flow in a project while providing some technology-specific overrides for specific service endpoint(s) (e.g. REST in this example). It also enables additional endpoint types to be supported by starting from the generic definition and applying appropriate overrides specific to a selected other service endpoint.

When a user selects a particular service endpoint using element 402, the user can add to or modify items of the flow that are specific to that protocol—a GET method instead of a POST method for instance. These can be overrides to some default that is, or may be, provided. Each endpoint type can provide a subset of overriding attributes specific to that protocol. In Kafka there are no methods but there are for REST architectures. If the user selects a REST endpoint type, the interface can change to prompt for (or automatically specify as a smart default) an appropriate method, such as POST or UPDATE. This provides a technology-specific override to the generic definition. If the user selects to deploy to Kafka as the endpoint type, these REST overrides can be disregarded but there may be other overrides needed for the Kafka deployment. Some smart defaults could be good enough that the user rarely or never needs to manually change anything, but the flexibly is there.

Structuring the flow definition and endpoint-based tailoring thereof in this manner also provides for adaptability to new technologies. The generic representation is always available so that if a specification-based protocol is developed and/or is to be supported, this can be added as an option to the service endpoint selection element 402 and the appropriate transformations can be applied to the generic representation to arrive at an endpoint-specific deployment based on that service endpoint.

Figure 8B:
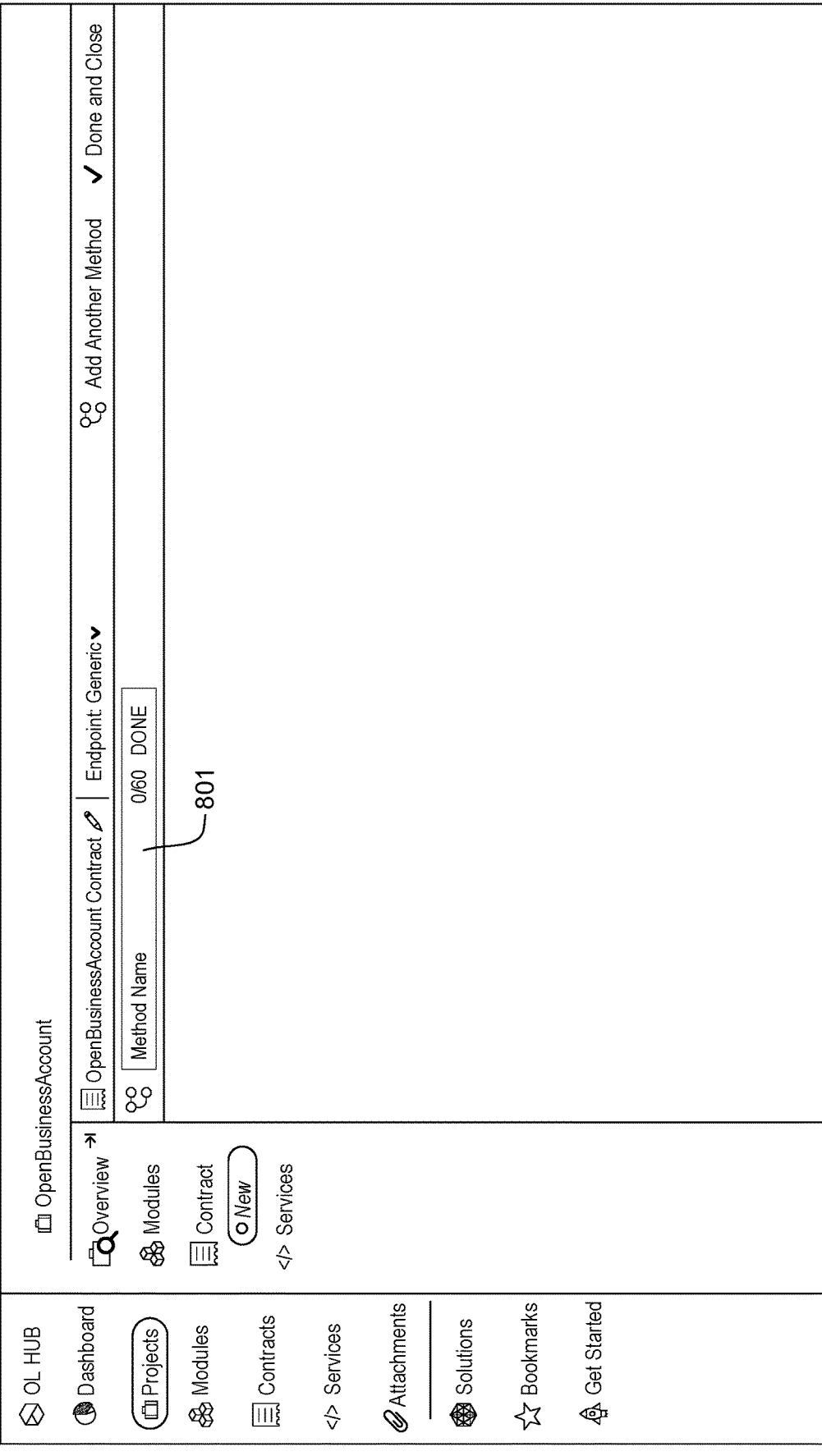
Figure 8C:
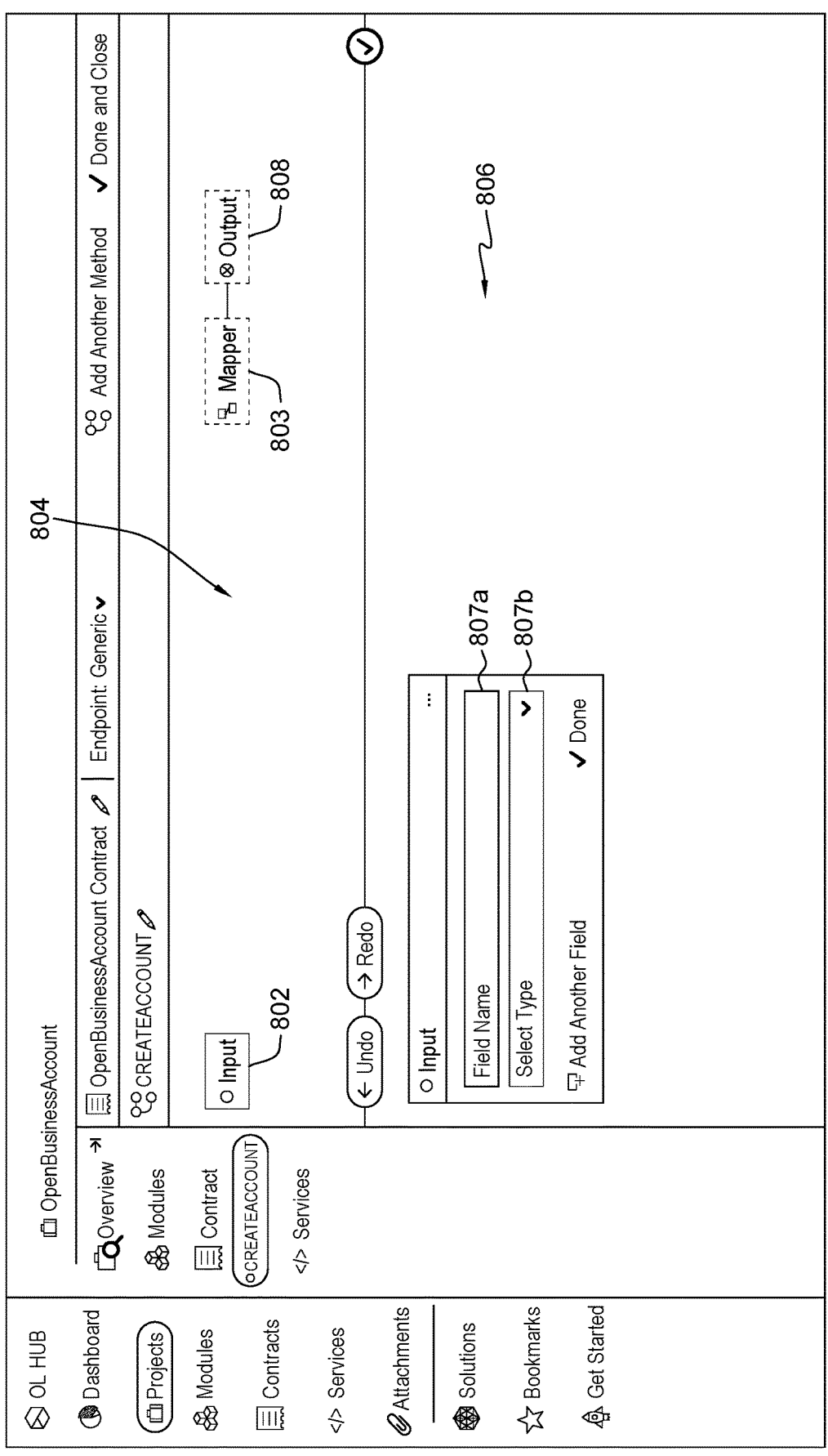
Figure 8D:
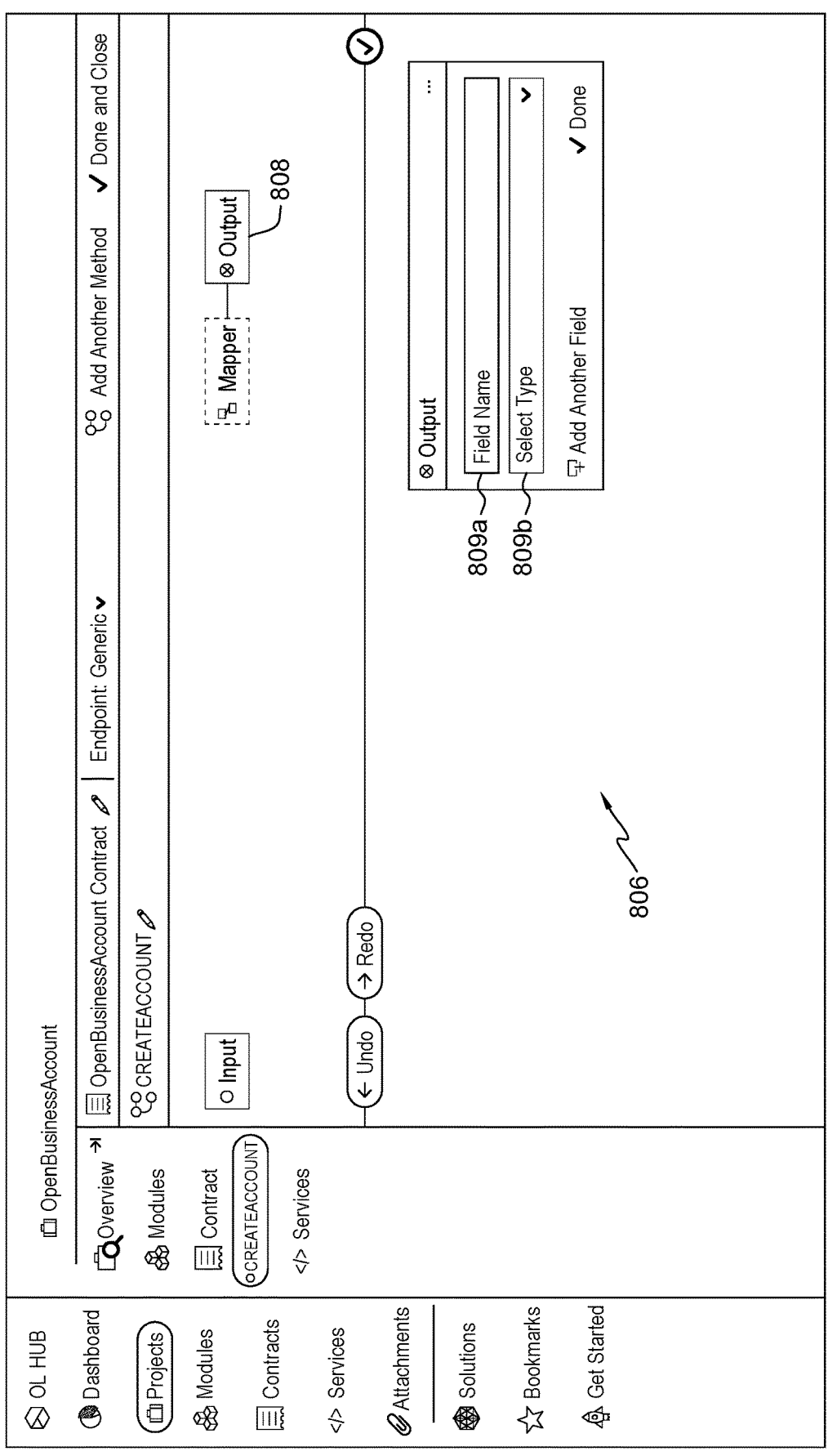
Figure 8E:
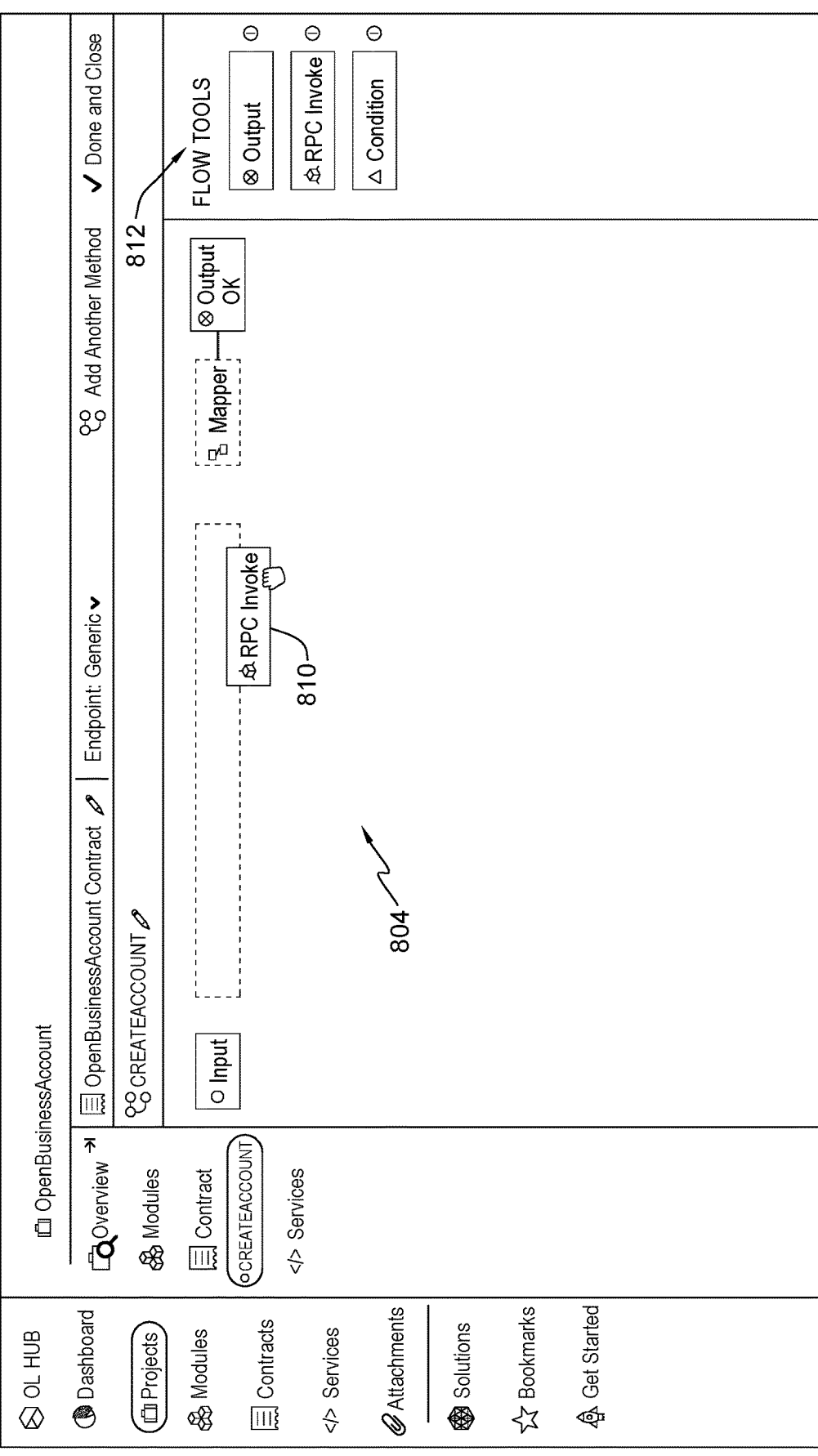

Not pictured in FIG. 4 but available in the interface is a toolset for the user to select objects representing flow components—modules, assets, conditions, activations, etc.—and drag them into the flow (see 812 of FIG. 8E). The customer account component 404, for instance, is a remote procedure call (RPC) Invocation of an asset within a particular module. The user can pull into the flow an invocation box that prompts the user to indicate what the user wants to invoke. Here, that is the Customer Account asset within whatever module houses that asset. Add Account element

406 is also representative of another asset. Condition 408 represents a condition that is used to select between different options for flow progression. For instance, condition 408 is used to determine based on the output of the Add Account asset 406 whether to progress to add a Customer Account or a Business Account.

Inputs and outputs for the mappings could derive from any contract(s) used from the solution center, and pulling different contract(s) to work with can change the inputs and outputs available for mapping. As an example, a flow might need a customer_ID to get_customer_details, specifically a customer address. Assume the relevant contract indicates a CUST_ID input and a COBOL response that is output from the backend system. A mapper could in that case identify that the CUST_ID input of the contract is the customer_ID to use for the invocation of a get_customer_details method, and that the output is to provide a subset of the customer information provided by the COBOL response. Specifically, the subset of information is the customer's address. The mapper can therefore map the input customer_ID to the particular output desired customer address information of the COBOL response. This provides an API/service specific to 'get_customer_address' rather than the more general 'get_customer_details'. Here, 410 encircles a final mapper to map to the service output, though the input to the mapper has not yet been defined in this flow.

There may be several robust capabilities in the mapper around adding static data, functions, expressions, and the like. A potentially significant aspect in dealing with an Enterprise Service Bus (ESB), for instance, is that everything may be internal to the service—meaning it does not orchestrate between APIs/services. That is, it provides intraservice orchestration rather than interservice orchestration in which a larger service is composed of multiple individually exposed and usable services.

A seemingly simple service to get_customer_details from a mainframe may actually involve combinations of customer details from the mainframe along with other data, perhaps a combination of customer data with data from other calls. Some vendors might expose several different system APIs that a customer must use to accomplish a particular goal. This can be very cumbersome. Further to this point, a conventional practice is to develop and expose a large quantity of APIs, each to an individual backend asset. This enables users to compose larger services from the individual usable services, but can result in sometimes thousands of APIs that are very low level and not easily manageable. It can be cumbersome to develop a service that is of even moderate complexity in that situation. In accordance with aspects described herein, orchestration between services and combinations of multiple calls to form a composite service is more easily achievable. The Hub as described herein enables the customer to easily develop a single, robust service from component modules/Hub assets, perhaps hundreds of them, in an intuitive and easy to use fashion, avoiding the need for the customer to write its own code or handle complex orchestration between individually accessible and exposed services. This helps to avoid a proliferation of many low-level APIs, and facilitates development and implementation of more robust, clean, concise services from an input-output perspective. The Hub approach described herein introduces a 'sub-API' component, that allows the customer to deal with the complexity of the service at design time by combining together sub-API (e.g. modules with assets) without the need for each individual asset or module to first be provided as its own API. The Hub assets and modules may not be APIs themselves, they do not need to be managed anywhere outside of the repository 120, and they do not need their own security. Instead, they are available for combination in the platform to form a desired system level API.

Since the assets are containerized, they are their own, stand-alone integration components but are not exposed for use outside of the system; they must be used within the context of the Hub platform in a project and deploy in accordance therewith. They may be composed into a single service, e.g. as a single API that leverages one or more of those assets/modules but the fact that multiple assets/modules are used does not mean that there is exposure of each such asset/module. This contrasts with a situation in which a catalog of relatively low-level APIs are built and exposed for individual use as services and for composing into larger services.

By way of a specific example, assume a service is to have a backend system run programs A and B to obtain different pieces of data, and use those two pieces of data to run program C to accomplish a task. Traditionally, the three programs A, B, and C would be exposed for invocation with three respective stateless APIs. There is a risk in that. It may be that program A or B is never used other than when program C is to use the data produced by it. In accordance with aspects described herein, a single contract (e.g. single API) could be exposed that makes the underlying calls to the backend for programs A, B, and C, without exposing three APIs.

One advantage of this is intra-service orchestration, referring to orchestration contained within the service rather than in between services. Traditionally, with three APIs for instance, there would be interservice orchestration in which orchestration is accomplished as between the three individual services. In accordance with aspects described herein, orchestration is provided within one service, exposed as a single usable, consumable contract. This facilitates use of non-stateful integrations. APIs are stateless integrations—there is no session and persistence when dealing with an API. In accordance with aspects described herein, calls to the backend are not necessarily stateless calls. Within the context of the service being developed, which might involve several individual calls to the backend, an overall state is maintained but the individual, 'sub-API' calls are not necessarily stateless. This contrast with other approaches, such an enterprise service bus (ESB) approach for communication between interacting software applications in a service-oriented architecture, in which the individual exchanges are stateless and a rollback (for instance) is not available. An ESB flow begins and ends without a state of that transaction carrying forward. By way of example, a transaction might execute and produce an inconsistency with a database. To fix this, additional transaction(s) are needed to make it consistent again. In contrast, aspects described herein enable a rollback between calls within the service. An example situation to illustrate is a two-phase commit in which a backend data source makes uncommitted changes. The two-phase commit provides an initial indication followed by a commit indication. Use of APIs (in ESB for instance) does not support this; instead a stateless call instructs changes that are performed as a unit of work and then a separate stateless call is needed to reverse those changes as another unit of work.

By way of another example to illustrate, moving money from one account to another account of a single mainframe backend system might be an extremely complex process requiring (in conventional systems) hundreds of fields of data. It may be unwise to expose such a large footprint. In approaches described herein, this complexity can be bottled within a service so that the service—even though it is a system level service, meaning it corresponds to a 'move money from account to account' on the mainframe and is a system level API—has a much smaller footprint, perhaps 15 different fields, because the complexity is handled by different modules incorporated within the flow. Meanwhile, the simplified service is still a system-level item that can be composable into a larger process. For example, the larger process (delivered as the service developed on the Hub) might build processing for each of the different situations that result from an attempted money transfer, for instance to send an email when the transfer is successful and to perform some other activity when the transfer is not successful. In this case of a money transfer, the customer can easily build complexity around that activity and wrap all of that into a single project and resulting service.

Figure 5:
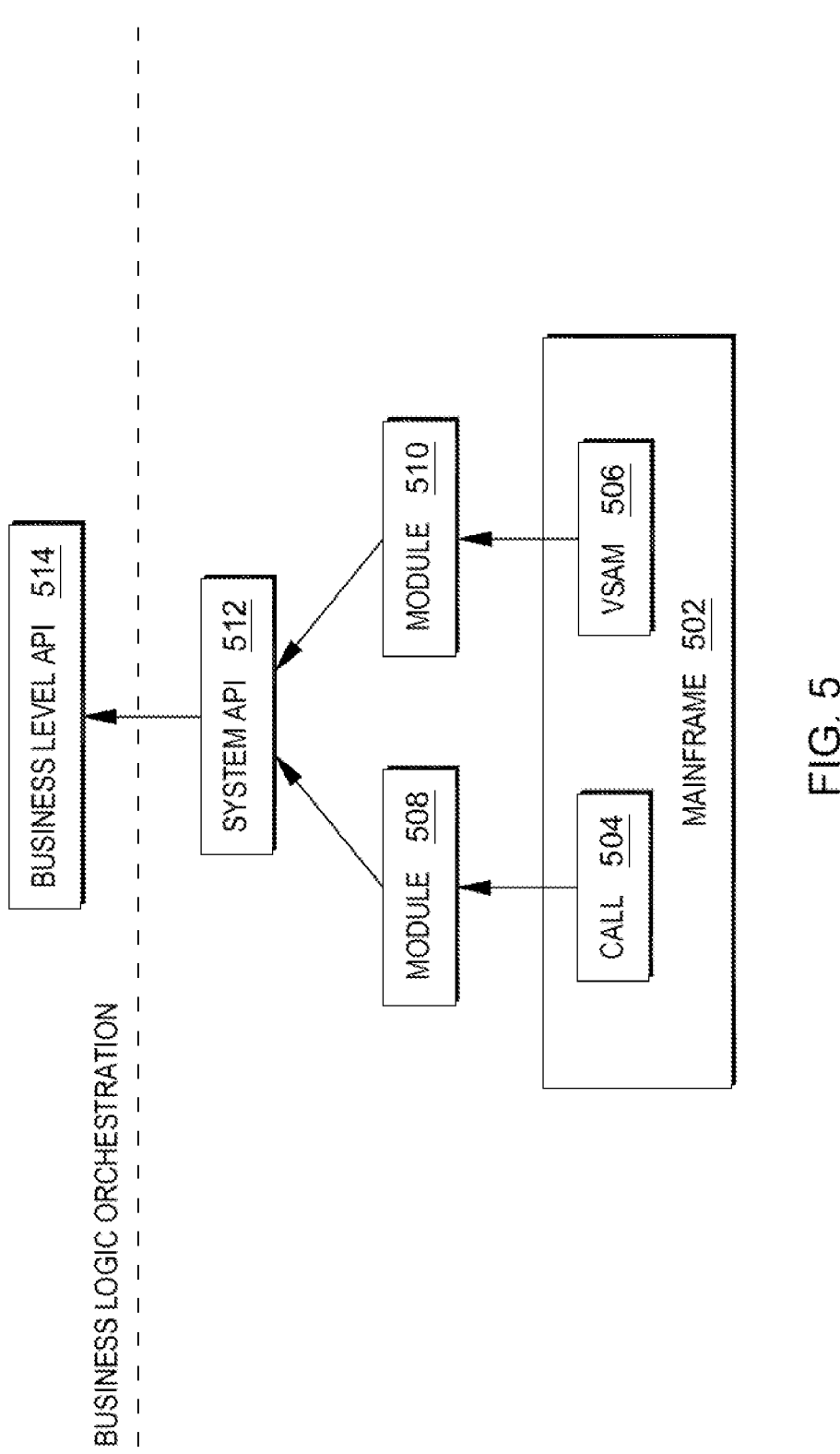
FIG. 5 presents an example conceptual diagram of an approach to system level APIs.

FIG. 5 presents an example conceptual diagram of an approach to system level APIs. A backend mainframe 502 supports a particular call 504 and virtual storage access method 506. These backend assets can be objectified by assets in modules 508 and 510, respectively, for data orchestration to connect directly into a system API 512 that is a coherent representation of what the customer is producing from the backend for use in its business logic orchestration in a business level API 514.

The granularity of a project and resulting service can be largely a design decision by the customer. The Hub supports different approaches to granularity, ranging from the very granular ('micro service') level in which most tasks are a separate contract, to the coarse granularity 'macro service' level where many individual tasks are wrapped up into a composited service. 'Mini services' have a granularity between those of the micro and macro services. In the banking industry for instance, services have historically been specific to individual branches, so every action needed a branch context to be associated with it (fine granularity). In contrast, a service could be developed that does not itself need to handle the branch context because that parameter can instead be taken into account before the service call (coarser granularity). This facilitates a lower number of APIs that are easily consumable, and automates system API generation that is easier to maintain and is business oriented.

Another example of aspects described herein is presented with reference to FIG. 6. The CLI or other interface can be used to automatically parse backend assets into JSON-format (as one example) metadata, create tests, and automate various other parts of the process, among other activities. FIG. 6 presents a screenshot of the CLI adding parsed assets (e.g. as part of a common module) into a Hub development component. It also provides instructions about how to add and test the assets. Here, the assets 'fininq2', 'fulldetail', 'itemdet', and 'items' were created in the module named CICS.

Once the metadata is in its format (e.g. JSON), the system could pick default mappings to a generated contract and/or the user could change mappings to meet customer needs. Testing can include default data (zeros, ones, empty strings, etc.), but the user could additionally or alternatively add any relevant data for the CLI to run the tests.

Figure 7A:
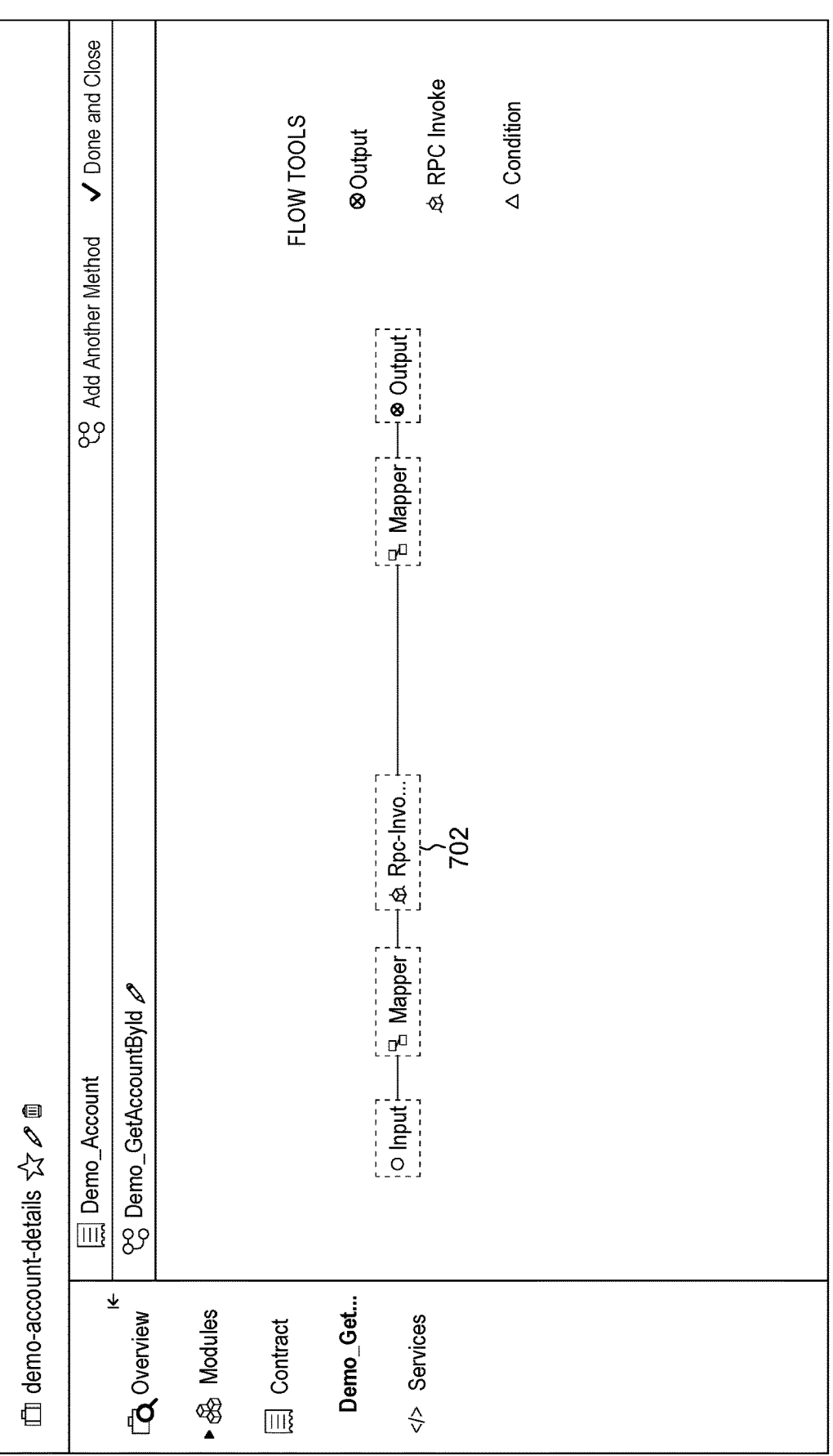
FIGS. 7A and 7B present additional example interfaces of a Hub studio in accordance with aspects described herein.
Figure 7B:
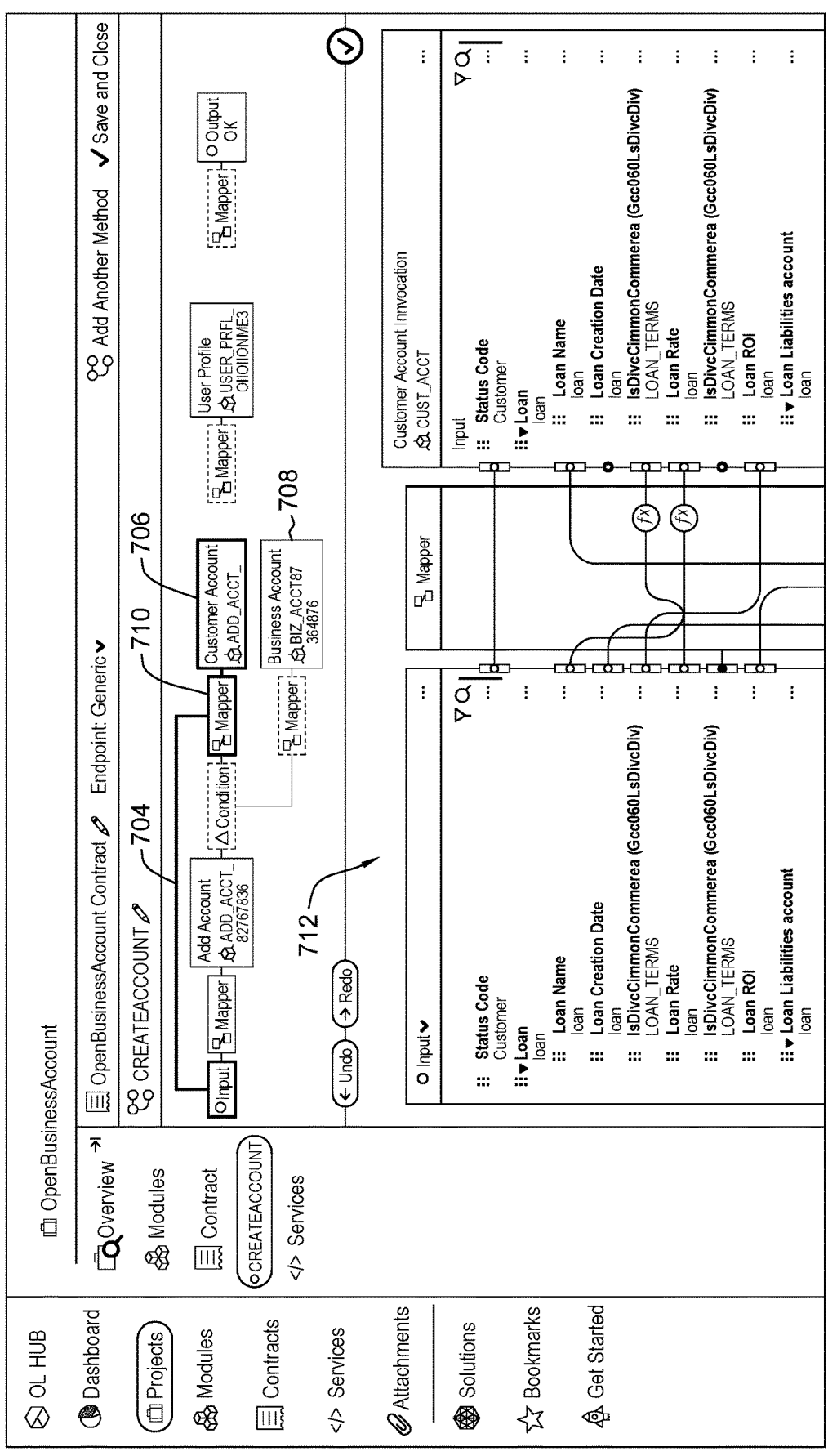

FIGS. 7A and 7B present additional example interfaces of a Hub studio (e.g. 122), in which the user can build the flow of a project using input-output pairings/mappings. Any inputs/outputs without a mapping can be set to default information in some embodiments. In FIG. 7A, RPC-Invocation 702 is an example where the flow engine interfaces to backend data. Here it does not show what specific asset the flow is linked-to at that point; for this, see FIGS. 8A-8AD.

In FIG. 7B, various RPC invocations have been turned into calls for ADD_ACCT 704, CUST_ACCT 706, and BUS_ACCT 708, each based on a respective Hub repository 120 asset, and are the interfaces to backend assets. The mapper element 710 is used to specify the data conversion of the backend assets to, e.g., JSON format by way of a properties area 712 described below.

Aspects described herein differ from other approaches for integration. Some integration, such as ESB integration for example, are heavily message-driven systems focused on defining the messages as a data structure that flows between entities and is what the entities work with and what drives the process. In contrast, aspects described herein use individual, composable units with less emphasis on message structure and more one programmatic handling of the data. A microservice for instance is not concerned about message structure in working with the data; it does not need knowledge of the data structure/message. Whereas aspects discussed herein include understanding functionality and then abstracting the endpoints of the access, ESB is focused on conforming to a message structure that remains consistent and understood by cooperating entities. By way of specific example, exposing a COBOL program as a restful API does not require the user to handle conversion of COBOL data types to (e.g.) Javascript data types, since the translation definition is handled when the appropriate asset(s) are automatically provided within the Hub. The user maps data in the flow for service delivery but the translations are not user-specified at service development time like they are in ESB.

Master Data Management (MDM) is another example that may be used in integration but it too focuses on structure of data rather than flow or functionality.

In the Hub approach described, the metadata is being used for building self-contained components (assets and modules) that are the whole, composable integration components and that, by themselves, are independent and technology/language agnostic. They can be automatically generated by parsing metadata from the backend system/application and provide self-contained integration—message properties are contained within it, connection properties are contained within it, necessary conversions contained within it, etc.

FIGS. 8A-8AD depict example interfaces of the Hub studio (e.g. 122) presented when a user creates and deploys an example project, in accordance with aspects described herein.

FIG. 8A depicts an initial contract creation interface with options to create a contract using a bottom-up approach or to auto-generate (subject to optional customization) based on project assets. A contract-first approach as described previously can also be provided as a possibility. This contract is part of a project entitled OpenBusinessAccount.

FIG. 8B depicts an interface for creation of a method within the contract. The method here will be a method to create an account. The name of the method will be CREATEACCOUNT and will be specified in the input field 801 for Method Name.

FIG. 8C depicts an interface for setting attributes of a flow input. Here an input flow node 802 of the CREATEACCOUNT method is being defined. When the method is being created, it is automatically populated with the undefined Input flow node 802, undefined Output flow node 808, and undefined mapper node 803. These are pictured in a flow area 804. Below flow area 804 is node properties area 806 for defining properties of a selected node. In this case, Input flow node 802 is selected and the properties of the Input flow node 802 are shown for definition/specification by the user. Properties of an Input flow node include input fields, each with a user-specified field name and user-selected type. In FIG. 8C, the user is in the process of specifying a first field with an input box 807a for the user to input the field name and an input box 807b for the user to select the field type. The user can add any number of such fields to the Input flow node. These fields correspond to the inputs of the service defined by this flow.

FIG. 8D depicts an interface for setting a flow output. Here the output flow node 808 of the CREATEACCOUNT method is being defined. Again, the node properties area 806 is used for defining properties of the Output flow node 808, with a field name 809a and type 809b being specified by the user. Various output fields can be defined, and they correspond to outputs of the service defined by this flow.

FIG. 8E depicts an interface for adding an RPC invocation into the flow using an RPC Invoke node. Here the user drags and drops an RPC Invoke node 810 from a tool selection area 812 into the flow area 804.

Figure 8F:
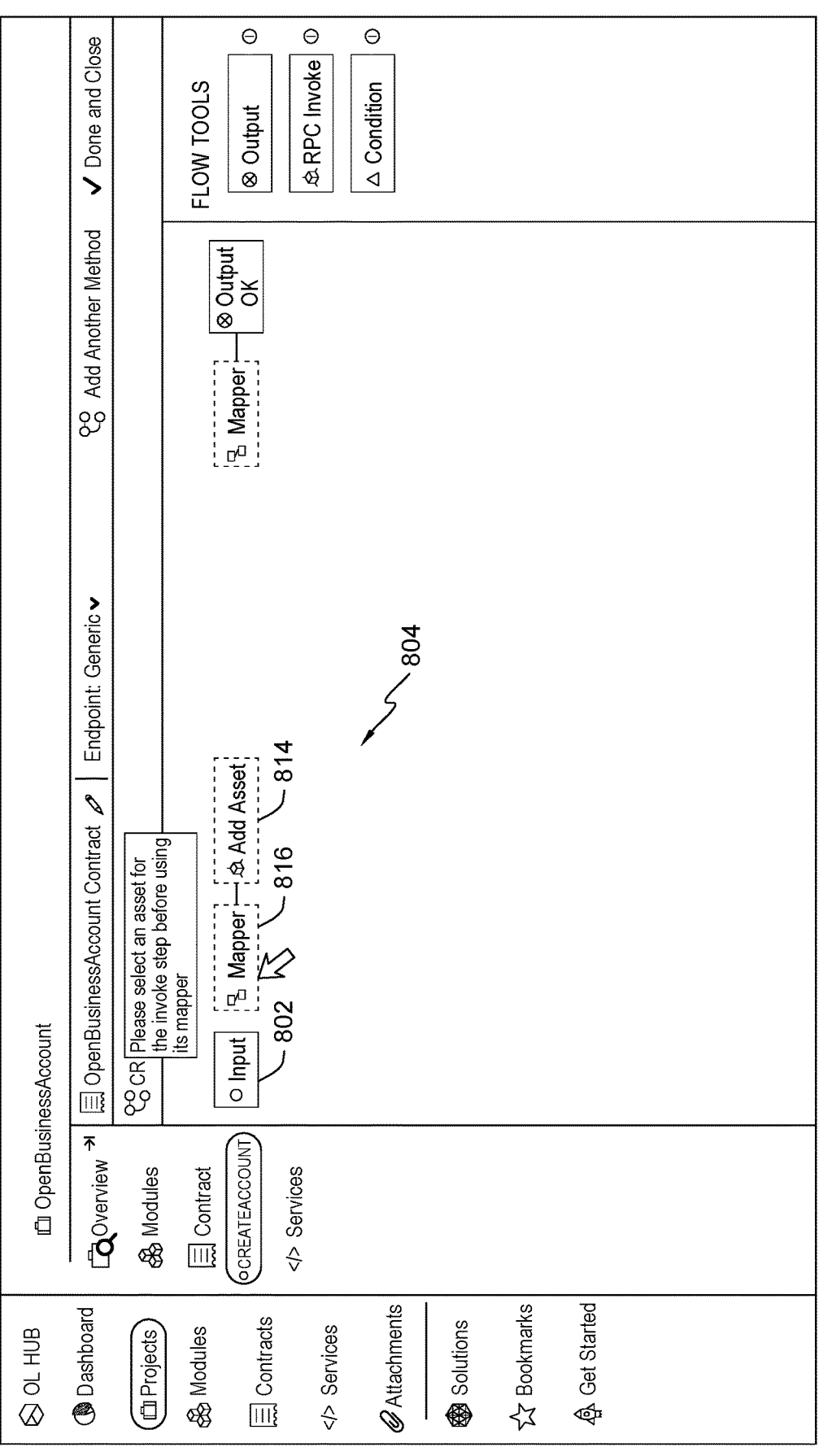
Figure 8G:
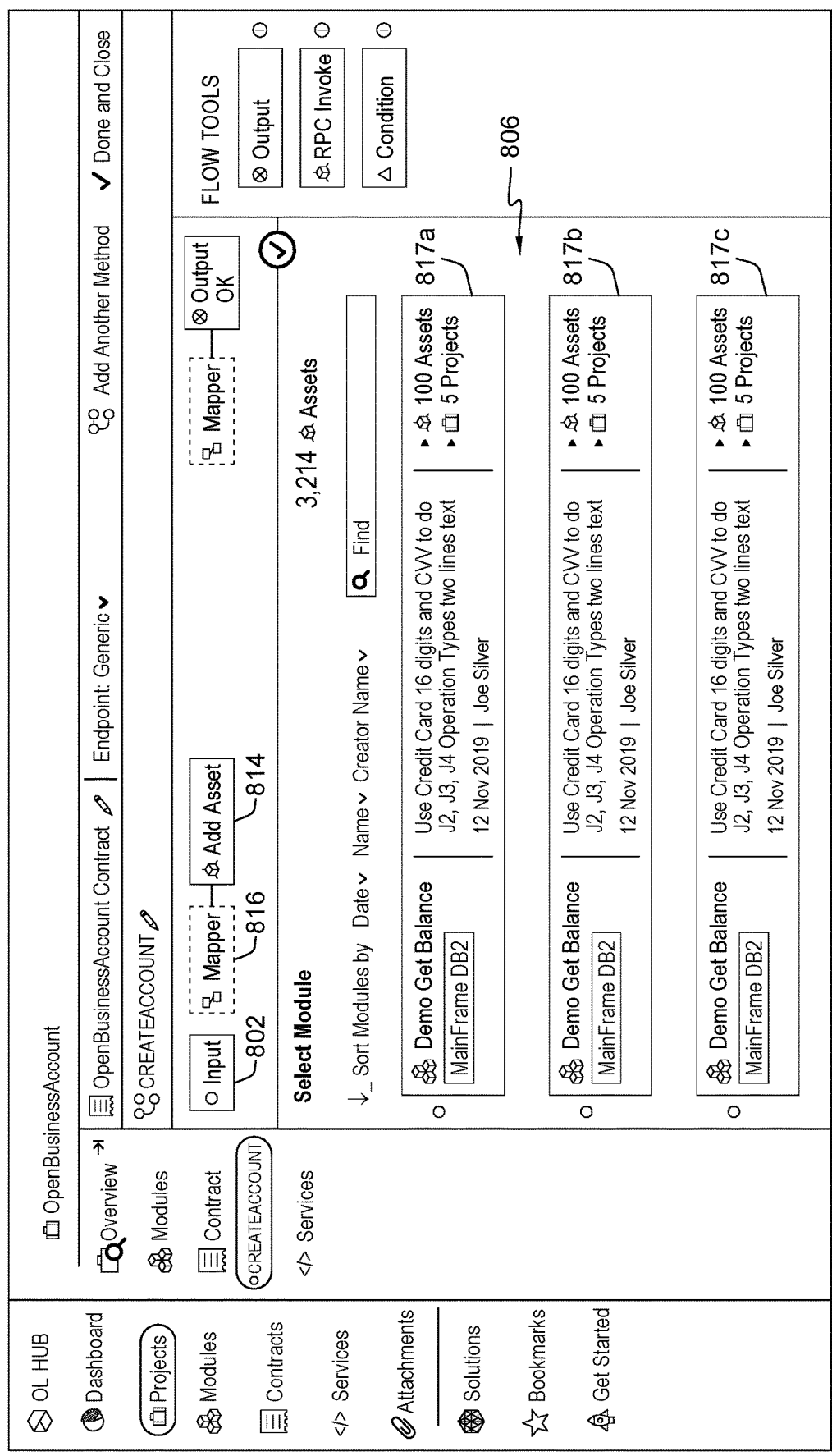
Figure 8H:
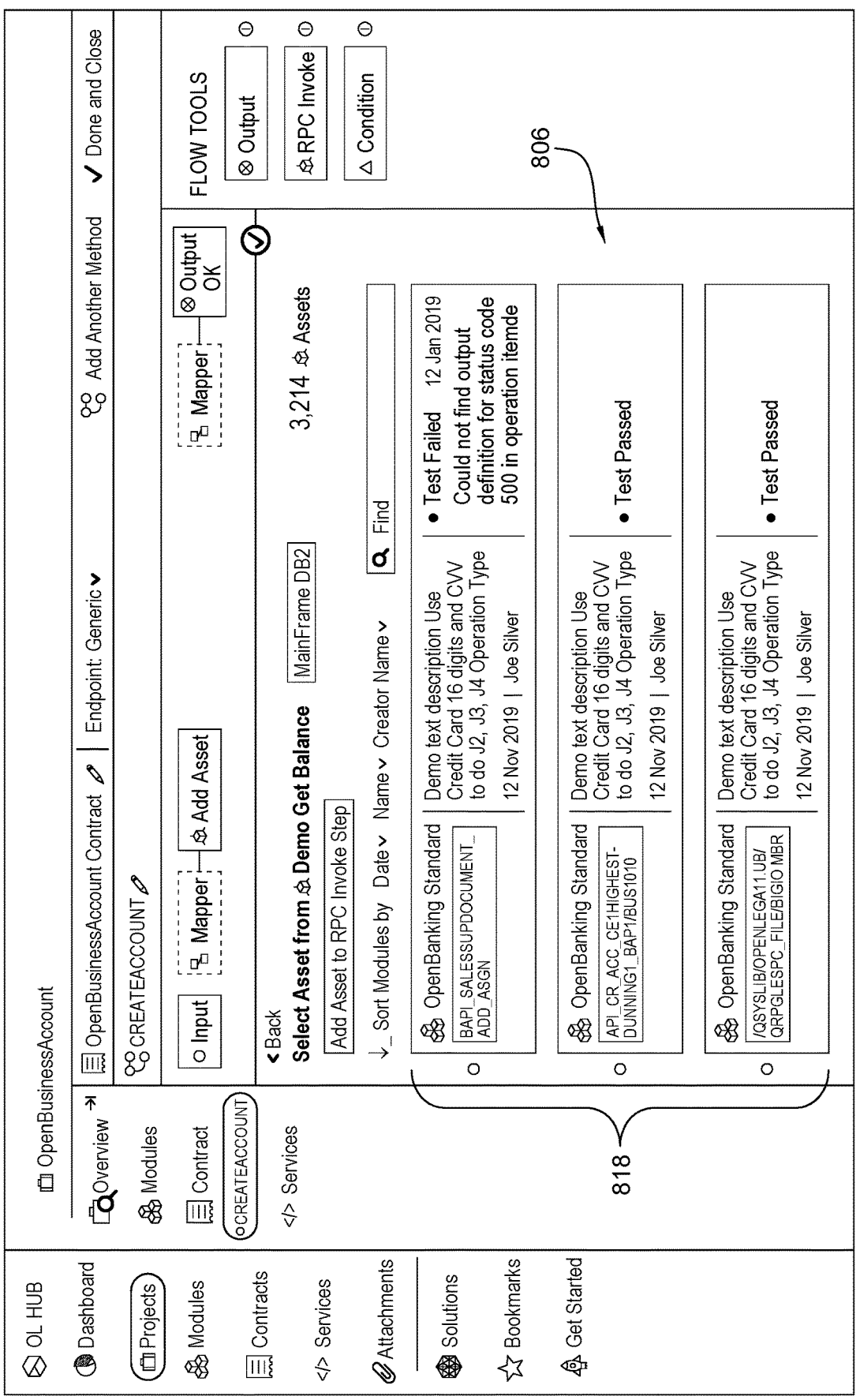

FIGS. 8F-8H depict interfaces for defining the RPC node just dragged and dropped into the flow in FIG. 8E. Initially, in FIG. 8F, the flow area 804 shows added nodes 814 and 816 for an asset and mapper, respectively, which are automatically added. Mapper node 816 is included to map field(s) of Input node 802 to field(s) of the asset 814 being specified, i.e. being selected from a pool of available Hub assets that have been defined and are known to the system, and available for use by the user in this particular project. In FIG. 8G, the user has selected asset node 814 to specify the asset. The node properties area 806 presents a list of selectable modules 817a, 817b, 817c available in the Hub repository of the Hub development component 102 (and optionally also in any available solution center deployment component(s) e.g. 106 and any others that are available for this project). It is seen in 806 that this list of modules each coincidently have 100 assets. FIG. 8H depicts an interface for defining the RPC asset after the user selected the Demo Get Balance module 817a from the interface in FIG. 8G. On the basis of selecting that module, the node properties area 806 presents a list 818 of selectable assets of that module along with pass/fail information resulting from testing of each asset.

Figure 8I:
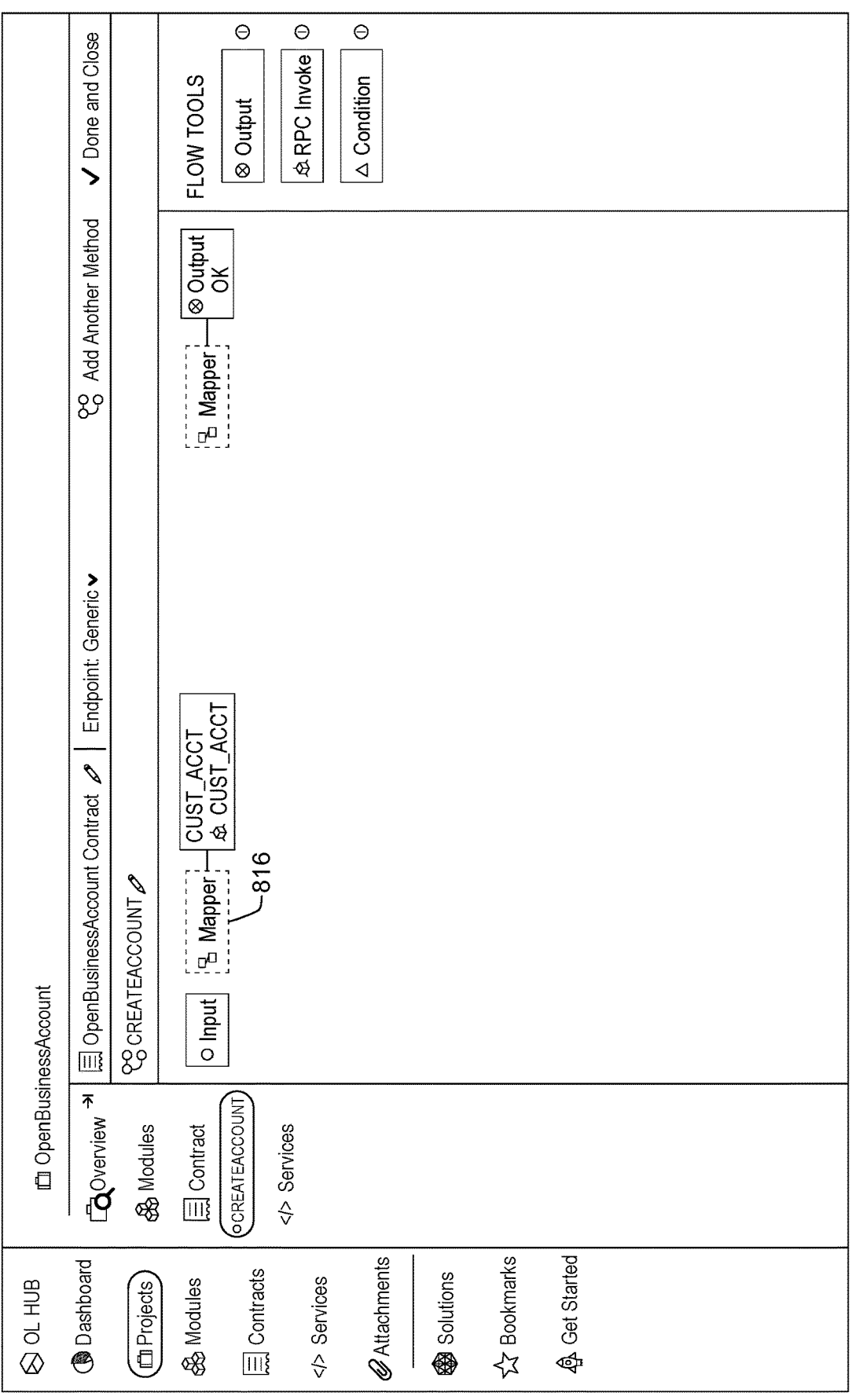

FIG. 8I depicts an interface after the user selects a CUST_ACCT asset (of a CUST_ACCT module) for the RPC invocation. The mapper node 816 when initially appearing in the interface before the corresponding asset is specified may be indicated as unavailable, undefined, unspecified, etc. using any desired indication (such as by being presented as grayed). At this point in FIG. 8I after the user selected the particular CUST_ACCT asset, the mapper may be indicated as activated for setting. For instance, the mapper node 816 is no longer grayed-out, indicating that it is activated for setting.

Figure 8J:
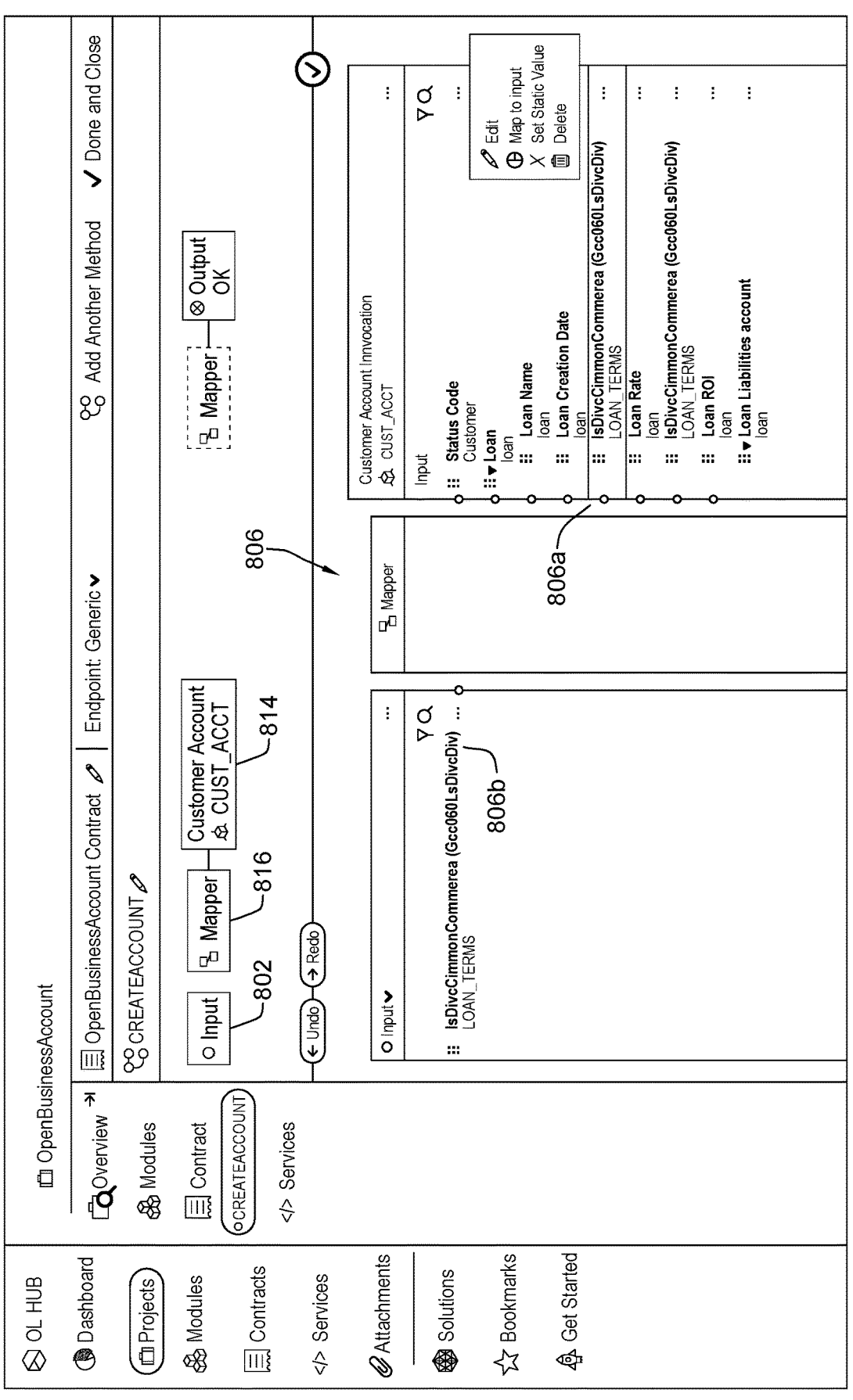

FIG. 8J depicts an interface for setting the mapper 816 to map field(s) of Input node 802 to field(s) of a selected asset, i.e. CUST_ACCT RPC call 814 in this example. When mapper node 816 is selected, the node properties area 806 presents a way for the user to connect ('map') such fields together. Properties and actions available with respect to the fields can be viewed, as depicted. Here, the user could map the IsDivcCimmonCommerea field 806a of the CUST_ACCT asset/node 814 to an input field, such as the corresponding input field 806b of Input node 802 as shown on the left side of area 806.

Figure 8K:
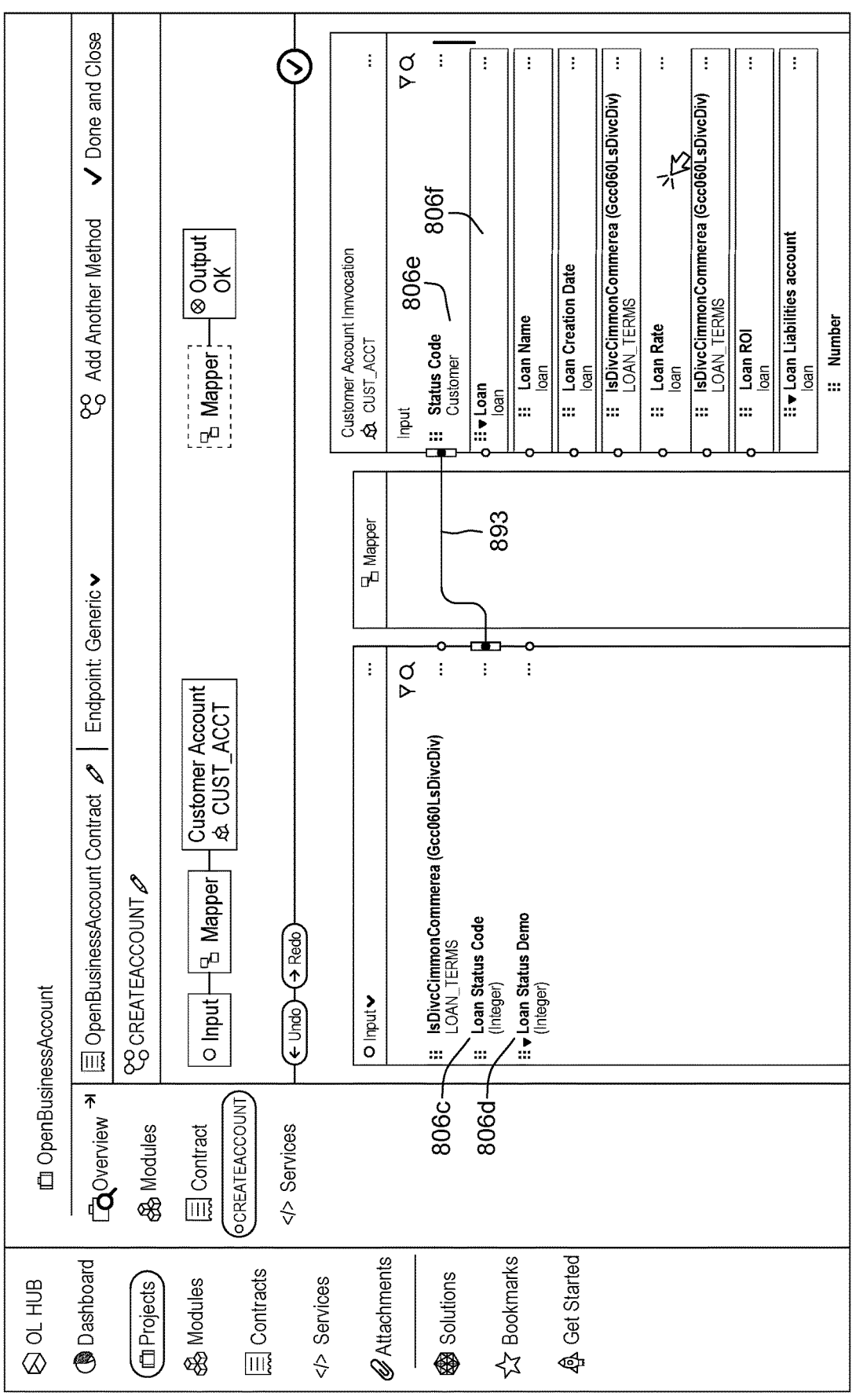
Figure 8L:
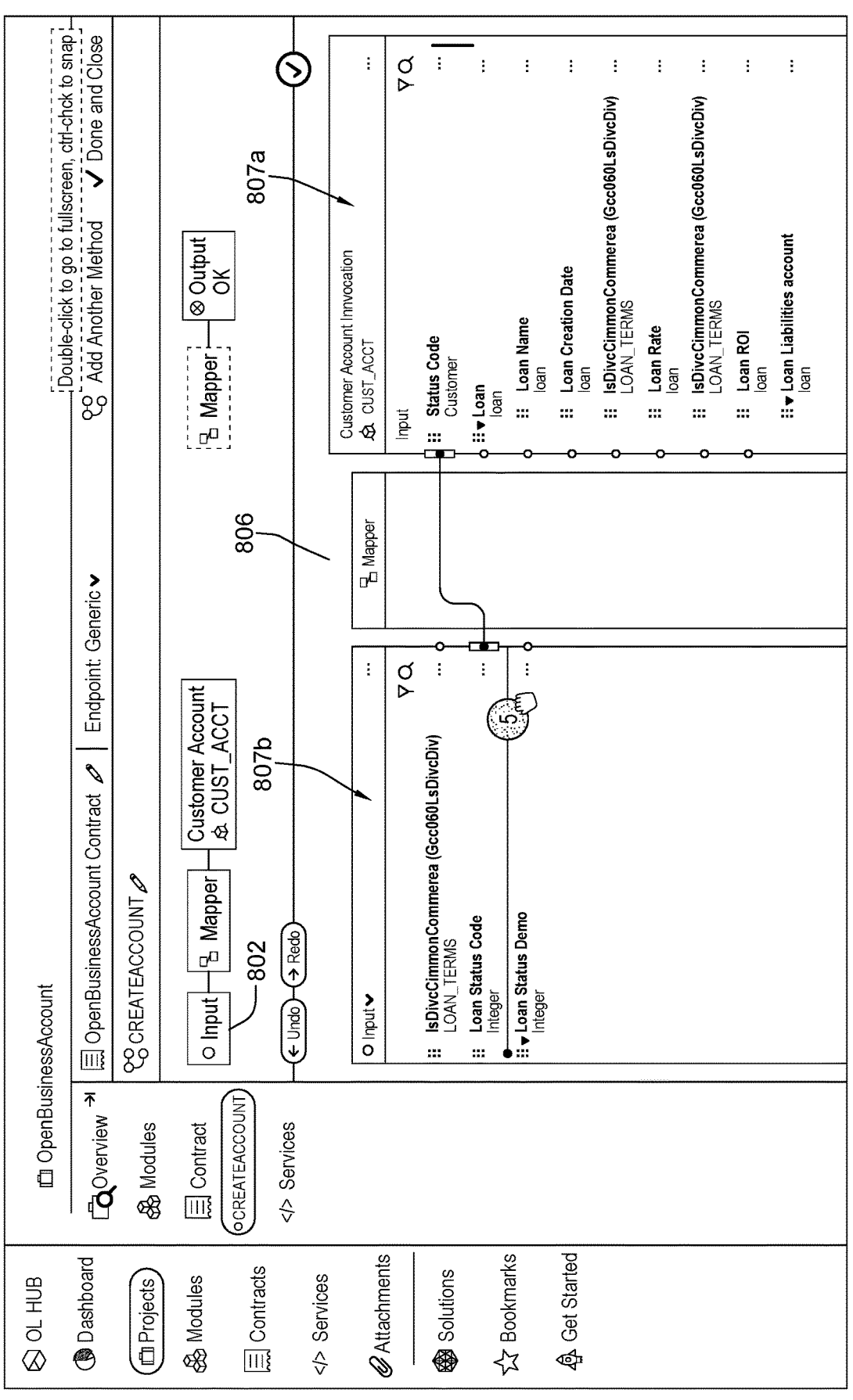

FIGS. 8K-8L depict interfaces showing the ability to drag multiple RPC fields to the Input. In FIG. 8K, the Input node

802 has been defined with two additional fields 806c and 806d for 'Loan Status Code' and 'Loan Status Demo', respectively. The 'Loan Status Code' field 806c of the input has been mapped to the 'Status Code' field 806e of the CUST_ACCT RPC call as shown by mapping 893. The CUST_ACCT fields also include those grouped under a Loan heading 806f. The user can individually and/or multiply-select fields under the Load heading. The user's pointer element is shown selecting Load Rate in this example after having selected the other fields shown in full border (Loan Name, Loan Creation Date, . . . ).

FIG. 8L depicts an interface in which the user has multiple-selected 5 fields from the CUST_ACCT RPC call at the right side 807a of the properties area 806, and is in the process of dragging-and-dropping them to the left side 807b of the properties area 806 to define them as fields of the Input flow element 802. This provides a mapping between the input part of the generic service request and the specific input part of a call to a backend asset. In this example, the mapping is performed by dragging the 5 backend assets (from the right) into the input node field (on the left) to define at least these contract inputs for the request.

Figure 8M:
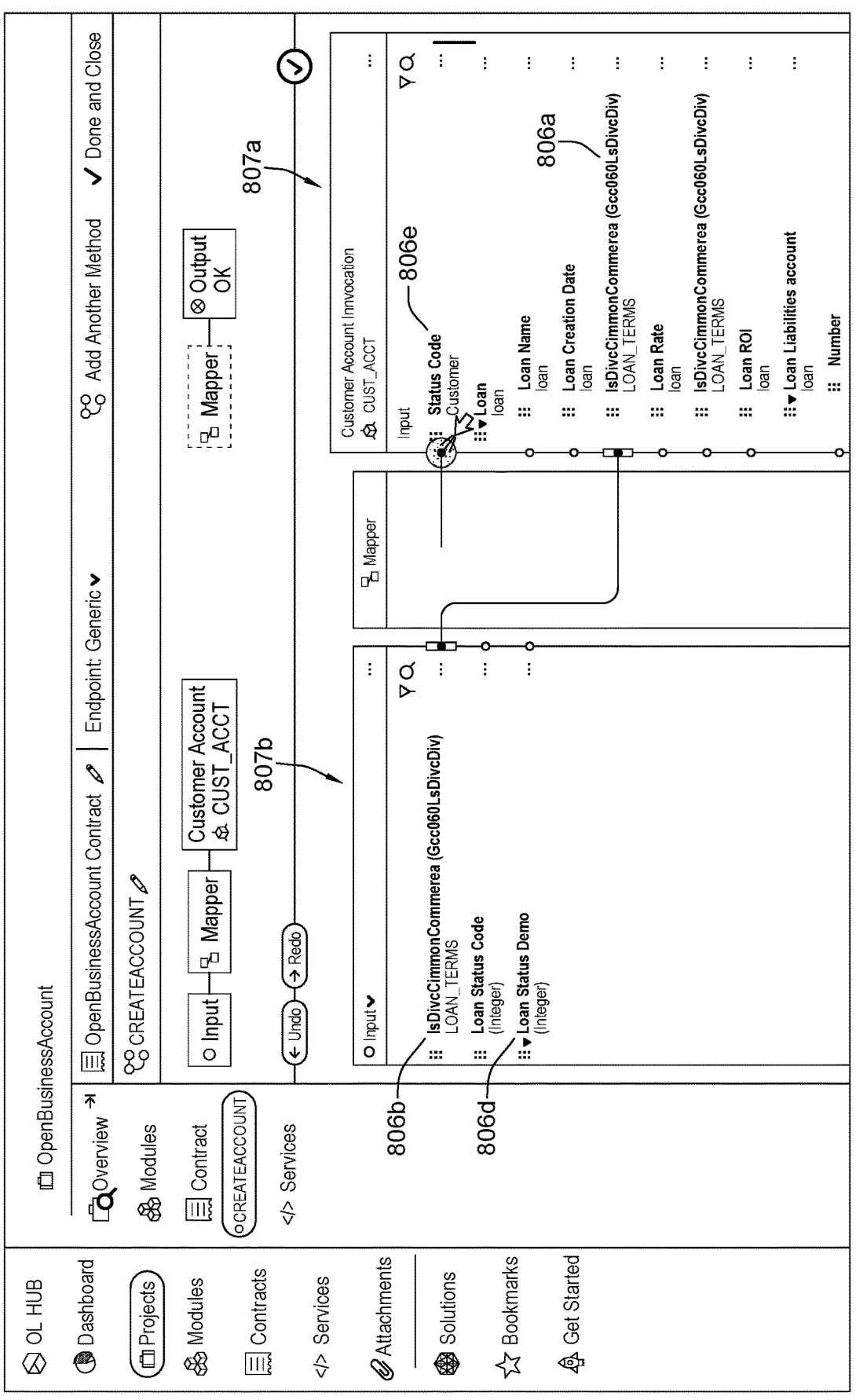
Figure 8N:
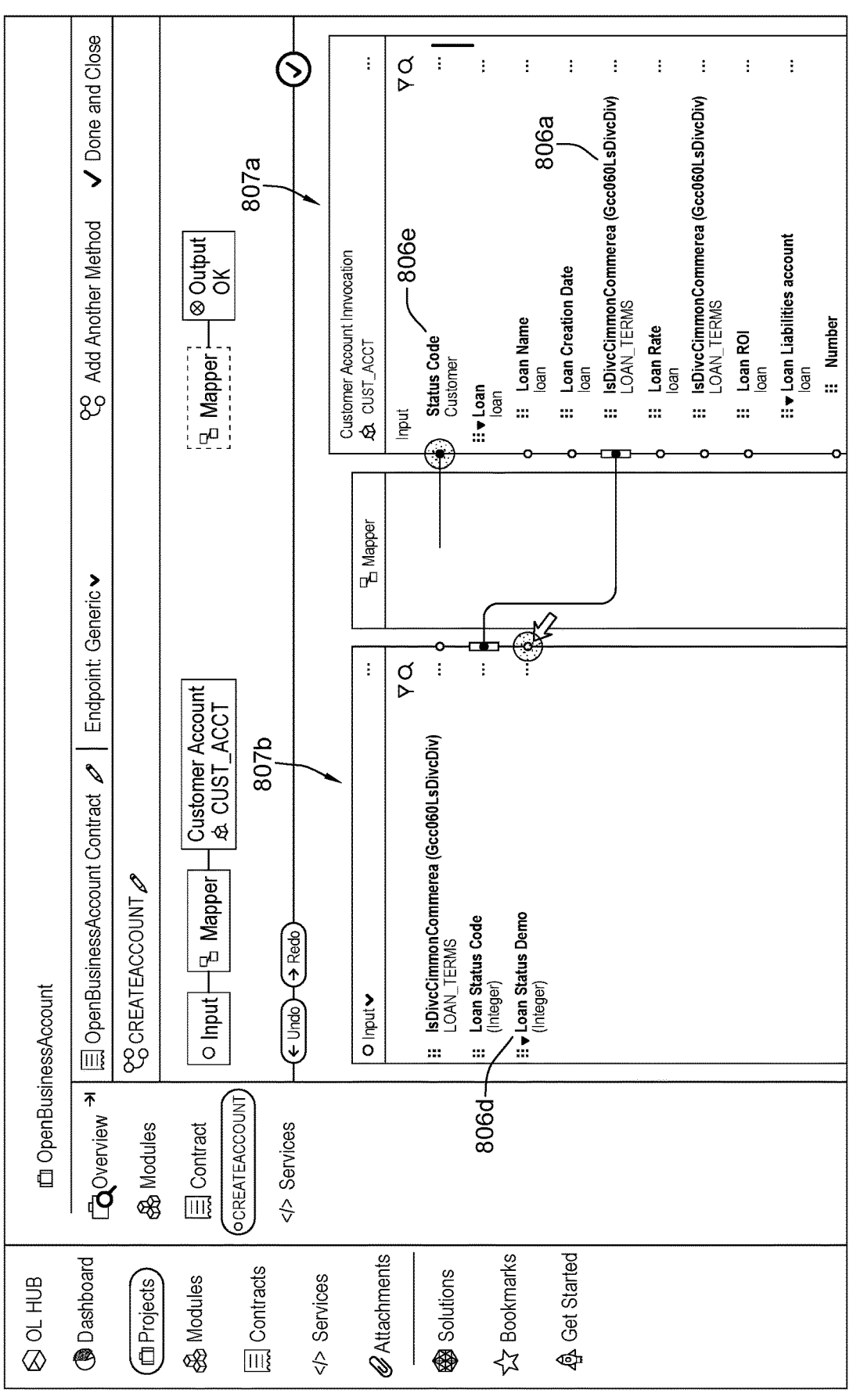
Figure 80:
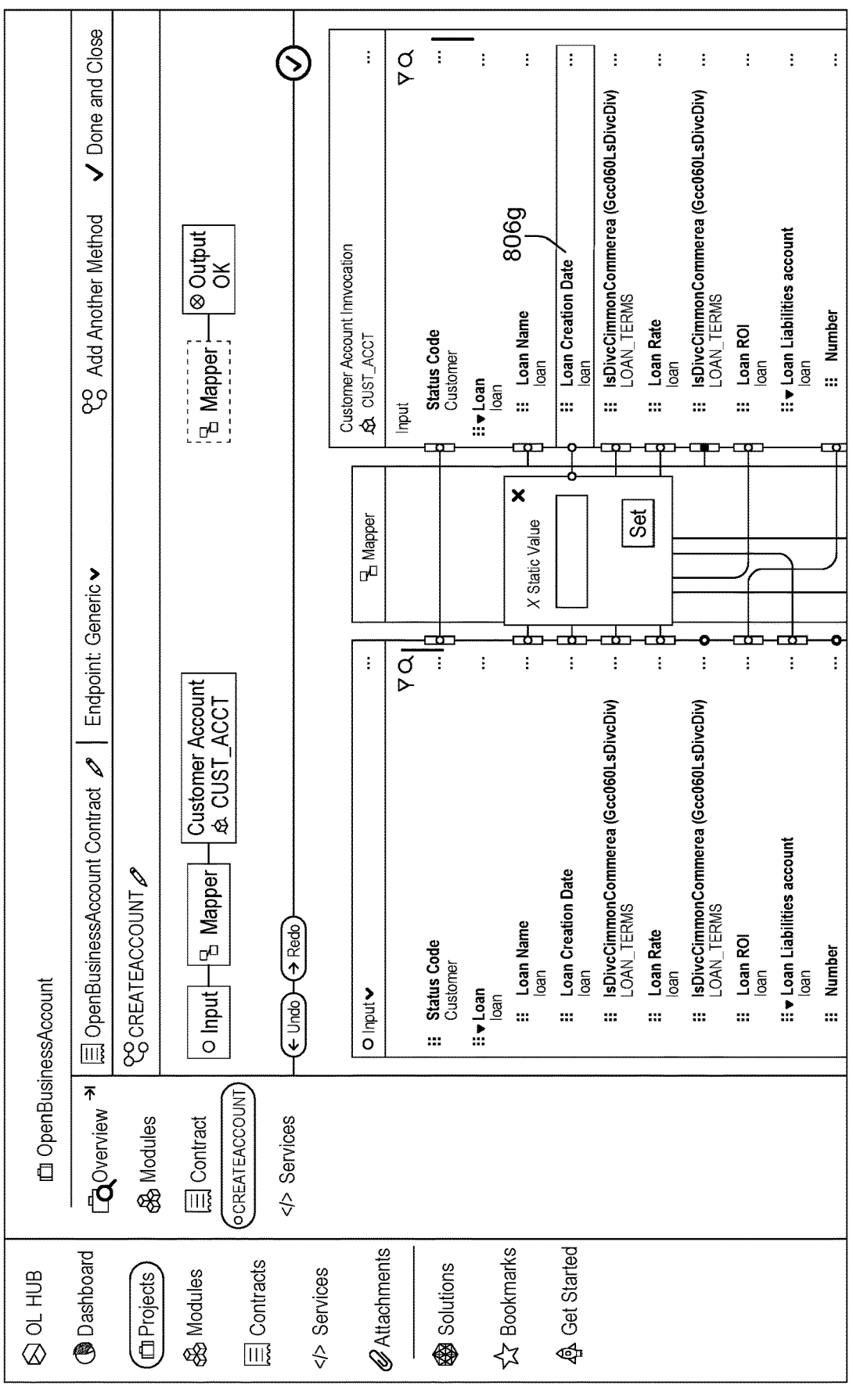

FIG. 8M presents a different example in which the IsDivcCimmonCommerea field 806b of the Input is already mapped to the IsDivcCimmonCommerea field 806a of the RPC call. Then the user, in defining a new mapping, manually selects the 'Status Code' field 806e of the RPC call as a Source of the mapping, and (in FIG. 8N) manually selects the 'Loan Status Demo' Input field 806d as a Target of the mapping. A result of that will be a line (not shown) connecting those two fields. The "Source" of the mapping is the backend asset and the "Target" of the mapping is part of the contract input here because the user worked under a bottom-up approach that connects backend assets (listed on the right side 807a) to contract inputs (on the left side 807b). This is in contrast to a contract-first approach that would connect predefined contract fields on the left side 807b as Sources to backend assets on the right side 807a as the Targets.

FIG. 8O depicts an example in which the user sets a static value for the selected Target, in this case 806g "Loan Creation Date". A field can be defined as a static value, and thus can have a 'static value' property. In the case of a defined static value, there is no need to separately-obtain the value from another source. In an example of a static value set for an Input field of the contract's input, no input data for that field would need to be supplied when calling that contract. Similarly, if a static value is set for a field of an RPC call (e.g. 806g as depicted in FIG. 8O) nothing from the input would need to be mapped to that field of the RPC call, as the defined static value is used for that field.

Figure 8P:
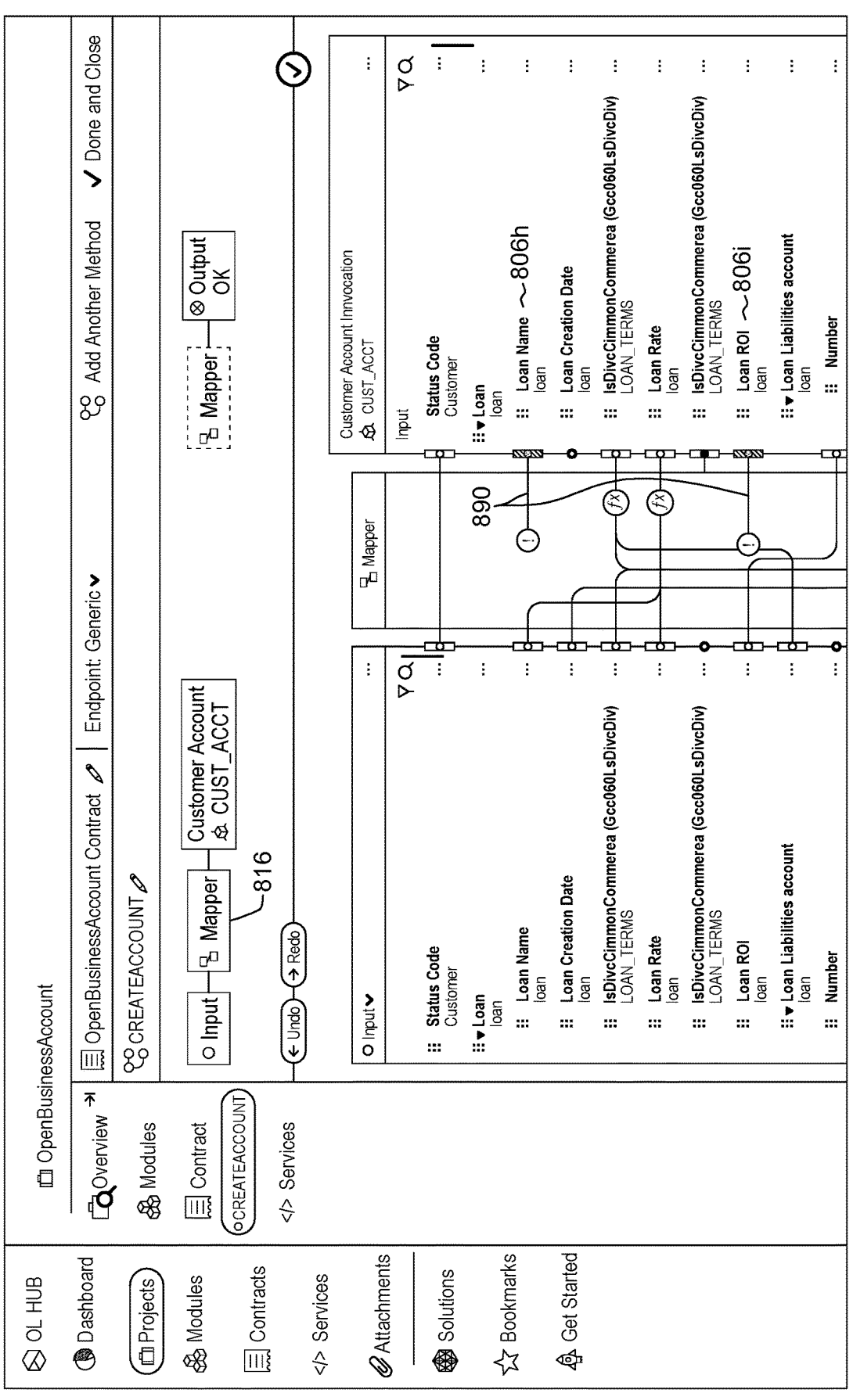

FIG. 8P depicts an interface in which broken mappings are called out in node properties for the mapper node 816. The 'Loan Name' field 806h and 'Loan ROI' field 806i of the RPC call CUST_ACCT are indicated as having broken mappings. Mappings could be broken for any of various reasons. One may be that the field has not yet been mapped to a n Input field but is required to be. This is the case in FIG. 8O, as shown by broken mappings 890.

Figure 8Q:
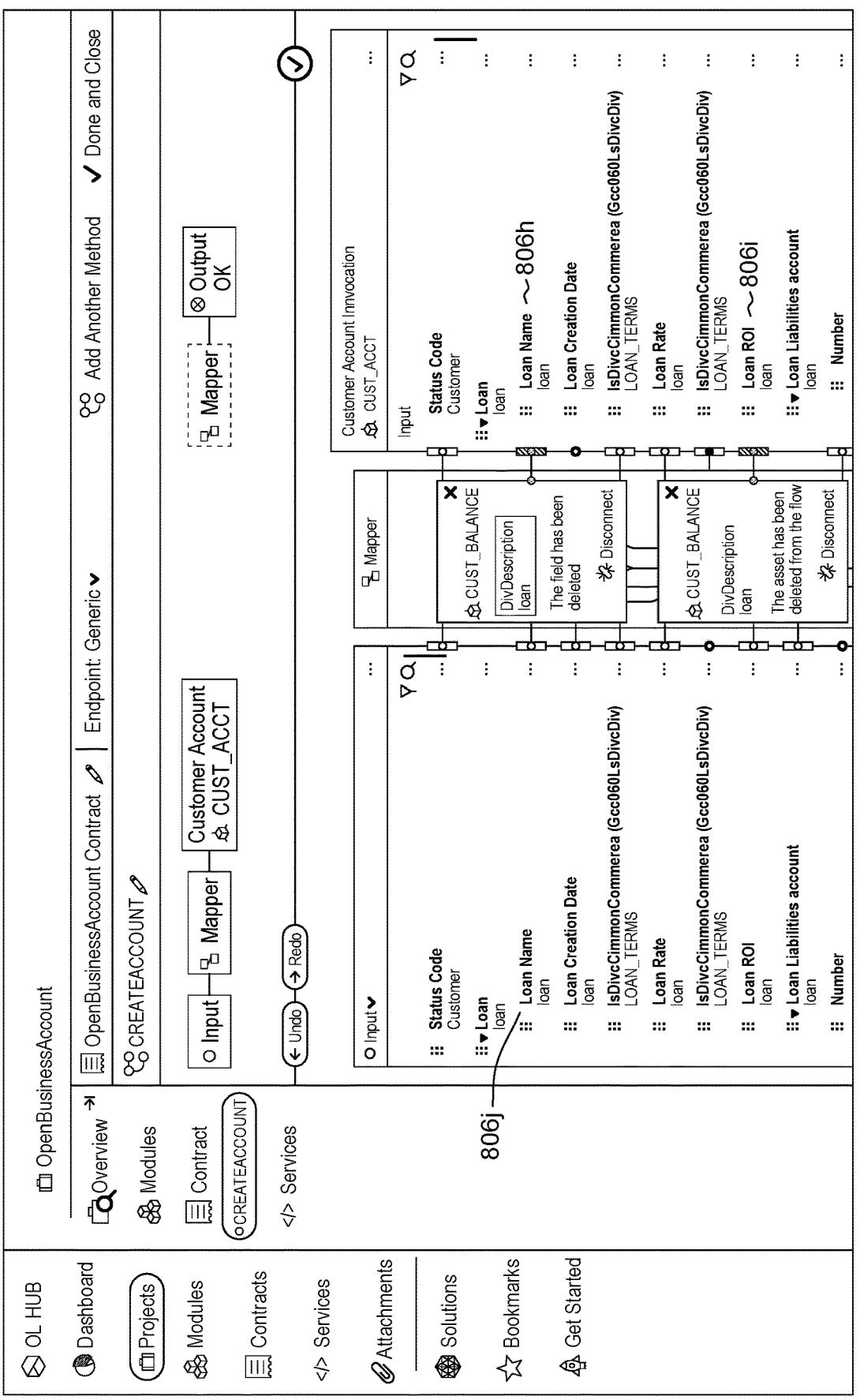

FIG. 8Q depicts an interface that presents the specific reasons for the two broken mappings of the example of FIG. 8O. Here the 'Loan Name' field 806h of the CUST_ACCT asset has a broken mapping because the field of the Input to which Loan Name was mapped has been deleted, i.e. there is no longer a contract (Input) field attached and no static value. In this particular situation, perhaps a prior-existing contract input field named 'Original Loan Name' has been deleted and a new field Loan Name has been added to the Input. This broken mapping for Loan Name 806h of the CUST_ACCT asset therefore may be fixed by connecting the Loan Name field 806h of the CUST_ACCT asset to the new Loan Name Input field 806j. The 'Loan ROI' field 806i has a broken mapping because the asset CUST_BALANCE mapped to it has been deleted from the flow.

Figure 8R:
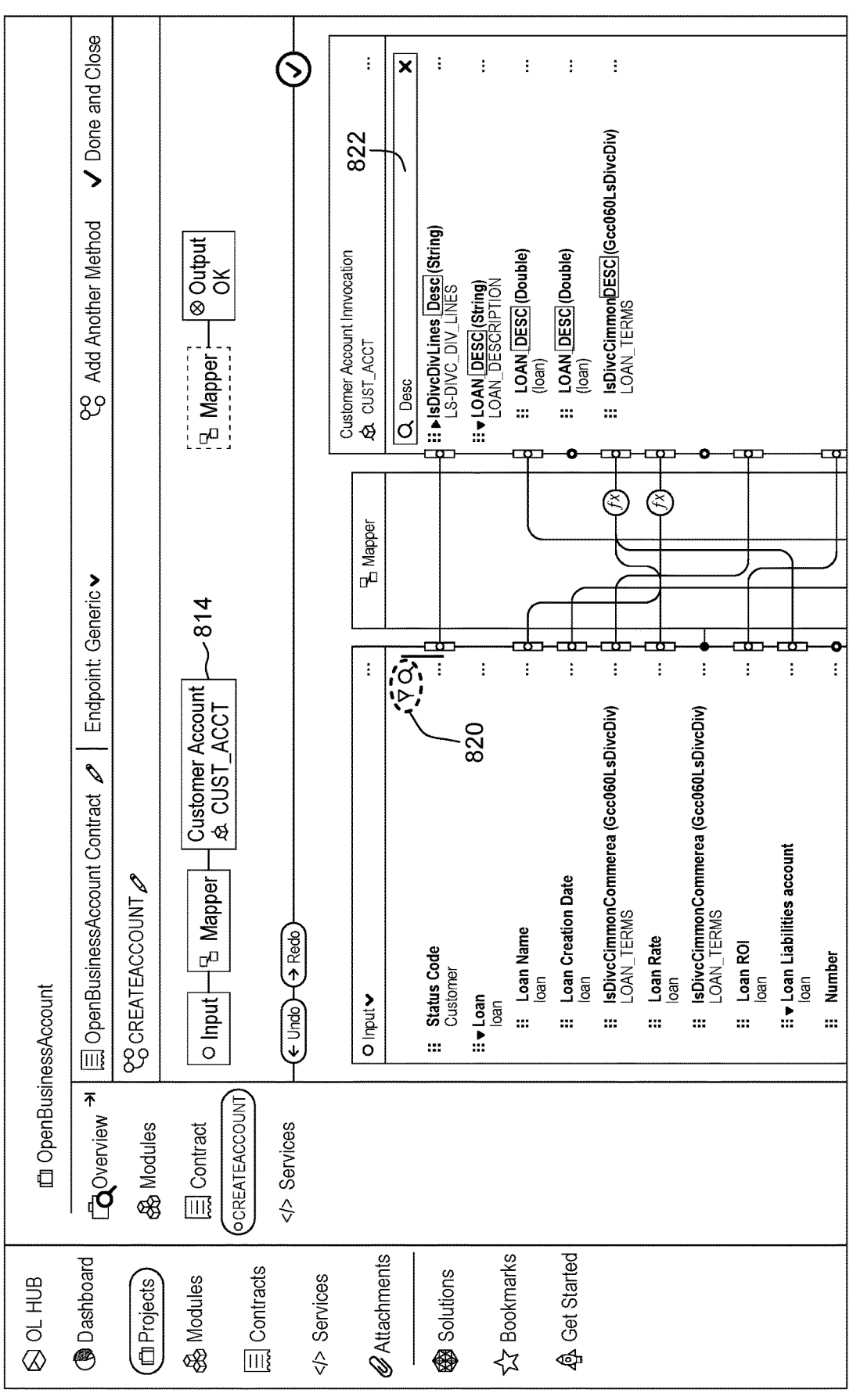

FIG. 8R depicts an interface for finding and filtering fields of a flow node, the CUST_ACCT node 814 in this example. In the properties area, the user can select an icon representing a 'filter' action or an icon representing a 'find' action (example such icons for the Input flow node 802 are shown by 820) to define a filter to apply to a list of fields or to search for field(s) in the list. Here, the user has selected a 'find' icon associated with the list of fields of the CUST_ACCT asset and has typed the string 'Desc' in search box 822, which appears after the user clicked the find icon (not depicted) associated with the CUST_ACCT. This updates the list of fields presented under 822 to include just those fields with field names contain that string of characters. The filter capability enables the user to filter the list according to any available attributes of the list elements.

Figure 8S:
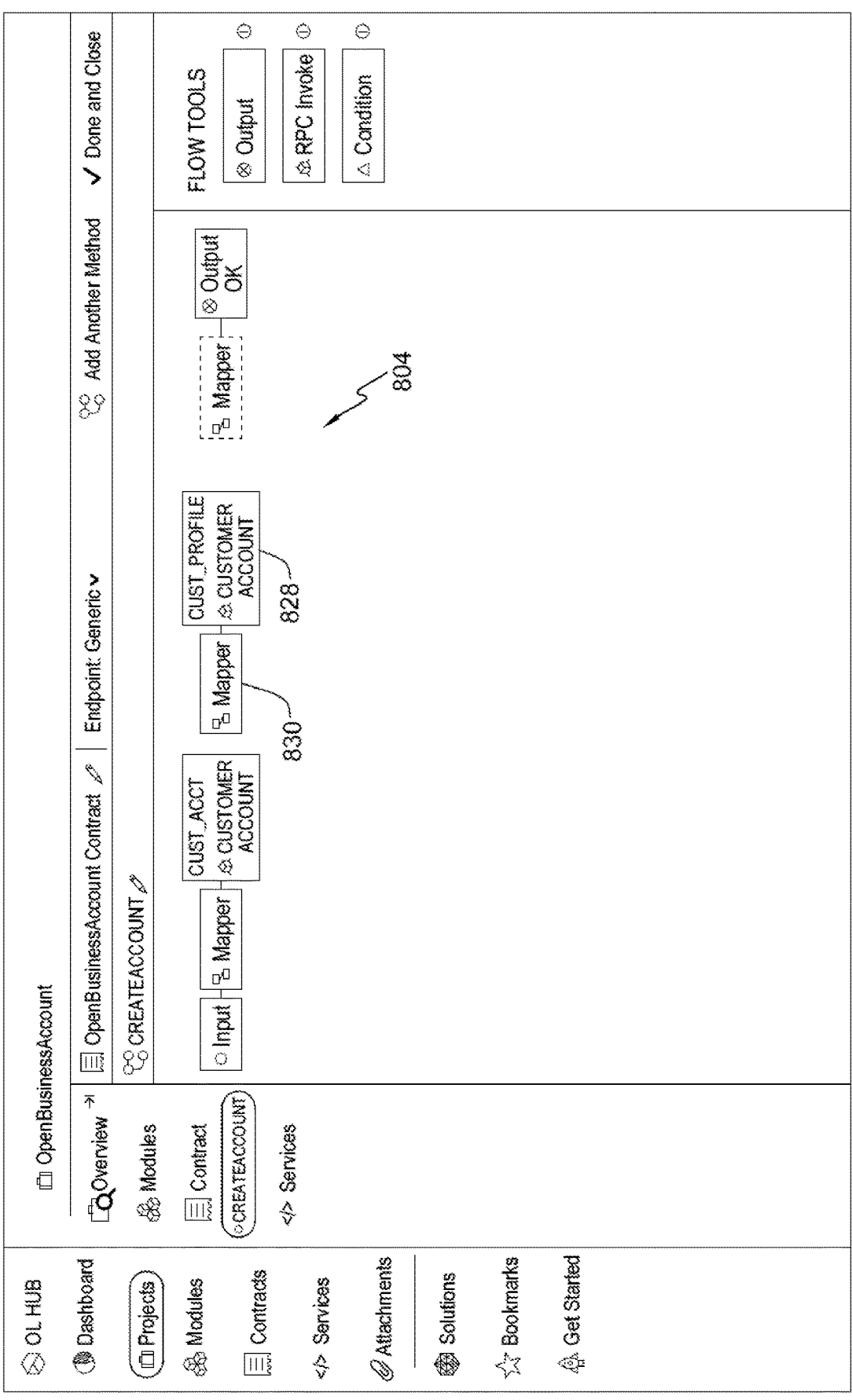

FIG. 8S depicts an interface in which the user adds a second RPC invocation to the flow in flow area 804. This adds another RPC call node 828 (which user selected to be the CUSTOMER ACCOUNT asset of the CUST_PROFILE module here), and a corresponding mapper node 830. Similar to mappings between the input node and prior-added RCP call node 814 described above, so too would a user provide mappings between the added RPC call node 828 and source(s) for it.

Figure 8T:
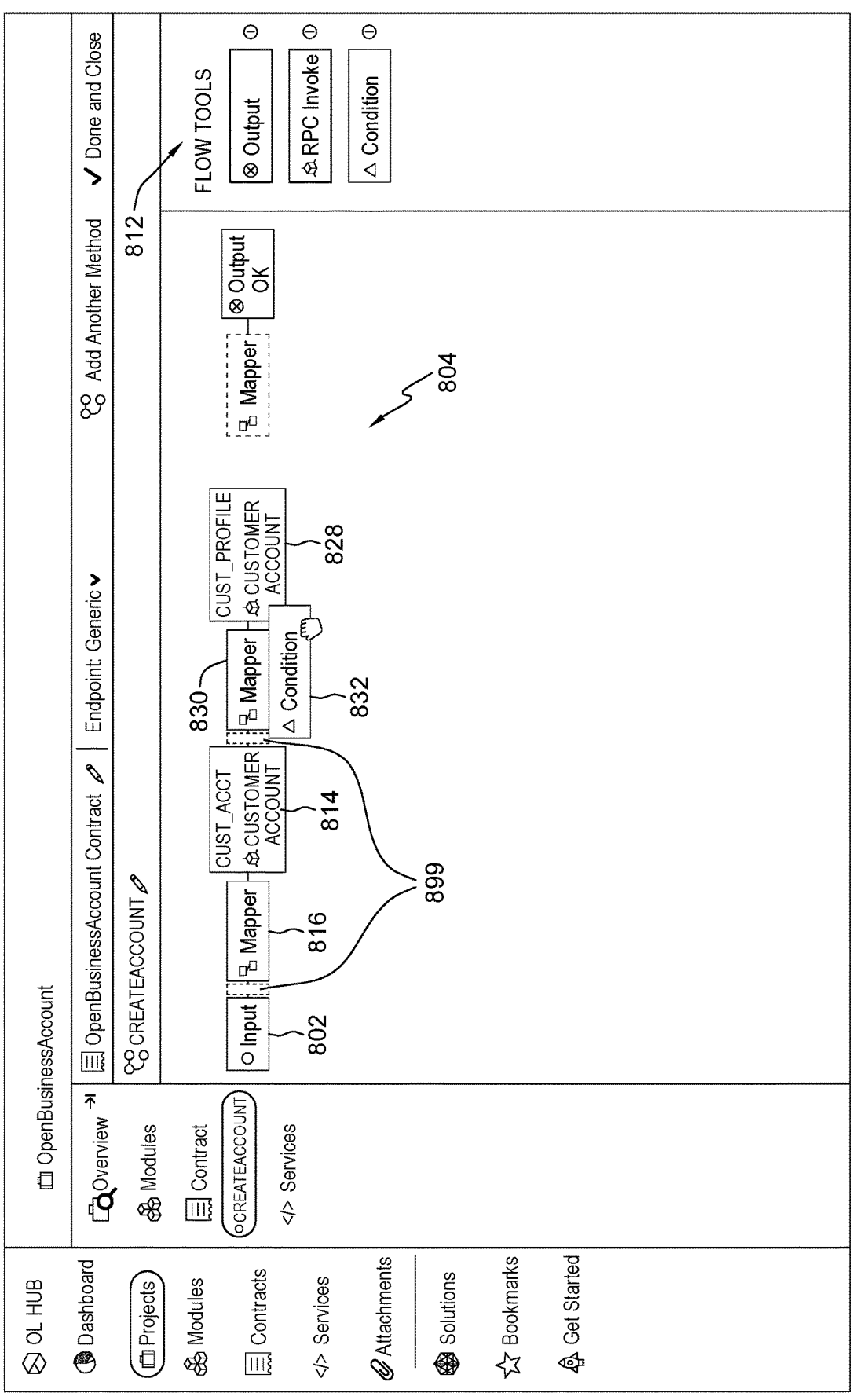

FIG. 8T depicts an interface in which the user adds a condition step 832 for the flow to progress (though mapper 830) from the CUSTOMER ACCOUNT asset 814 of the CUST_ACCT module to the CUSTOMER ACCOUNT asset 828 of the CUST_PROFILE module if the condition 832 being defined is satisfied. The condition node 832 is selected and dragged from the tool area 812 and dropped into the flow area 804. As the user drags the condition node 832 over the flow area 804, the interface can highlight, as shown here in dashed boxes 899, places where the condition node 832 could validly be dropped, e.g. between Input node 802 and mapper node 816 or between the CUSTOMER ACCOUNT asset node 814 and mapper node 830 as in FIG. 8T.

Figure 8U:
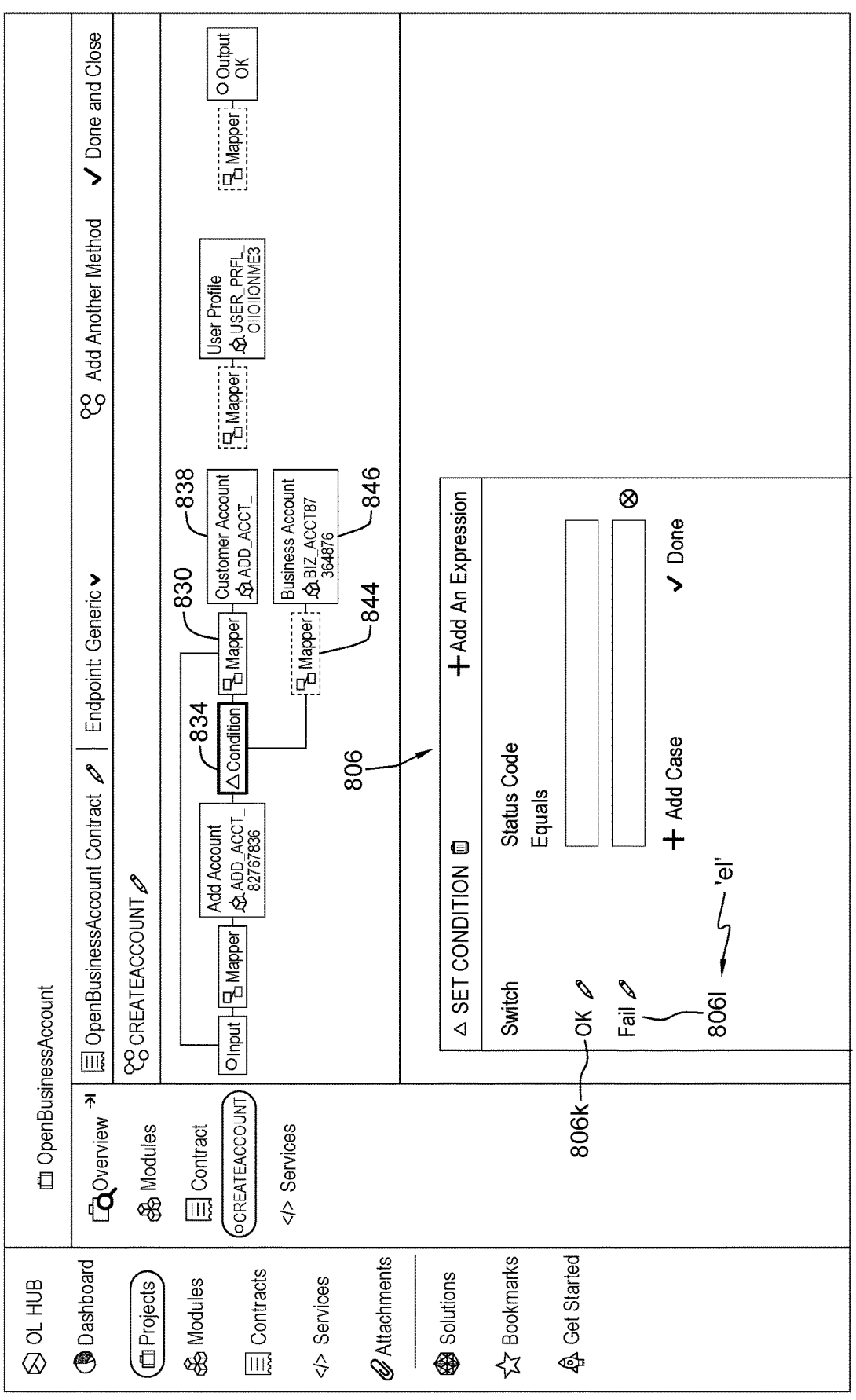

FIG. 8U depicts an interface for setting condition properties of a condition node 834 in another example flow. The condition properties as shown in 806 include definable 'cases', each as a switch with an expression for evaluation for equality. The particular path (of which there are two candidates in the above example—one to mapper 830, and one to mapper 844) to take from a condition to a mapper is dictated by the order in which the cases are presented and which case evaluates to true. Here, if the OK case 806k evaluates to true, then the flow proceeds to the CUST_ACCT asset 838. Otherwise, the Fail case 806l proceeds the flow to the BIZ_ACCT87364876 asset 846 of the Business Account module.

Figure 8V:
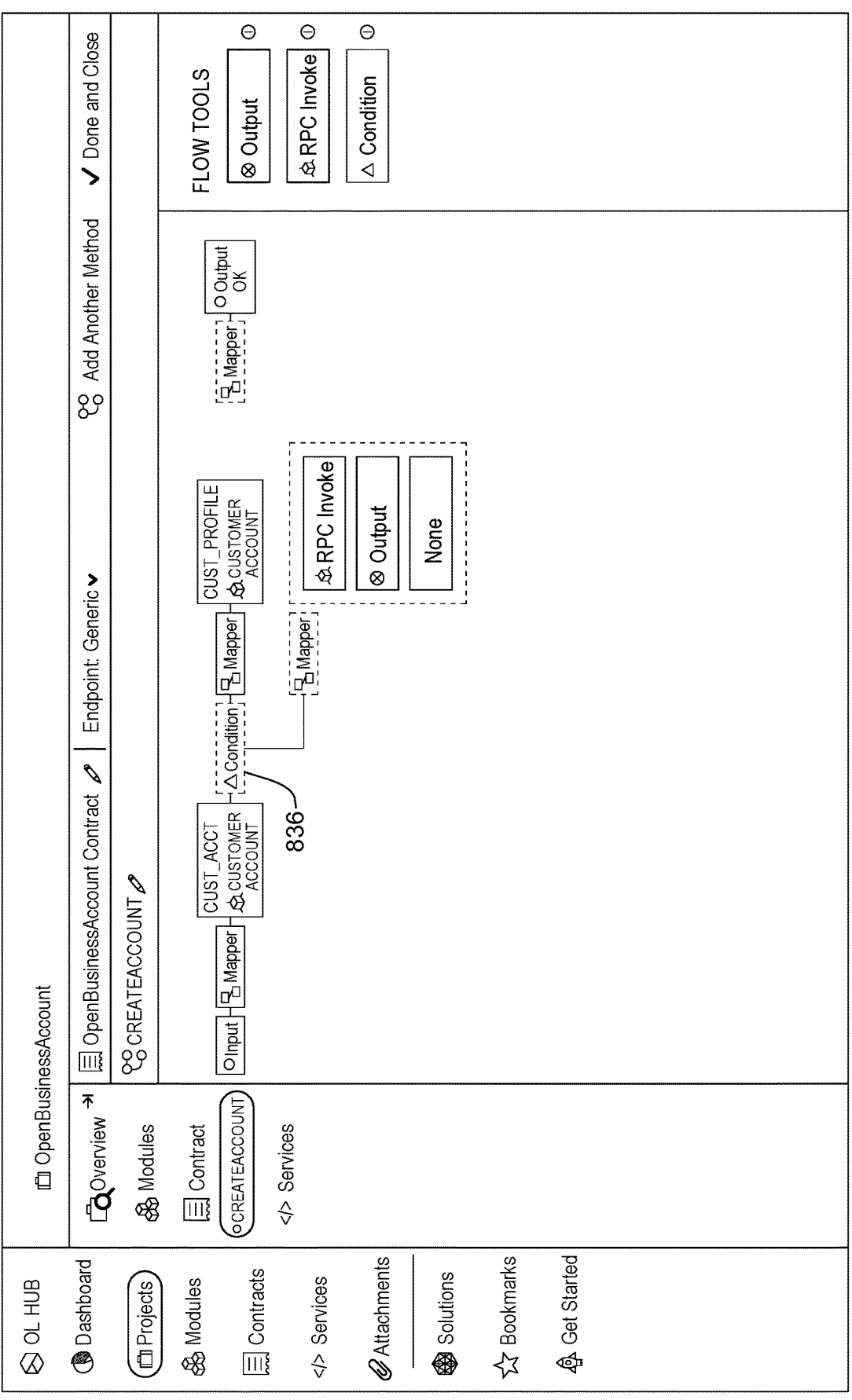

FIG. 8V depicts an interface showing a user defining branching from a condition flow node 836 to add another branch possibility. This is done by selecting between an RPC Invoke, an Output, or None to end branch definition. Selection of an RPC Invoke or Output would place a mapper node between it and the condition node 836 in order to properly map fields of input to the RPC call.

Figure 8W:
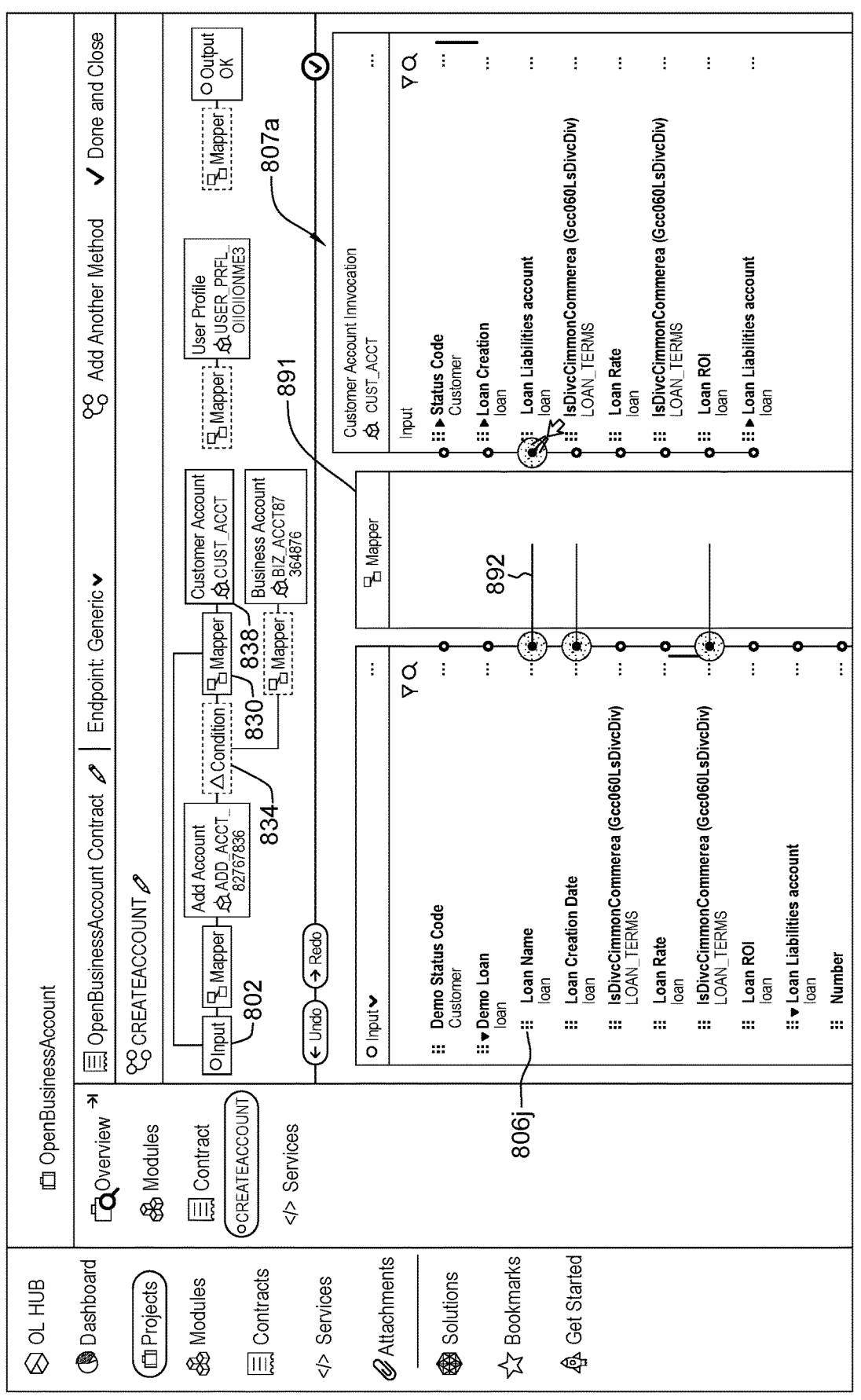

FIG. 8W depicts an interface for specifying the mapper 830 mappings between field(s) of Input 802 and the CUS- T_ACCT asset 838. When the user selects a field of the Input, say field Loan Name 806*j*, a partial mapping line 892 (in mapper area 891) extending from the field element 806*j* in the Input list is presented and the user can select a field on the right side 807*a* (under CUST_ACCT asset in this example) to complete the mapping, which will complete the mapping line to connect to the selected field, 'Loan Liabilities account' here.

Figure 8X:
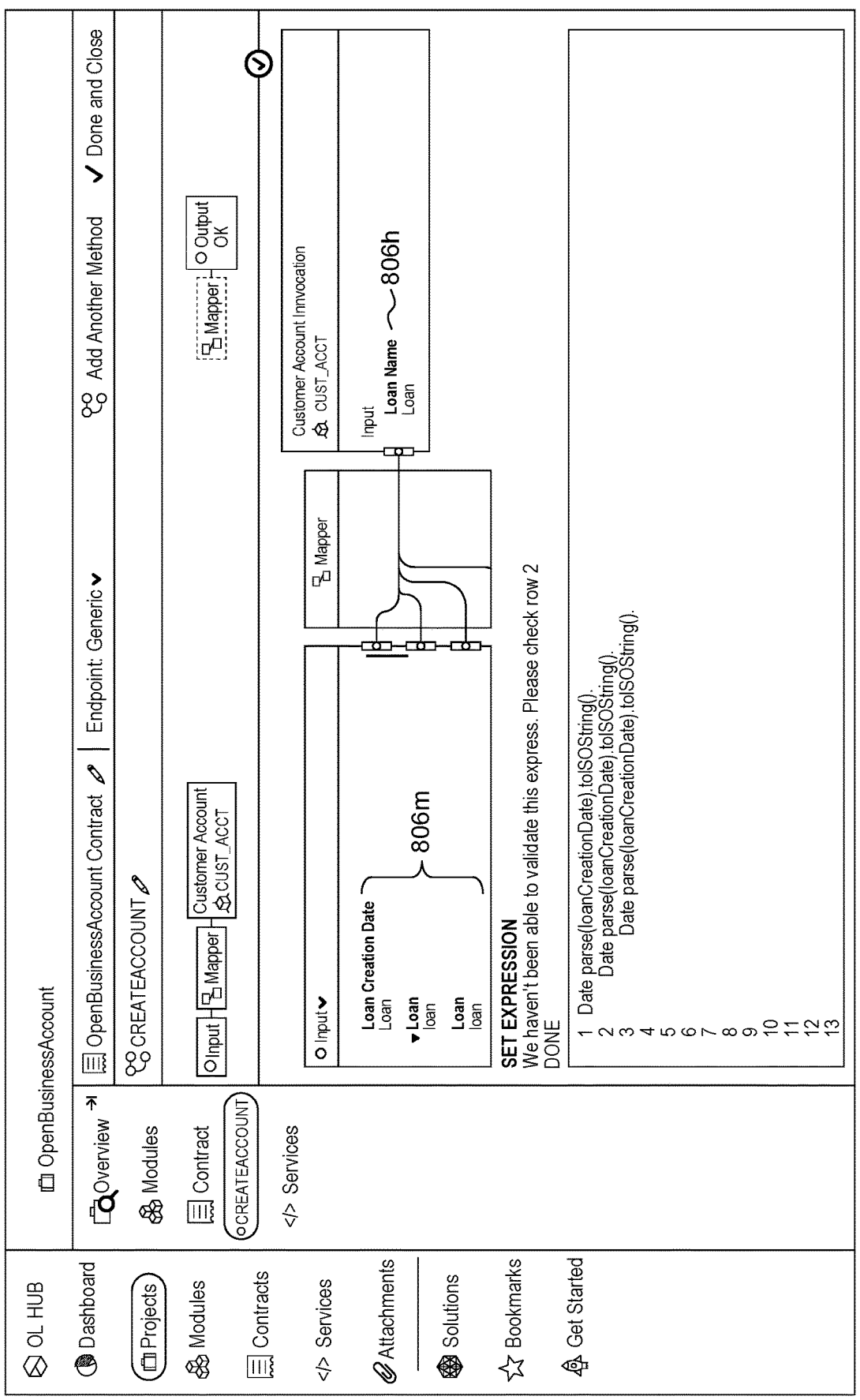

FIG. 8X depicts an interface for defining an expression for manipulating results from and to data fields, for instance to perform string operations such as concatenation, removal of superfluous characters, and parsing data fields into strings. In the example of FIG. 8X, four Input fields (three of which are depicted by 806*m*) are being concatenated into Loan Name data of Loan Name field 806*h*, which is of the CUST_ACCT asset.

Figure 8Y:
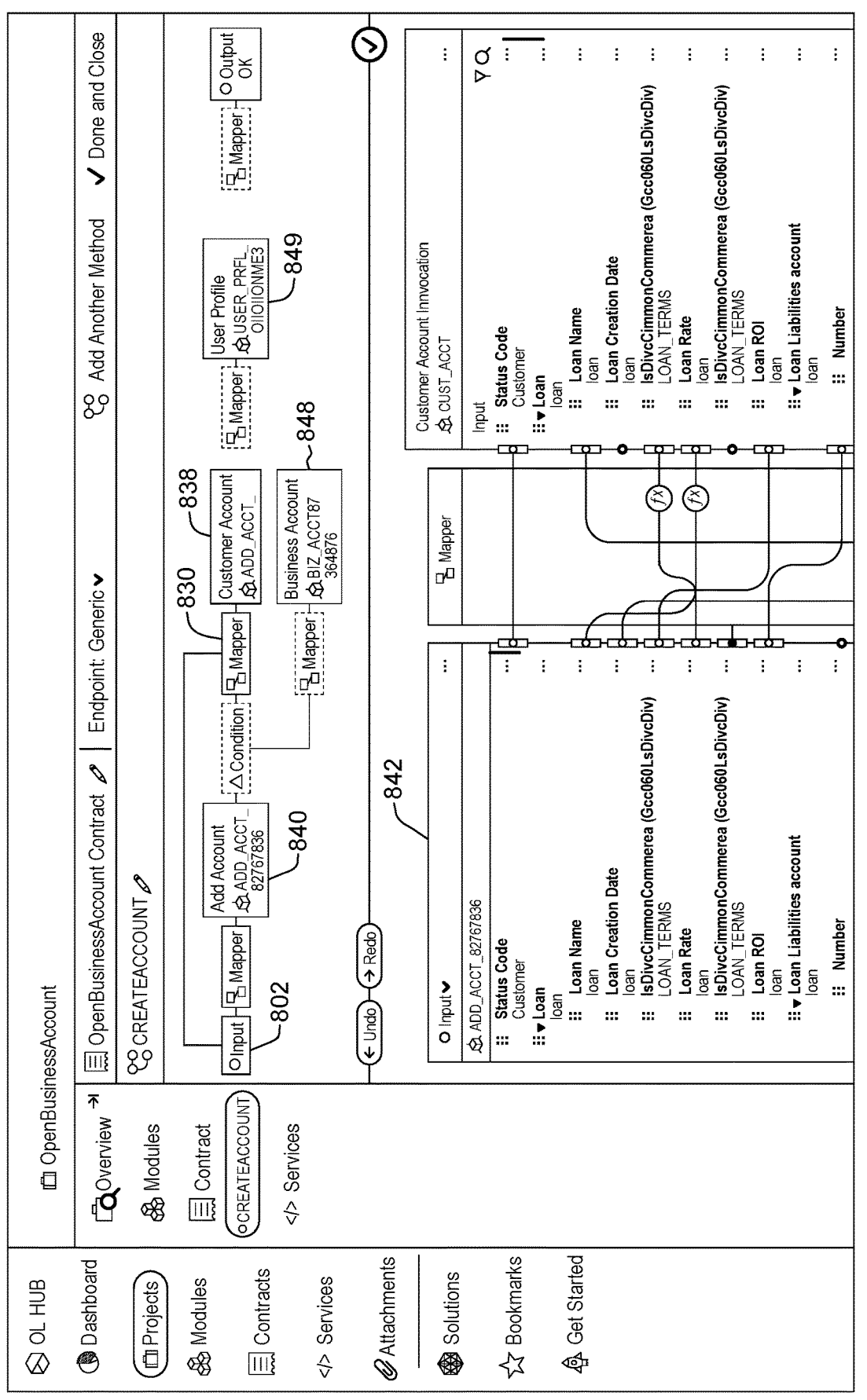

FIG. 8Y depicts an interface for toggling a source side of a mapper node, in this case mapper node 830. The current source of the mapping 830 is the Input node 802 but the user can select node 840 as the input 842 to the mapper 830 to change the source of the mapper 830 to another flow node, in this case asset ADD_ACCT_82767836 (represented by node 840) as the other available option based on what is already defined in the flow sequentially-prior to the mapper 830. It is noted that the other three assets (838, 848, 849) included in the flow are positioned after mapper node 830 and therefore are not available as an Input for this mapping 830.

Figure 8Z:
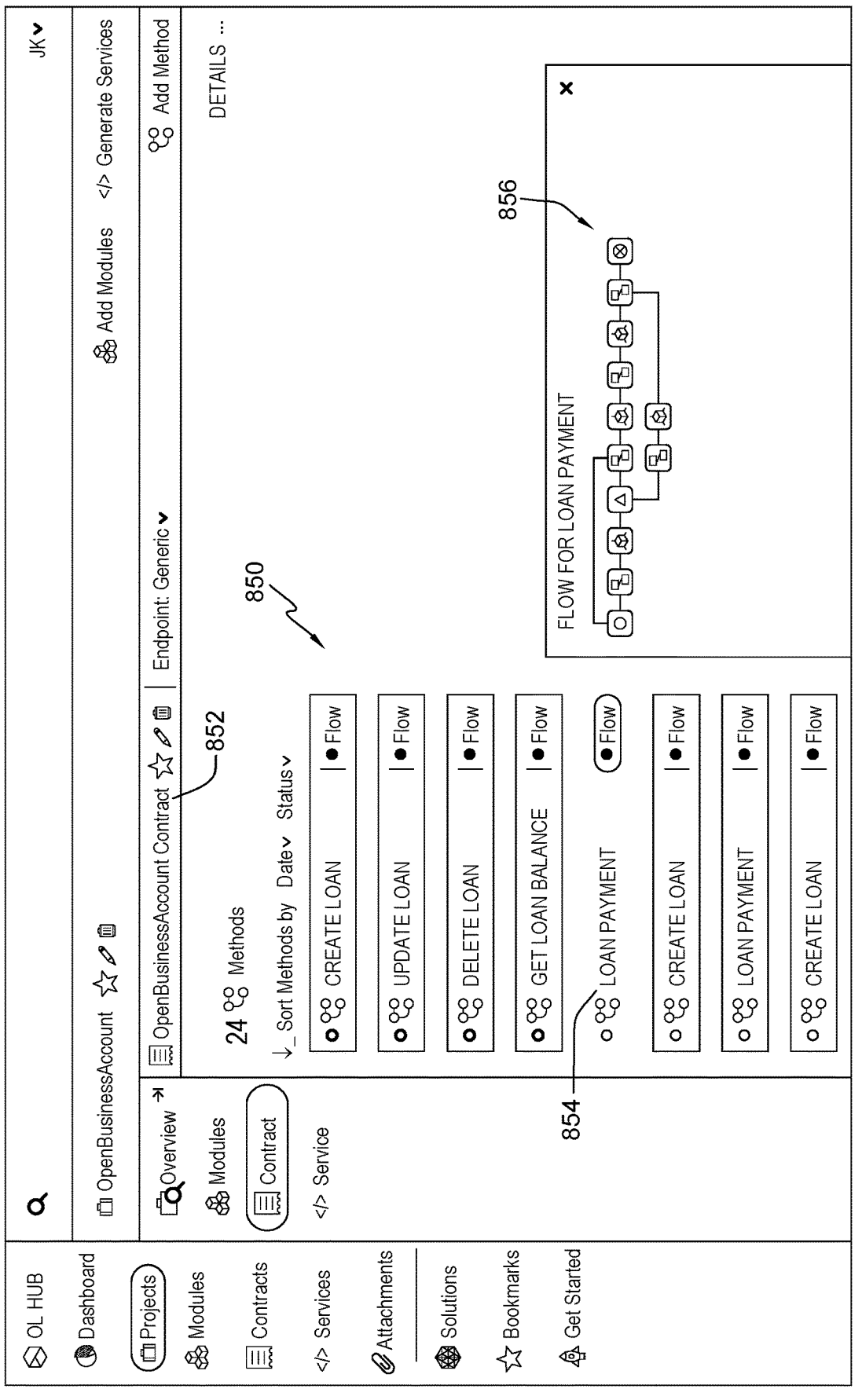
Figure 8A:
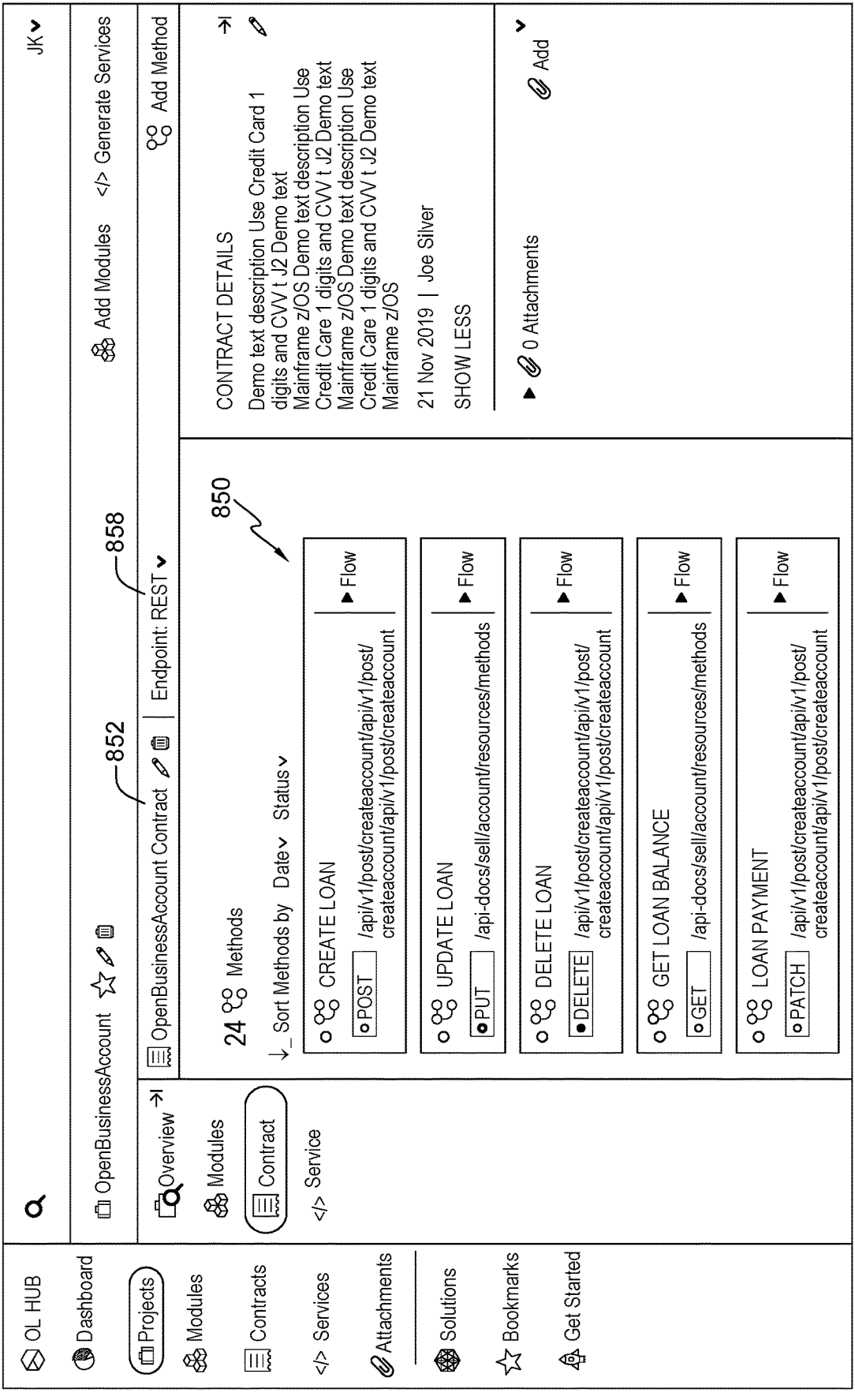
Figure 8A:
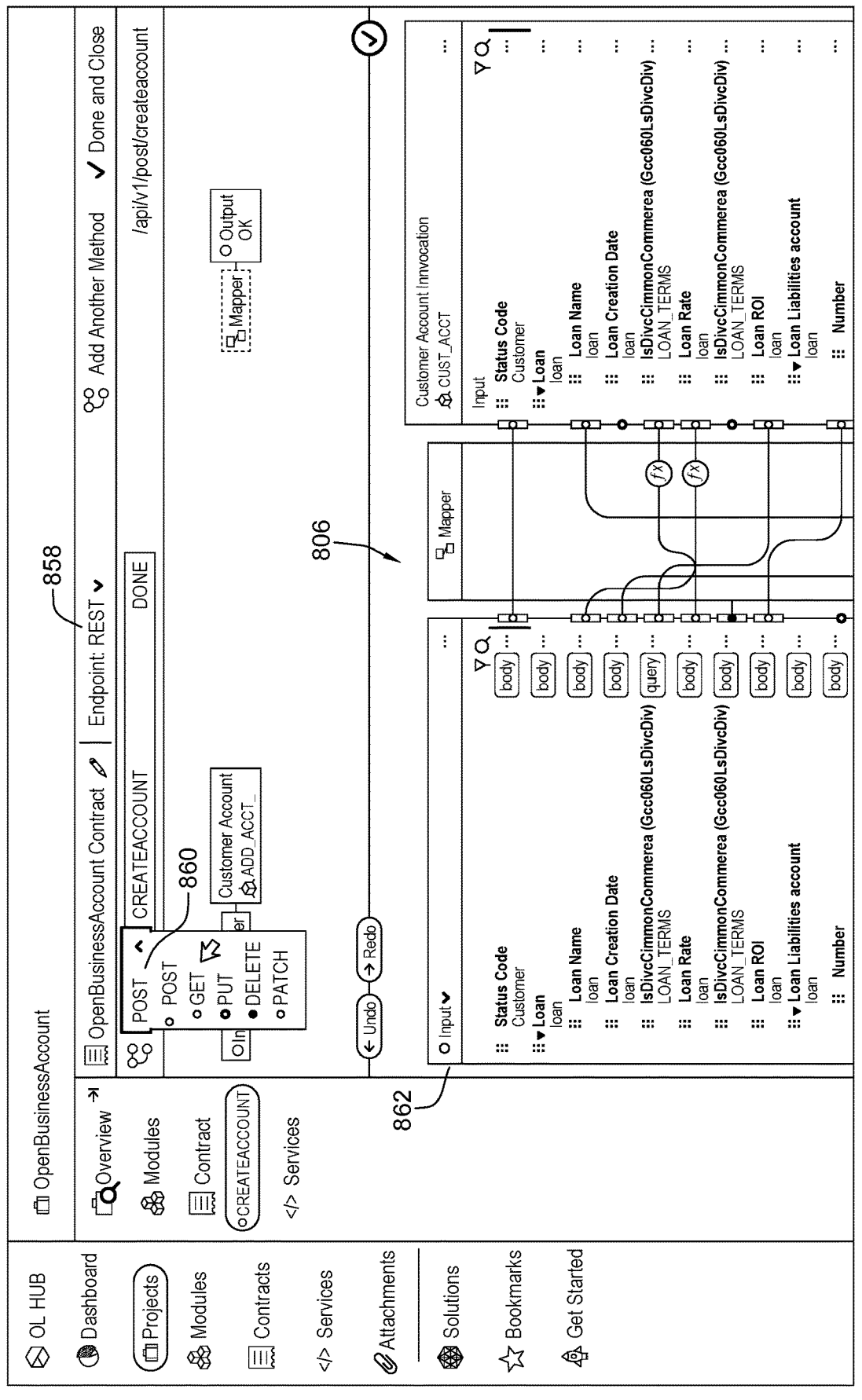
Figure 8A:
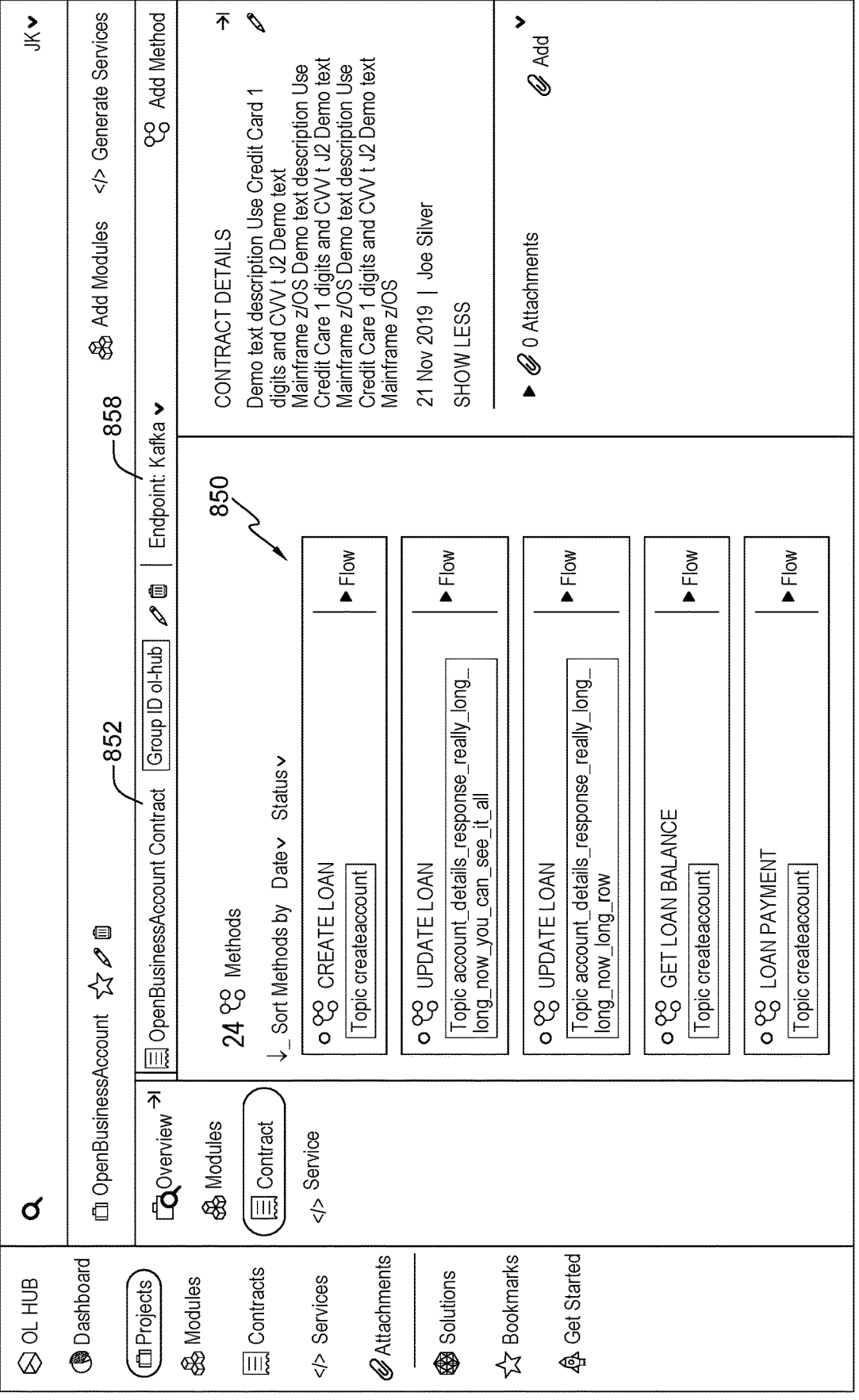
Figure 8A:
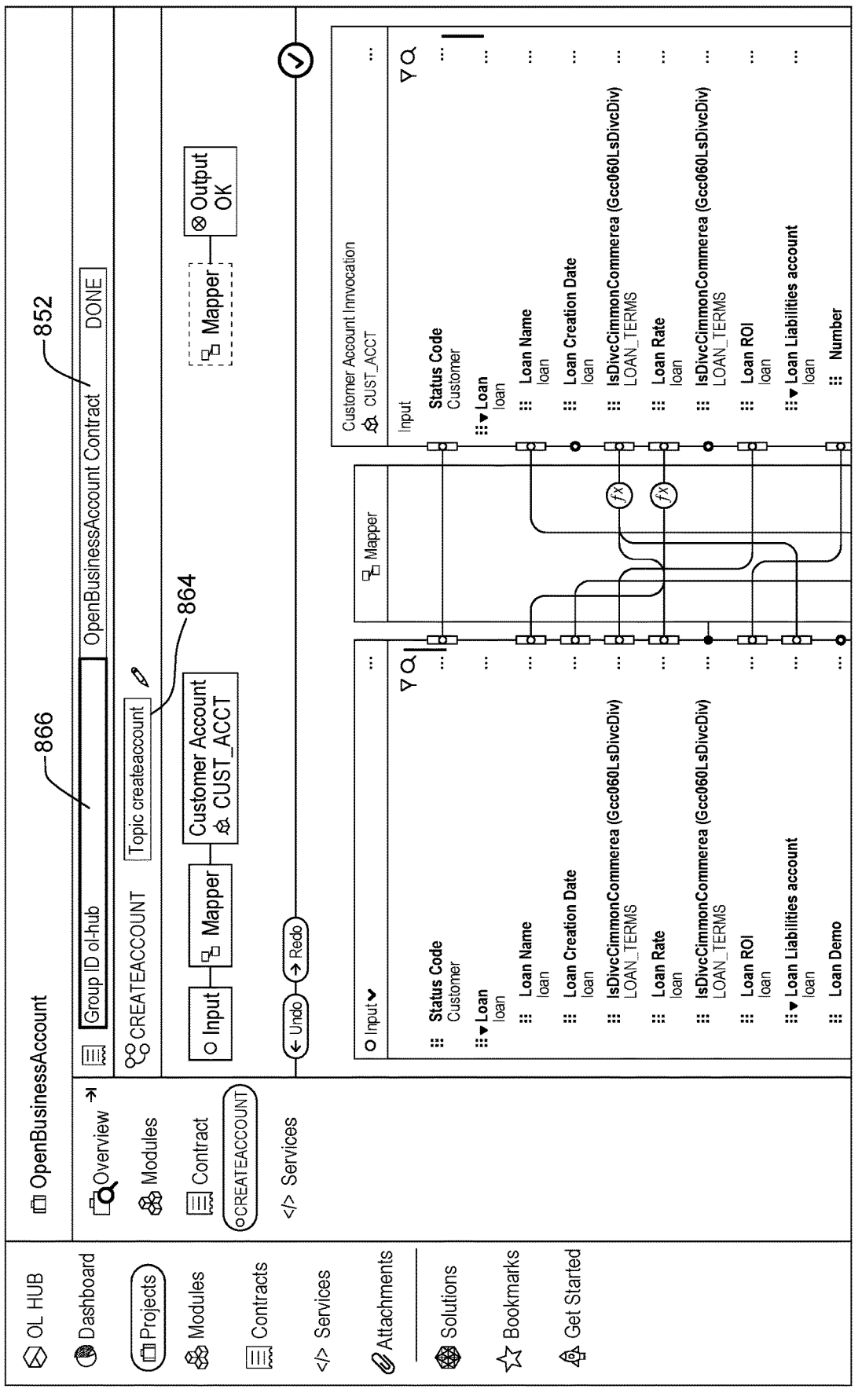

FIG. 8Z depicts an interface for previewing flows 850 corresponding to the methods that have been defined within the OpenBusinessAccount Contract 852. Here the LOAN PAYMENT method 854 is previewed as flow 856.

It is noted that in all of FIGS. 8A-8Z, the service endpoint designation is Generic, meaning the interface presents the generic definition of the flow(s).

FIG. 8AA depicts an interface of a partial listing 850 of the 24 methods of the OpenBusinessAccount Contract 852 but with a REST view (i.e. corresponding to REST endpoint type) selected by way of element 858. Here, appropriate RESTful calls such as POST, PUT, DELETE, GET, and PATCH have been applied to the five methods in view 850.

FIG. 8AB presents the interface after the user has selected a CREATEACCOUNT method. Since the service endpoint has been specified as REST (at 858), now the interface includes a method type selector pull-down menu 860 for designating the appropriate RESTful method to use for this CREATEACCOUNT method. It is also seen in 806 that the Input fields 862 now have designated REST parameters (body, query, etc.) as appropriate. These parameters may be default ones and/or customized/specified by the user.

FIG. 8AC depicts an interface of a partial listing 850 of the 24 methods 850 of the OpenBusinessAccount Contract 852 but with the Kafka view (i.e. corresponding to Kafka service endpoint) selected by way of element 858. Here, appropriate Kafka Topics have been applied to the 5 methods in view 852.

FIG. 8AD presents the interface after the user has selected a CREATEACCOUNT method. Since the service endpoint has been specified as Kafka (at 858, FIG. 8AC), now the interface includes 'Topic createaccount' designation 864 next to the CREATEACCOUNT method name, and presents a Group ID 866 Col-hub' in this example) for the OpenBusinessAccount Contract 852. Again, Kafka-specific parameters may be default ones and/or customized/specified by the user.

Some IT-related challenges that aspects described herein can address include:

IT Skills Gap: No legacy skills needed; codeless
Lack of Cloud Resources/Expertise: Built-in Cloud Deployments; Language agnostic
Lack of IT Governance/Control: Central Asset Management; Enforced Standardization
Cloud/Vendor Lockin: Multi-cloud; Interoperability
Lack of IT Decentralization: Citizen developer; Shared assets
Technological Obsolescence: Future-proof API factory; Specification-defined software (SDS)

Advantageously, when much of service development is specification-based, this alleviates need and reliance on particular deployment technology, as the particular technology for deployment can be an afterthought. This provides greater degree of freedom, flexibility, and future-proofing in terms of deployment technologies because the generically-defined flows can be adapted into whatever endpoints and protocols desired, whether known or later developed.

Figure 9A:
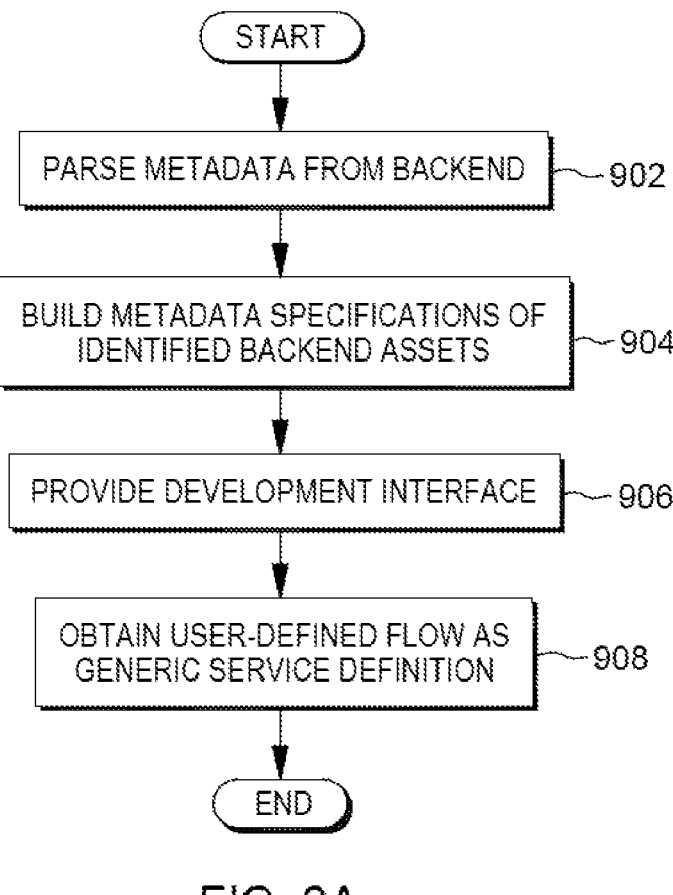
FIGS. 9A-9C depicts example processes to facilitate backend integration, in accordance with aspects described herein.
Figure 9B:
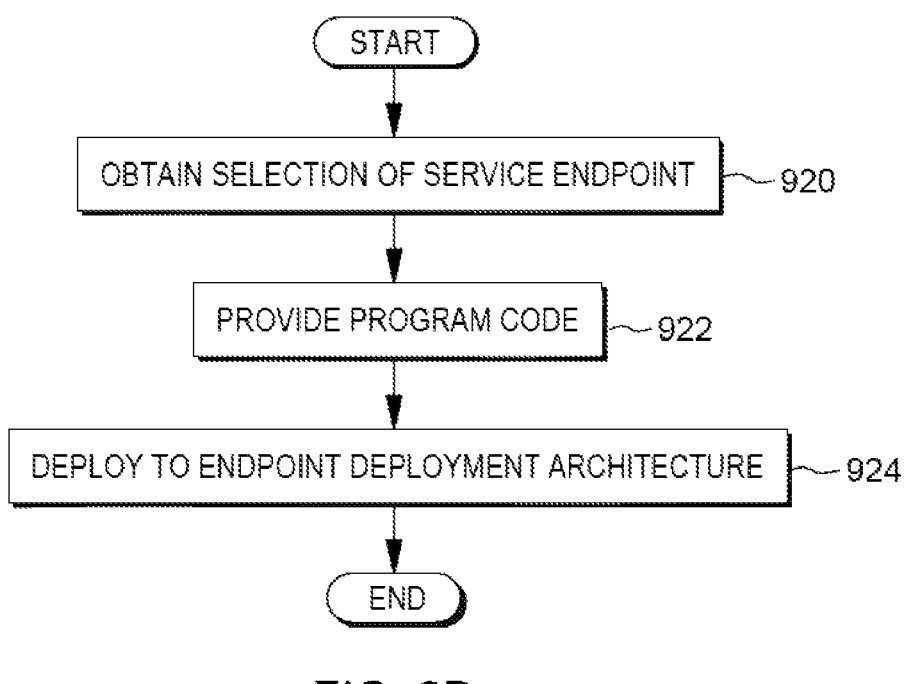
Figure 9C:
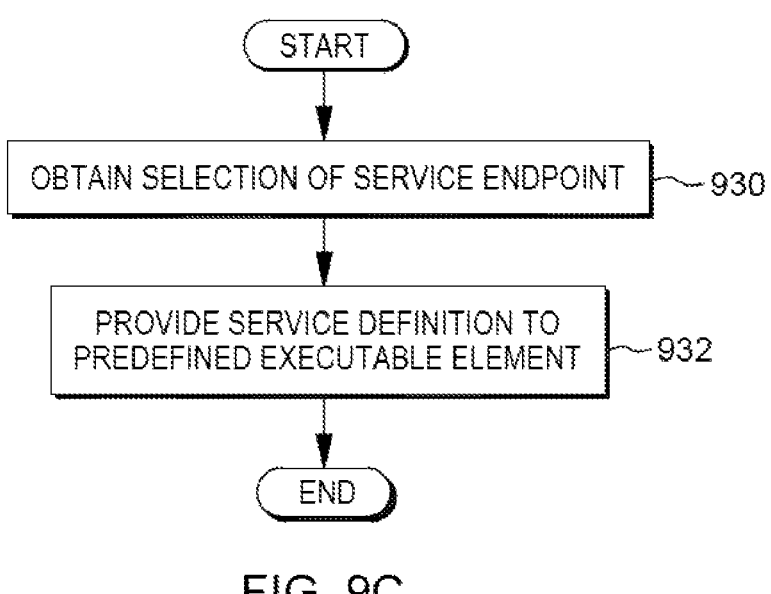

FIGS. 9A-9C depicts example processes to facilitate backend integration, in accordance with aspects described herein. In some examples, processes are performed by one or more computer systems, such as those described herein.

Referring to FIG. 9A, the process begins by parsing (902) metadata, collected from a backend system, describing functionality of the backend system, and identifying, based on the parsing, assets of the backend system, the assets including properties of calls supported by the backend system. The process automatically builds (904) metadata specifications of the identified assets and maintains these metadata specifications in a deployment repository as available constructs from which to develop services for deployment on one or more endpoint deployment architectures based on selected service endpoints. Each metadata specification of the metadata specifications can correspond to a given asset, of the backend system, that uses a first data format (a backend system format, e.g. COBOL), and defines translations between the first data format and a second data format that is different from the first data format and that is agnostic to the selected service endpoints and the one or more endpoint deployment architectures, to provide agnostic development of the services. The metadata specifications can provide abstractions of the first data format to the second format.

In particular embodiments, process(es) automatically access the backend system and collect the metadata therefrom, parse the collected metadata and perform the automatically building (904) the metadata specifications absent user intervention, and uploads these built metadata specifications to the development repository.

The process also provides (906) a development interface to a user. The development interface can include available user-selectable flow elements having properties that include inputs and outputs in formats based on the metadata specifications maintained in the deployment repository, the available user-selectable flow elements available for selective use by the user in developing a service. The flow elements can correspond to various calls to the backend, and depending on what the user selects, the elements will have the appropriate properties, as informed by the metadata specifications, for making the calls.

A user can build the flow and define the mappings as desired, and, based on the user defining the flow using the development interface, the process can obtain (908) the user-defined flow as a generic definition of the service that is agnostic to any specific service endpoint and endpoint deployment architecture on which the service is to be deployed. The user-defined flow can include a plurality of flow elements including, for instance (i) an input flow element, (ii) a selected one or more flow elements selected by the user from the available user-selectable flow elements, and (iii) an output flow element, and mappings between the plurality of flow elements. The mappings can represent flow of data between the flow elements, and the user-defined flow can thereby define a flow of execution to provide the service. The selected one or more flow elements can represent one or more calls to the backend system, including, for instance, data input/output associated with the one or more calls.

In examples, the generic definition of the service can include a plurality of flow elements representing a corresponding plurality of calls (e.g. corresponding to parts, steps of a transaction in examples) supported by the backend system. At least one of the plurality of calls can include a stateful call to the backend system. The service can include a single application programming interface (API) configured, based on calling the API by a calling entity, for intra-service orchestration to invoke the plurality of calls supported by the backend system as part of the flow of execution and provide data back to the calling entity as a response to the calling of the API.

FIG. 9B presents an example for deploying a built service. The process obtains (920) a selection of a service endpoint. The service endpoint corresponds to a protocol for the service to be deployed. The process automatically provides (922), based on the obtained generic definition of the service, program code configured for execution on an endpoint deployment architecture to provide the service. The process additionally deploys (924) the automatically provided program code to the endpoint deployment architecture. The deploying can expose the service executing on the endpoint deployment architecture for access according to the selected endpoint.

In one example, the automatically providing and the deploying implement the service using a full code approach, in which a complete project and executable code is generated and provided for user customization. Alternatively, the automatically providing and the deploying implement the service using a low-code approach, in which a predefined executable component implementing a flow engine executes based on the generic definition of the service (optionally with user-specific overrides/customizations that are relevant and/or specific to the selected service endpoint) to perform the service, and one or more intervention points are defined for execution of user-provided customized program code to intervene in flow engine execution and perform customized actions provided by the user.

FIG. 9B presents another example for deploying a built service. The process obtains (930) a selection of a service endpoint. The service endpoint corresponds to a protocol for the service to be deployed. The process also automatically provides (932) the obtained generic definition of the service (optionally with user-specific overrides/customizations that are relevant and/or specific to the selected service endpoint) as a service specification to at least one predefined executable component. The at least one predefined executable component is configured for execution on an endpoint deployment architecture and is configured to consume the service specification to expose the service executing on the endpoint deployment architecture for access according to the selected endpoint.

In particular examples, a selected service endpoint is Representational state transfer (REST), Kafka, SOAP, or gRPC.

In some examples, a process maintains a catalog of information about the assets, the information including knowledge about asset-specific or module-specific usage of the calls supported by the backend system, and provides the catalog of information for reference by a user.

Additionally or alternatively, an example process can associate a metadata specification with one or more tests for testing the metadata specification, test the metadata specification, the testing comprising invoking actions on the backend system pursuant to the metadata specification and obtaining results in response, and assess based on the obtained results whether the metadata specification successfully integrates with its corresponding asset of the backend system. Successful integration of the metadata specification with its corresponding asset can include, for instance, successful translation of data pursuant to the metadata specification, availability of backend asset, and/or availability of a connection to the backend system. In some examples, this testing and assessing can be repeated one or more times across a time frame to verify, based on results of the repeating, that the metadata specification continues, across the time frame, to successfully integrate with its corresponding asset of the backend system.

In some embodiments, provided is a service development and provisioning platform to facilitate development and provision of services, an example of which is APIs. The platform can include a Hub having a repository with metadata specifications of constructs, including modules with assets thereof, for use in developing services, a catalog for holding context of the constructs and for searching for constructs to use in developing services, and a testing facility to test the constructs, the constructs being generic in that they are not tied to any particular deployment platform for the service; a solution center with modules, deployers, generators, contracts, snippets and/or templates for a user to pull into the Hub for development of a specific service; a CLI component to facilitate automated interaction between a legacy/backend system and the Hub in order to perform aspects that include obtaining and parsing legacy/backend system assets and turning them into metadata specifications of usable constructs of the repository; and a development interface as a CLI, API, or web interface to facilitate users leveraging the Hub constructs and a solution center to define and develop services in a platform-agnostic manner to produce a generic service definition that can be processed into platform/environment-specific logic to run and perform aspects of the service.

Additionally or alternatively, generators and/or deployers of the solution center can generate, from the generic service definition, and deploy platform/environment-specific logic based on a selected technology-specific endpoint platform/environment to which the service is to be deployed, where the platform/environment-specific logic is generated as code capable of being run on the technology-specific endpoint platform/environment.

Additionally or alternatively, the Hub repository is hosted on-premises of a user, in a private cloud of the user, and/or public.

Additionally or alternatively, a user can use the service development and provisioning platform to develop the service in a contract-first approach, in which the service development and provisioning platform obtains a definition of the contract in technology-specific interface description language and automatically genericizes aspects of the definition of the contract into technology-agnostic interfaces maintained for reusability and portability, or a contract-last approach.

Additionally or alternatively, implementation of the service is by a full code approach in which code is generated from the generic description to produce contained executable code, a no-code approach in which the generic description is input to an executing engine that uses the generic description to direct its processing to provide the service, or a low-code approach in which portions of the generic description are input to an executing engine that uses the generic description to direct its processing while also stopping at user-defined intervention points to execute customized code before resuming execution of the engine.

Additionally or alternatively, the testing facility can test the constructs despite the constructs not being executable program code.

Additionally or alternatively, computer system(s) host the Hub, solution center, and development interface components of the service development and provisioning platform.

A method of developing and provisioning a service can be provided that includes a user interacting with a Hub, solution center, CLI component, and development interface. Additionally or alternatively, a computer program product with program instructions for execution to perform any of the foregoing can be provided.

Although various examples are provided, variations are possible without departing from a spirit of the claimed aspects.

Figure 10:
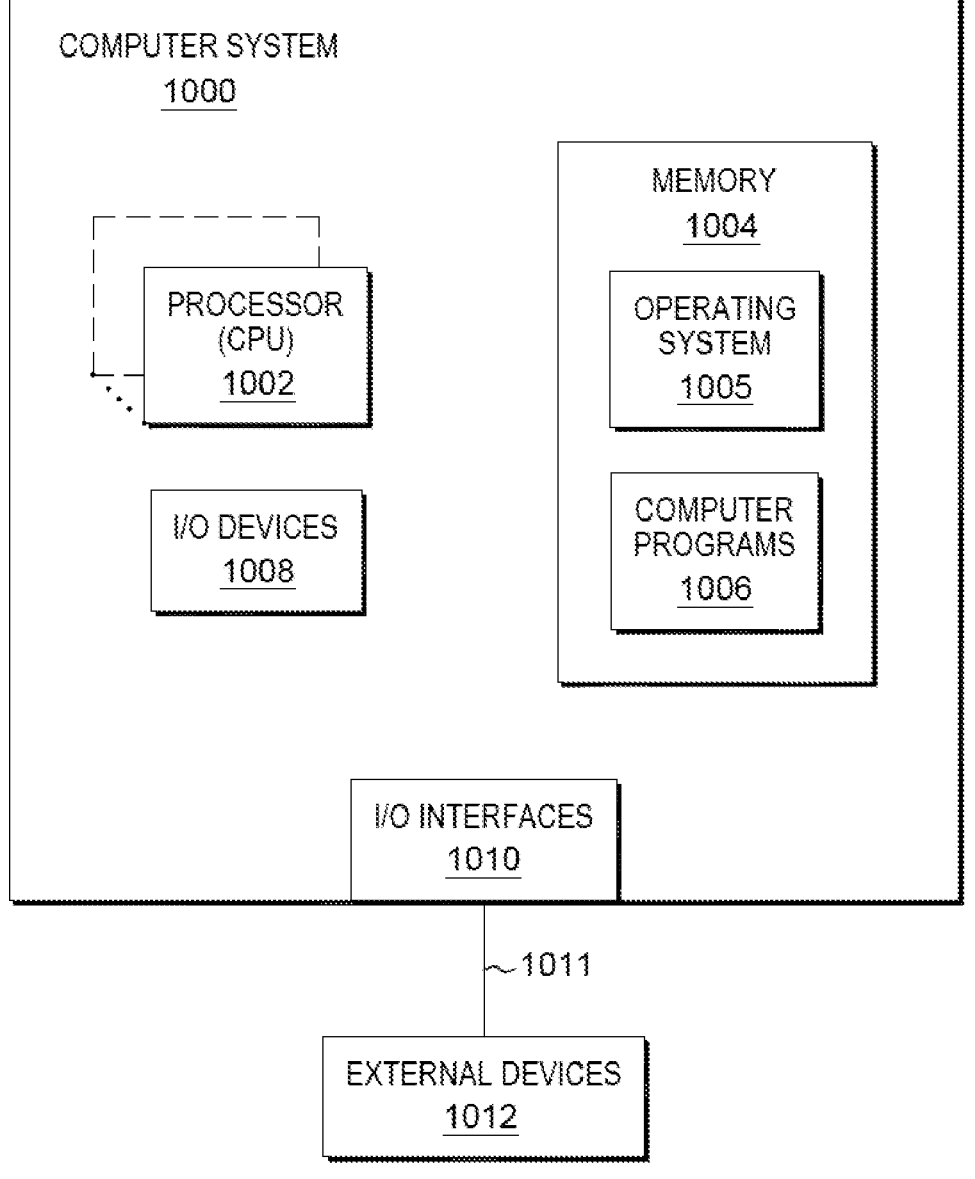
FIG. 10 depicts one example of a computer system and associated devices to incorporate and/or use aspects described herein.

Processes described herein may be performed singly or collectively by one or more computer systems, such as one or more user computer system(s), cloud server(s), and/or any other types of computer systems, as examples. FIG. 10 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, California, USA) or ARM Holdings plc (Cambridge, England, United Kingdom), as examples.

FIG. 10 shows a computer system 1000 in communication with external device(s) 1012. Computer system 1000 includes one or more processor(s) 1002, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1002 can also include register(s) to be used by one or more of the functional components. Computer system 1000 also includes memory 1004, input/output (I/O) devices 1008, and I/O interfaces 1010, which may be coupled to processor(s) 1002 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1004 can be or include main or system memory (e.g. Random Access Memory) used in the execution of program instructions, storage device(s) such as hard drive (s), flash media, or optical media as examples, and/or cache memory, as examples. Memory 1004 can include, for instance, a cache, such as a shared cache, which may be coupled to local caches (examples include L1 cache, L2 cache, etc.) of processor(s) 1002. Additionally, memory 1004 may be or include at least one computer program product having a set (e.g., at least one) of program modules, instructions, code or the like that is/are configured to carry out functions of embodiments described herein when executed by one or more processors.

Memory 1004 can store an operating system 1005 and other computer programs 1006, such as one or more computer programs/applications that execute to perform aspects described herein. Specifically, programs/applications can include computer readable program instructions that may be configured to carry out functions of embodiments of aspects described herein.

Examples of I/O devices 1008 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1012) coupled to the computer system through one or more I/O interfaces 1010.

Computer system 1000 may communicate with one or more external devices 1012 via one or more I/O interfaces 1010. Example external devices include a keyboard, a pointing device, a display, and/or any other devices that enable a user to interact with computer system 1000. Other example external devices include any device that enables computer system 1000 to communicate with one or more other computing systems or peripheral devices such as a printer. A network interface/adapter is an example I/O interface that enables computer system 1000 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 1010 and external devices 1012 can occur across wired and/or wireless communications link(s) 1011, such as Ethernet-based wired or wireless connections. Example wireless connections include cellular, Wi-Fi, Bluetooth®, proximity-based, near-field, or other types of wireless connections. More generally, communications link(s) 1011 may be any appropriate wireless and/or wired communication link(s) for communicating data.

Particular external device(s) 1012 may include one or more data storage devices, which may store one or more programs, one or more computer readable program instructions, and/or data, etc. Computer system 1000 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1000 may be operational with numerous other general purpose or special purpose computing system environments or configurations. Computer system 1000 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects of the present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C #, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

parsing metadata, collected from a backend system, describing functionality of the backend system, and identifying, based on the parsing, assets of the backend system, the assets including properties of calls supported by the backend system;

automatically building metadata specifications of the identified assets and maintaining the metadata specifications in a deployment repository as available constructs from which to develop services for deployment on one or more endpoint deployment architectures based on selected service endpoints, wherein each metadata specification of the metadata specifications corresponds to a given asset, of the backend system, that uses a first data format, and defines translations between the first data format and a second data format that is different from the first data format and that is agnostic to the selected service endpoints and the one or more endpoint deployment architectures, to provide agnostic development of the services;

providing a development interface to a user, the development interface comprising available user-selectable flow elements having properties that include inputs and outputs in formats based on the metadata specifications maintained in the deployment repository, the available user-selectable flow elements available for selective use by the user in developing a service; and based on the user defining a flow using the development interface, obtaining the user-defined flow as a generic definition of the service that is agnostic to any specific service endpoint and endpoint deployment architecture on which the service is to be deployed, the user-defined flow comprising a plurality of flow elements including (i) an input flow element, (ii) a selected one or more flow elements selected by the user from the available user-selectable flow elements, and (iii) an output flow element, and mappings between the plurality of flow elements, the mappings representing flow of data between the flow elements, and the user-defined flow defining a flow of execution to provide the service, wherein the selected one or more flow elements represent one or more calls to the backend system.

2. The method of claim 1, further comprising:

obtaining a selection of a service endpoint, the service endpoint corresponding to a protocol for the service to be deployed;

automatically providing, based on the obtained generic definition of the service, program code configured for execution on an endpoint deployment architecture to provide the service; and deploying the automatically provided program code to the endpoint deployment architecture, wherein the deploying exposes the service executing on the endpoint deployment architecture for access according to the selected endpoint.

3. The method of claim 2, wherein the automatically providing and the deploying implement the service using one selected from the group consisting of:

a full code approach, in which a complete project and executable code is generated and provided for user customization; and a low-code approach, in which a predefined executable component implementing a flow engine executes based on the generic definition of the service to perform the service, and one or more intervention points are defined for execution of user-provided customized program code to intervene in flow engine execution and perform customized actions provided by the user.

4. The method of claim 1, further comprising:

obtaining a selection of a service endpoint, the service endpoint corresponding to a protocol for the service to be deployed;

automatically providing the obtained generic definition of the service as a service specification to at least one predefined executable component, the at least one predefined executable component configured for execution on an endpoint deployment architecture and configured to consume the service specification to expose the service executing on the endpoint deployment architecture for access according to the selected endpoint.

5. The method of claim 4, wherein the selected service endpoint is one selected from the group consisting of: Representational state transfer (REST), Kafka, SOAP, and gRPC.

6. The method of claim 1, further comprising automatically, by one or more processes:

accessing the backend system and collecting the metadata therefrom;

parsing the collected metadata and performing the automatically building the metadata specifications absent user intervention; and uploading the built metadata specifications to the development repository.

7. The method of claim 1, further comprising maintaining a catalog of information about the assets, the information including knowledge about asset-specific or module-specific usage of the calls supported by the backend system, and providing the catalog of information for reference by a user.

8. The method of claim 1, further comprising:

associating a metadata specification with one or more tests for testing the metadata specification;

testing the metadata specification, the testing comprising invoking actions on the backend system pursuant to the metadata specification and obtaining results in response; and assessing based on the obtained results whether the metadata specification successfully integrates with its corresponding asset of the backend system.

9. The method of claim 8, wherein successful integration of the metadata specification with its corresponding asset comprises at least one selected from the group consisting of: successful translation of data pursuant to the metadata specification; availability of backend asset; and availability of a connection to the backend system.

10. The method of claim 8, further comprising repeating the testing and the assessing one or more times across a time frame to verify, based on results of the repeating, that the metadata specification continues, across the time frame, to successfully integrate with its corresponding asset of the backend system.

11. The method of claim 1, wherein the generic definition of the service comprises a plurality of flow elements representing a corresponding plurality of calls supported by the backend system, at least one of the plurality of calls comprising a stateful call to the backend system, wherein the service comprises a single application programming interface (API) configured, based on calling the API by a calling entity, for intra-service orchestration to invoke the plurality of calls supported by the backend system as part of the flow of execution and provide data back to the calling entity as a response to the calling of the API.

12. A computer system comprising:

a memory; and a processor in communication with the memory, wherein the computer system is configured to perform a method comprising:

parsing metadata, collected from a backend system, describing functionality of the backend system, and identifying, based on the parsing, assets of the backend system, the assets including properties of calls supported by the backend system;

automatically building metadata specifications of the identified assets and maintaining the metadata specifications in a deployment repository as available constructs from which to develop services for deployment on one or more endpoint deployment architectures based on selected service endpoints, wherein each metadata specification of the metadata specifications corresponds to a given asset, of the backend system, that uses a first data format, and defines translations between the first data format and a second data format that is different from the first data format and that is agnostic to the selected service endpoints and the one or more endpoint deployment architectures, to provide agnostic development of the services;

providing a development interface to a user, the development interface comprising available user-selectable flow elements having properties that include inputs and outputs in formats based on the metadata specifications maintained in the deployment repository, the available user-selectable flow elements available for selective use by the user in developing a service; and based on the user defining a flow using the development interface, obtaining the user-defined flow as a generic definition of the service that is agnostic to any specific service endpoint and endpoint deployment architecture on which the service is to be deployed, the user-defined flow comprising a plurality of flow elements including (i) an input flow element, (ii) a selected one or more flow elements selected by the user from the available user-selectable flow elements, and (iii) an output flow element, and mappings between the plurality of flow elements, the mappings representing flow of data between the flow elements, and the user-defined flow defining a flow of execution to provide the service, wherein the selected one or more flow elements represent one or more calls to the backend system.

13. The computer system of claim 12, wherein the method further comprises:

obtaining a selection of a service endpoint, the service endpoint corresponding to a protocol for the service to be deployed;

automatically providing, based on the obtained generic definition of the service, program code configured for execution on an endpoint deployment architecture to provide the service; and deploying the automatically provided program code to the endpoint deployment architecture, wherein the deploying exposes the service executing on the endpoint deployment architecture for access according to the selected endpoint;

wherein the automatically providing and the deploying implement the service using one selected from the group consisting of:

a full code approach, in which a complete project and executable code is generated and provided for user customization; and a low-code approach, in which a predefined executable component implementing a flow engine executes based on the generic definition of the service to perform the service, and one or more intervention points are defined for execution of user-provided customized program code to intervene in flow engine execution and perform customized actions provided by the user.

14. The computer system of claim 12, wherein the method further comprises:

obtaining a selection of a service endpoint, the service endpoint corresponding to a protocol for the service to be deployed;

automatically providing the obtained generic definition of the service as a service specification to at least one predefined executable component, the at least one predefined executable component configured for execution on an endpoint deployment architecture and configured to consume the service specification to expose the service executing on the endpoint deployment architecture for access according to the selected endpoint.

15. The computer system of claim 12, wherein the method further comprises:

associating a metadata specification with one or more tests for testing the metadata specification;

testing the metadata specification, the testing comprising invoking actions on the backend system pursuant to the metadata specification and obtaining results in response; and assessing based on the obtained results whether the metadata specification successfully integrates with its corresponding asset of the backend system.

16. The computer system of claim 12, wherein the generic definition of the service comprises a plurality of flow elements representing a corresponding plurality of calls supported by the backend system, at least one of the plurality of calls comprising a stateful call to the backend system, wherein the service comprises a single application programming interface (API) configured, based on calling the API by a calling entity, for intra-service orchestration to invoke the plurality of calls supported by the backend system as part of the flow of execution and provide data back to the calling entity as a response to the calling of the API.

17. A computer program product comprising:

a non-transitory computer readable storage medium readable by a processing circuit and storing instructions for execution by the processing circuit for performing a method, the method comprising:

parsing metadata, collected from a backend system, describing functionality of the backend system, and identifying, based on the parsing, assets of the backend system, the assets including properties of calls supported by the backend system;

automatically building metadata specifications of the identified assets and maintaining the metadata specifications in a deployment repository as available constructs from which to develop services for deployment on one or more endpoint deployment architectures based on selected service endpoints, wherein each metadata specification of the metadata specifications corresponds to a given asset, of the backend system, that uses a first data format, and defines translations between the first data format and a second data format that is different from the first data format and that is agnostic to the selected service endpoints and the one or more endpoint deployment architectures, to provide agnostic development of the services;

providing a development interface to a user, the development interface comprising available user-selectable flow elements having properties that include inputs and outputs in formats based on the metadata specifications maintained in the deployment repository, the available user-selectable flow elements available for selective use by the user in developing a service; and based on the user defining a flow using the development interface, obtaining the user-defined flow as a generic definition of the service that is agnostic to any specific service endpoint and endpoint deployment architecture on which the service is to be deployed, the user-defined flow comprising a plurality of flow elements including (i) an input flow element, (ii) a selected one or more flow elements selected by the user from the available user-selectable flow elements, and (iii) an output flow element, and mappings between the plurality of flow elements, the mappings representing flow of data between the flow elements, and the user-defined flow defining a flow of execution to provide the service, wherein the selected one or more flow elements represent one or more calls to the backend system.

18. The computer program product of claim 17, wherein the method further comprises:

obtaining a selection of a service endpoint, the service endpoint corresponding to a protocol for the service to be deployed;

automatically providing, based on the obtained generic definition of the service, program code configured for execution on an endpoint deployment architecture to provide the service; and deploying the automatically provided program code to the endpoint deployment architecture, wherein the deploying exposes the service executing on the endpoint deployment architecture for access according to the selected endpoint;

wherein the automatically providing and the deploying implement the service using one selected from the group consisting of:

a full code approach, in which a complete project and executable code is generated and provided for user customization; and a low-code approach, in which a predefined executable component implementing a flow engine executes based on the generic definition of the service to perform the service, and one or more intervention points are defined for execution of user-provided customized program code to intervene in flow engine execution and perform customized actions provided by the user.

19. The computer program product of claim 17, wherein the method further comprises:

obtaining a selection of a service endpoint, the service endpoint corresponding to a protocol for the service to be deployed;

automatically providing the obtained generic definition of the service as a service specification to at least one predefined executable component, the at least one predefined executable component configured for execution on an endpoint deployment architecture and configured to consume the service specification to expose the service executing on the endpoint deployment architecture for access according to the selected endpoint.

20. The computer program product of claim 17, wherein the generic definition of the service comprises a plurality of flow elements representing a corresponding plurality of calls supported by the backend system, at least one of the plurality of calls comprising a stateful call to the backend system, wherein the service comprises a single application programming interface (API) configured, based on calling the API by a calling entity, for intra-service orchestration to invoke the plurality of calls supported by the backend system as part of the flow of execution and provide data back to the calling entity as a response to the calling of the API.

* * * * *